United States Patent

Nonoyama

Patent Number: 6,078,459
Date of Patent: Jun. 20, 2000

[54] TRACKING CONTROLLER FOR A TAPE-LIKE RECORDING MEDIUM

[75] Inventor: Hideki Nonoyama, Kanagawa, Japan

[73] Assignee: Sony Corporation, Tokyo, Japan

[21] Appl. No.: 08/945,269

[22] PCT Filed: Mar. 5, 1997

[86] PCT No.: PCT/JP97/00688

§ 371 Date: Oct. 27, 1997

§ 102(e) Date: Oct. 27, 1997

[87] PCT Pub. No.: WO97/33279

PCT Pub. Date: Sep. 12, 1997

[30] Foreign Application Priority Data

Mar. 5, 1996 [JP] Japan ...................................... 8-73036
Mar. 13, 1996 [JP] Japan ...................................... 8-83068

[51] Int. Cl.[7] .................................................. G11B 15/46
[52] U.S. Cl. ...................... 360/73.08; 360/18; 360/77.15
[58] Field of Search .............................. 360/77.01, 77.12, 360/77.13, 77.14, 77.15, 18, 31, 70, 71, 73.04, 75, 73.08, 73.11

[56] References Cited

U.S. PATENT DOCUMENTS

| | | | |
|---|---|---|---|
| 5,191,491 | 3/1993 | Zweighaft | 360/77.15 X |
| 5,349,481 | 9/1994 | Kauffman et al. | 360/77.13 X |
| 5,461,519 | 10/1995 | Yoshihiro et al. | 360/77.13 X |
| 5,623,380 | 4/1997 | Noguchi et al. | 360/77.15 |

*Primary Examiner*—Andrew L. Sniezek
*Attorney, Agent, or Firm*—Jay H. Maioli

[57] ABSTRACT

A tracking control apparatus for a tape-shaped recording medium according to this invention is operative, prior to carrying out actual reproduction, to measure times from the time point serving as reference phase position within one period of the rotary drum to the time points when timing signals of respective recording areas of the tape-shaped recording medium are detected by the head, and to calculate average values every respective recording areas of the measured times to generate reference value on the basis of the maximum value and the minimum value of the calculated average values of the respective recording areas. Further, in actual reproduction, times from the time point serving as reference phase position to the time points when the timing signals of the tape-shaped recording medium are detected by the head are measured to control relative velocity between traveling velocity of the tape-shaped recording medium and rotational velocity of the rotary drum on the basis of result of comparison between the measured times and the reference value. Thus, even in the case where particularly the relationship between the scanning locus of the reproduction head and the track shape is not ideal, satisfactory tracking can be carried out over the entire area of the track. As a result, reliability of, e.g., digital data storage using such tracking control apparatus for tape-shaped recording medium can be improved.

7 Claims, 29 Drawing Sheets

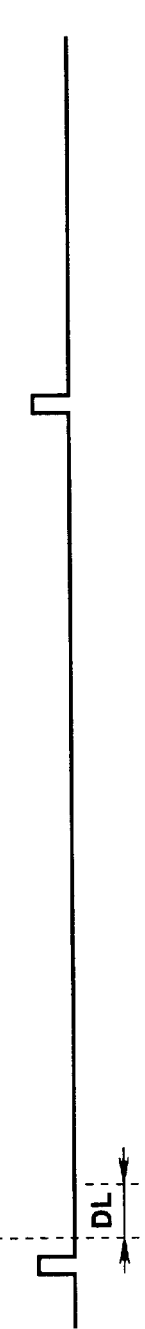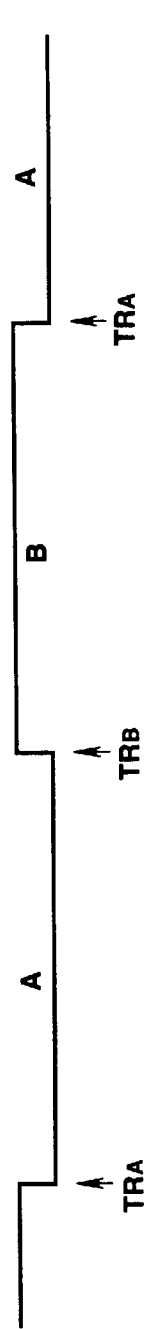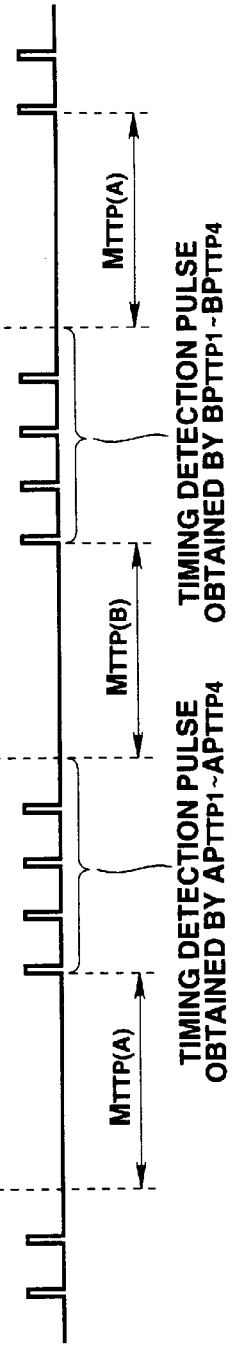
FIG.13(a) FGD
FIG.13(b) PGD
FIG.13(c) SWP
FIG.13(d) RF
FIG.13(e) TTP (TIMING ATF PROCESSIING SECTION)

TRACKING CONTROLLER FOR A TAPE-LIKE RECORDING MEDIUM

DESCRIPTION

1. Technical Field

This invention relates to a tracking control apparatus for a tape-shaped recording medium. Specifically, this invention relates to an apparatus adapted for controlling relative velocity between traveling velocity of the tape-shaped recording medium and rotational velocity of the rotary drum to provide (apply) tracking servo (control).

2. Background Art

There have been developed, e.g., Digital Audio Tape Players (hereinafter simply referred to as DAT) adapted for recording and/or reproducing digital audio data with respect to magnetic tape and Digital Data Storages in which such DAT is used to record or reproduce data of the computer. In these devices, magnetic tape is traveled in the state where the magnetic tape is wound at a wrap angle of, e.g., 90 degrees on the rotary drum, and the rotary drum is rotated to carry out recording/reproduction in accordance with the helical scan system by using the magnetic head on the rotary drum. Thus, high density recording is permitted.

In accordance with this helical scan system, inclined tracks $TK_A$, $TK_B$ are formed on the magnetic tape as shown in FIG. 1. These inclined tracks $TK_A$, $TK_B$ are tracks formed by, e.g., recording in which no guard band is provided (so-called azimuth full recording) by using a pair of recording heads $HR_A$, $HR_B$ in which azimuth angles are different from each other mounted on the rotary drum. In more practical sense, respective gaps GP of the recording heads $HR_A$, $HR_B$ are adapted so that azimuth angles $\theta_A$, $\theta_B$ are provided in directions opposite to each other, and magnetization (magnetic polarization) directions of the inclined tracks $TK_A$, $TK_B$ are different from each other as indicated by slanting lines. In this azimuth full recording, the track width TP is narrower than the width of the recording heads $HR_A$, $HR_B$.

Meanwhile, at the time of reproduction, the magnetic head is required to precisely trace tracks TK (inclined tracks $TK_A$, $TK_B$) on the magnetic tape. As this tracking control system, e.g., in the digital data storage, a tracking servo control so called timing ATF (Automatic Track Following) system is used.

In accordance with this timing ATF system, the time (or time period which will be referred to as tracking detection time) required from the reference phase position of the rotary drum until the magnetic head detects (reproduces) a predetermined signal (hereinafter referred to as a timing detection signal) from corresponding track is measured to compare that measured value and reference value to allow error therebetween to be servo error information. Then, the rotational velocity (speed) of the capstan motor for traveling the magnetic tape is controlled on the basis of this servo error information to adjust the tape traveling velocity. Namely, the tape traveling velocity is adjusted to adjust the relative velocity between the drum rotational velocity and the tape traveling velocity so that a satisfactory tracking state can be obtained.

In more practical sense, as shown in FIG. 3, phase position of the rotary drum when scanning position of the magnetic head is caused to be the position of line (timing) designated as $TR_A$ in FIG. 3 with respect to a certain track is caused to be the reference phase position. At the rotary drum or the drum motor, pulse generator (PG) is disposed. At the time point when the rotary drum is located at the reference phase position during rotation, a pulse signal is generated from the PG. Accordingly, it is possible to detect the timing $TR_A$ at which the rotary drum has been located at the reference phase position. Thereafter, when the magnetic head comes into contact with the magnetic tape to scan the inclined track $TR_A$, a timing detection signal is detected as reproduction data at a predetermined position $P_{TTP}$ on the track. This timing detection signal serves so that pulse can be obtained at the predetermined position $P_{TTP}$ such as synchronizing signal or address, etc. included in reproduction data.

In this case, three different kinds of scanning loci in the tracking phase state of the magnetic head with respect to the inclined track $TK_A$ are designated as ①, ②, ③ in FIG. 3. The times from the timing when the magnetic head is located at the reference phase position (position of the line $TR_A$) of the rotary drum up to the timing when the magnetic head reaches the position $P_{TTP}$, i.e., tracking detection times are different from each other as respectively designated as t1, t2, t3 in the scanning states of ①, ②, ③.

As the reference value of the tracking detection time, time t1 obtained when the magnetic head is placed in the satisfactory tracking state with respect to the track TK, i.e., in the state where it traces the center of the inclined track $TK_A$ as in the case of ① is set in advance. Accordingly, in the case where scanning as in the case of ① is carried out at the time of tracking servo control so that time t1 is measured as the tracking detection time, the measured value becomes in correspondence with the reference value. Namely, in this case, there is no error between the measured value and the reference value, and there results satisfactory tracking state. On the other hand, in the case where scanning is carried out in the tracking phase state as in the case of ② or ③, the measured value of the tracking detection time becomes equal to t2 or t3, giving rise to error with respect to the reference value. In this case, there results the state where tracking deviates by that error. By reflecting this with respect to the tape traveling velocity, servo the control the results in just the tracking state can be carried out.

In providing (applying) tracking servo (control) by such timing ATF system, it is necessary to determine in advance the reference value. This reference value is the time (time period) from the timing of the reference phase position of the rotary drum in the just tracking state to the timing at which the timing detection signal is detected. Since the timing detection signal is generated, e.g., on the basis of detection of synchronizing signal, etc. at a predetermined position on the track, that position $P_{TTP}$ should be fixed at each track of various tapes. However, from a practical point of view, it cannot be avoided that positional shift may take place resulting from mechanical error, etc. at various recording equipments and reproducing equipments. For this reason, in the digital data storage, in the case where certain file data is reproduced, it is necessary to measure, prior to read-out of that data, the reference value at that tape (its file data track).

In this measurement of the reference value, there is conducted such a processing to carry out scanning in various tracking phase states with respect to the tracks to calculate, from tracking detection times measured at respective scanning operations, e.g., an average value of these detection times to allow such an average value to be the reference value.

Its operation image is shown in FIG. 4. As shown in FIG. 4, when scanning is carried out in plural tracking phase states TJ1~TJ5 different from each other with respect to, e.g., the inclined track $TK_A$ to calculate an average value of respective tracking detection times measured in those scanning operations, tracking detection time in the tracking phase state in the vicinity of the tracking phase state TJ3 is obtained. This tracking detection time is permitted to be tracking detection time substantially in the just tracking state. Therefore, it is sufficient to employ this tracking detection time as the reference value.

Meanwhile, in the digital data storage etc., reproduction must be carried out with good compatibility with respect to tape cassettes recorded by various recording devices. When this applies to tracking, satisfactory tracking servo controls by the timing ATF system must be carried out with respect to various tape cassettes.

When ideally viewed, the relationship between the track TK on the magnetic tape and scanning locus of the reproduction head is such that, as shown in FIG. 5(a), track TK is linearly formed and scanning locus of the magnetic head at the time of reproduction is in a linear form. In such an ideal state, when an approach is employed to compare tracking detection time based on timing detection signal obtained at a predetermined position $P_{TTP}$ on the track and reference value of tracking detection time set in advance by the operation for setting reference value to carry out servo control so that its error becomes equal to zero, scanning can be carried out in the satisfactory tracking state from the beginning to the end of the track.

However, between various recording devices, there are mechanical errors, such as, for example, mounting position, etc. of the recording head with respect to the rotary head, and the tape traveling velocity at the time of recording is not strictly constant (fixed), but changes to some extent. Further, also in reproducing devices, there are mechanical errors such as mounting position, etc. of the reproducing head, and the tape traveling velocity also changes. It cannot be said from these various factors that ideal tracking state as shown in FIG. 5(a) can be always obtained at the time of reproduction.

For example, as shown in FIG. 5(b), there are instances where the track TK is formed in a curved manner at the time of recording. Contrary to this, scanning locus of the reproduction head of the reproducing device is assumed to be substantially in a linear form. In this case, when setting of reference value and servo control at the time of reproduction are carried out by timing detection signal obtained at a predetermined position $P_{TTP}$ on the track, a tracking servo control such that just tracking state can be obtained, e.g., at the position $P_{TTP}$ is carried out. Namely, the scanning locus of the reproduction head results in a locus as indicated by single dotted lines in the figure. In this case, since the track TK is curved as shown in FIG. 5(b), scanning of the reproduction head deviates from the track at the last (end) portion of the track TK. In other words, satisfactory tracking state fails to be maintained over the entirety of the track TK.

Moreover, in a device such that the track TK is formed in a linear form, but the scanning locus of the reproduction head is curved as shown in FIG. 5(c), for example, when setting of the reference value and servo control at the time of reproduction are similarly carried out by the timing detection signal obtained at the position $P_{TTP}$, the scanning locus of the reproduction head results in a locus as indicated by a single dotted line in FIG. 5(c), thus failing to maintain satisfactory tracking state over the entirety of the track TK.

Namely, in circumstances as shown in FIGS. 5(b), 5(c), for example, even if the tracking servo normally functions, satisfactory tracking is not carried out in practice. As a result, the error rate of reproduction data is deteriorated, leading to lowering of reliability of the device.

Meanwhile, if servo (control) is provided (applied) so that scanning locus as indicated by solid line in FIGS. 5(b), 5(c) can be obtained, tracking state of the range allowable over substantially the entirety of the track can be realized. Thus, data recorded on the track can be read out without problem. In view of this, in order to permit realization of such a scanning, there is conceivably a method in which the track is divided into plural recording areas so that timing detection signals can be obtained at plural positions to carry out the setting of the reference value on the basis of these timing detection signals.

For example, as shown in FIG. 6, four recording areas R1~R4 are provided at the track TK to set positions $P_{TTP}1$~$P_{TTP}4$ where timing detection signals can be obtained within respective recording areas R1~R4. For example, setting is made such that timing detection signals can be obtained by addresses or synchronizing signals at four portions included in recorded data on the track. Then, tracking detection times corresponding to distances from the reference phase position TR of the rotary drum to respective positions $P_{TTP}1$~$P_{TTP}4$ are measured.

In more practical sense, with respect to the position $P_{TTP}1$, time tR1 from the time point of the reference phase position TR to the time point when timing detection signal can be obtained at the position $P_{TTP}1$ is measured to allow this time tR1 to be tracking detection time. With respect to the position $P_{TTP}2$, time tR2 from the time point of the reference phase position TR to the time point when the timing detection signal can be obtained at position $P_{TTP}2$ is measured to allow the value obtained by subtracting the standard time difference TLa from the above-mentioned time tR2 to be tracking detection time. This standard time difference TLa is the standard time required for scanning from the position $P_{TTP}1$ to the position $P_{TTP}2$. With respect to the position $P_{TTP}3$, time tR3 from the time point of the reference phase position TR to the time point when the timing detection signal is obtained at position $P_{TTP}3$ is measured to allow values obtained by subtracting the standard time difference TLb from the above-mentioned time tR3 to be tracking detection time. This standard time difference TLb is the standard time required for scanning from the position $P_{TTP}1$ to the position $P_{TTP}3$. With respect to the position $P_{TTP}4$, time tR4 from the time point of the reference phase position TR to the time point when the timing detection signal is obtained at position $P_{TTP}4$ is measured to allow value obtained by subtracting the standard time difference TLc from the above-mentioned time tR4 to be tracking detection time. This standard time difference TLc is the standard time required for scanning from the position $P_{TTP}1$ to the position $P_{TTP}4$.

When tracking detection times corresponding to respective positions $P_{TTP}1$ to $P_{TTP}4$ are measured as stated above in an ideal state as shown in FIG. 5(a), tracking detection times corresponding to the respective positions $P_{TTP}1$~$P_{TTP}4$ take the same value. However, since ideal tracking states are respectively different in the respective recording areas R1~R4 under the state as shown in FIGS. 5(b), 5(c), tracking detection times in the just tracking state at respective positions $P_{TTP}1$~$P_{TTP}4$ take different values.

In this case, when an average value of respective tracking detection times corresponding to the respective positions $P_{TTP}1$~$P_{TTP}4$ is determined, this average value takes a value capable of obtaining equivalent tracking state to some extent in the respective recording areas R1~R4. In view of the above, the operation to determine respective tracking detection times in plural recording areas within one track as stated above is executed in various tracking phase states as shown in FIG. 4 to obtain plural tracking detection times. Then, an average value of these tracking detection times is determined. This average value takes a value corresponding to the tracking state within a range allowable (tolerable) to some extent in the respective recording areas R1~R4. Namely, if this average value is assumed as the reference value, scanning as indicated by solid line in FIGS. 5(b), 5(c), for example, can be carried out. Namely, reasonable reproduction operation can be carried out.

However, with such a method, when there is dispersion in the number of tracking detection times measured every recording areas, reference value for obtaining substantially satisfactory tracking over the entire area of the track cannot be obtained. In more practical sense, consider the case where scanning for setting reference value is carried out with respect to the track TK formed in a curved manner as shown in FIG. 7. As has been explained with reference to FIG. 4, it is preferable to obtain the tracking detection time for setting the reference value in diverse tracking phase states. In view of this, it is now assumed that scanning for measurement of the tracking detection time is carried out in tracking phase states designated at ④, ⑤, ⑥ in FIG. 7, for example.

In this case, in the case of the scanning ⑤, timing detection signals can be obtained from respective positions $P_{TTP}1$~$P_{TTP}4$, and tracking detection times respectively corresponding to the positions $P_{TTP}1$~$P_{TTP}4$ can be thus obtained. However, in the case of the scanning ④, timing detection signals can be obtained only from the positions $P_{TTP}1$, $P_{TTP}2$. As a result, only two tracking detection times corresponding to the positions $P_{TTP}1$, $P_{TTP}2$ can be obtained. In addition, in the case of the scanning ⑤, timing detection signal can be obtained only from the position $P_{TTP}4$. As a result, only one tracking detection time corresponding to the position $P_{TTP}4$ can be obtained.

The above-mentioned explanation has been given only for illustrative purpose. In practice, the number of tracking detection times corresponding to respective positions $P_{TTP}1$~$P_{TTP}4$ considerably varies by such relative shift between the track and the scanning loci. For this reason, the above-described average value does not necessarily result in the value equally reflecting the tracking states with respect to all the recording areas R1~R4. As a result, it cannot be said that scanning as indicated by solid line of FIGS. 5(b), 5(c) can be necessarily realized.

Moreover, it is conceivable to employ an approach to determine, at every one of the recording areas, average values of tracking detection times respectively obtained at the positions $P_{TTP}1$~$P_{TTP}4$ to further average these average values in the entire recording area. When such an approach is employed, influence of variations in the number of tracking detection times at respective positions $P_{TTP}1$~$P_{TTP}4$ can be reduced. However, employment of this average value as the reference value allows the recording area where off track quantity is largely to be apt to take place. It is now assumed that, e.g., average values in the recording areas R1, R2, R3 are substantially equal to each other, and the average value of the recording area R4 has a greatly different value. In this case, when average values of the recording areas R1~R4 are averaged to allow such average value to be reference value, that value becomes equal to a value which has greatly reflected off track quantities in the recording areas R1, R2, R3, i.e., there is the possibility that tracking may greatly deviate in the recording area R4.

As stated above, in the conventional tracking control apparatus employing the timing ATF system, in the case where the relationship between scanning locus of the magnetic head at the time of reproduction and the track shape is not ideal, there was the problem that it is difficult to maintain satisfactory tracking over the entire area of the track in a manner corresponding thereto, resulting in partially deteriorated error rate.

DISCLOSURE OF THE INVENTION

This invention has been made in view of such problems, and an object of this invention is to provide a tracking control apparatus for a tape-shaped recording medium such that even in the case where the relationship between the scanning locus of the reproduction head and the track shape is not ideal, satisfactory tracking can be carried out, thereby making it possible to improve reliability of the digital data storage.

A tracking control apparatus for a tape-shaped recording medium according to this invention is directed to a tracking control apparatus for a tape-shaped recording medium on which plural inclined tracks are formed, each of the tracks is composed of plural recording areas, and timing signals are respectively recorded in the recording areas. Prior to carrying out actual reproduction, times from the time point serving as reference phase position within one period of the rotary drum up to the time point when the timing signals of the respective recording areas of the tape-shaped recording medium are detected by the head are measured to calculate average values at every one of the respective recording areas of the measured times to generate reference values on the basis of the maximum value and the minimum value of the calculated average values of the respective recording areas. Then, in actual reproduction, times from the time point serving as the reference phase position up to the time point when the respective timing signals of the tape-shaped recording medium are detected by the head are measured to control relative velocity between traveling velocity of the tape-shaped recording medium and the rotational velocity of the rotary drum on the basis of result of comparison between the measured times and the reference value.

A tracking control apparatus for a tape-shaped recording medium according to this invention is directed to a tracking control apparatus for a tape-shaped recording medium on which plural inclined tracks are formed, each of the tracks is comprised of plural recording areas, and timing signals and error detection codes are respectively recorded in the recording areas. Prior to carrying out actual reproduction, error or errors included in data which have been read out from the respective recording areas of the tape-shaped recording medium by the head is or are detected on the basis of the error detection code. At this time, times from the time point serving as reference phase position within one period of the rotary drum up to the time point when timing signals of the respective recording areas of the tape-shaped recording medium are detected by the head are measured to generate reference value on the basis of the measured times and the error detection result. Then, in actual reproduction, times from the time point serving as the reference phase position to the time point when the timing signals of the tape-shaped recording medium are detected by the head are measured to control relative velocity between the traveling velocity of the tape-shaped recording medium and the rotational velocity of the rotary drum on the basis of result of comparison between the measured times and reference value.

A tracking control apparatus for a tape-shaped recording medium according to this invention is directed to a tracking control apparatus for a tape-shaped recording medium on which plural inclined tracks are formed, each of the tracks is comprised of plural recording areas, and timing signals are respectively recorded in the recording areas. Prior to carrying out actual reproduction, times from the time point serving as a reference phase position within one period of the rotary drum up to the time point when the timing signals of the respective recording areas of the tape-shaped recording medium are detected by the head are measured to set windows corresponding to time periods during which the timing signals of the respective recording areas of the tape-shaped recording medium are detected to generate reference value on the basis of times until the timing signals of the respective recording areas obtained within the time periods prescribed by the windows are detected. Then, in actual reproduction, times from the time point serving as the reference phase position up to the time point when the timing signals of the tape-shaped recording medium are detected by the head are measured to control relative velocity between the traveling velocity of the tape-shaped recording medium and the rotational velocity of the rotary drum on the basis of result of comparison between the measured times and the reference value.

A tracking control apparatus for a tape-shaped recording medium according to this invention is directed to a tracking control apparatus for a tape-shaped recording medium on which plural inclined tracks are formed, each of the tracks is comprised of plural recording areas, and timing signals are respectively recorded in the recording areas. Prior to carrying out actual reproduction, times from the time point serving as the reference phase position within one period of the rotary drum up to the time point when the timing signals of the respective recording areas of the tape-shaped recording medium are detected by the head are measured to generate error information for controlling relative velocity between the traveling velocity of the tape-shaped recording medium and the rotational velocity of the rotary drum on the basis of result of comparison between the measured times and reference value serving as reference, and to generate a control signal on the basis of error information generated with respect to the track of the tape-shaped recording medium being scanned by the head and error information generated with respect to the track preceding by one track relative to the track being scanned by the head. Then, in actual reproduction, relative velocity between the traveling velocity of the tape-shaped recording medium and the rotational velocity of the rotary drum is controlled on the basis of the control (reproduction) signal.

In addition, in these tracking control apparatuses for tape-shaped recording medium, in setting the above-described reference value, average values every respective recording areas are calculated on the basis of accumulated values of times from the time point serving as the reference phase position measured in the state where the tape-shaped recording medium is traveled at a feed velocity different from the ordinary feed velocity up to the time point when the timing signals of the respective recording areas of the tape-shaped recording medium are detected by the head to calculate an average value of the maximum value and the minimum value of average values of the respective recording areas to thereby generate a reference value.

BRIEF DESCRIPTION OF THE DRAWINGS

FIG. 13 is a time chart for explaining the operation of the servo circuit.

BEST MODE FOR CARRYING OUT THE INVENTION

Embodiments of a tracking control apparatus for a tape-shaped recording medium according to this invention will now be described. In the embodiments described below, explanation will be given by taking the example of digital data storage using a tape-shaped recording medium. It is to be noted that this invention can be applied to equipment or systems employing the timing ATF system also except for the digital data storage.

Explanation will be given in order recited below.

Figure 8:
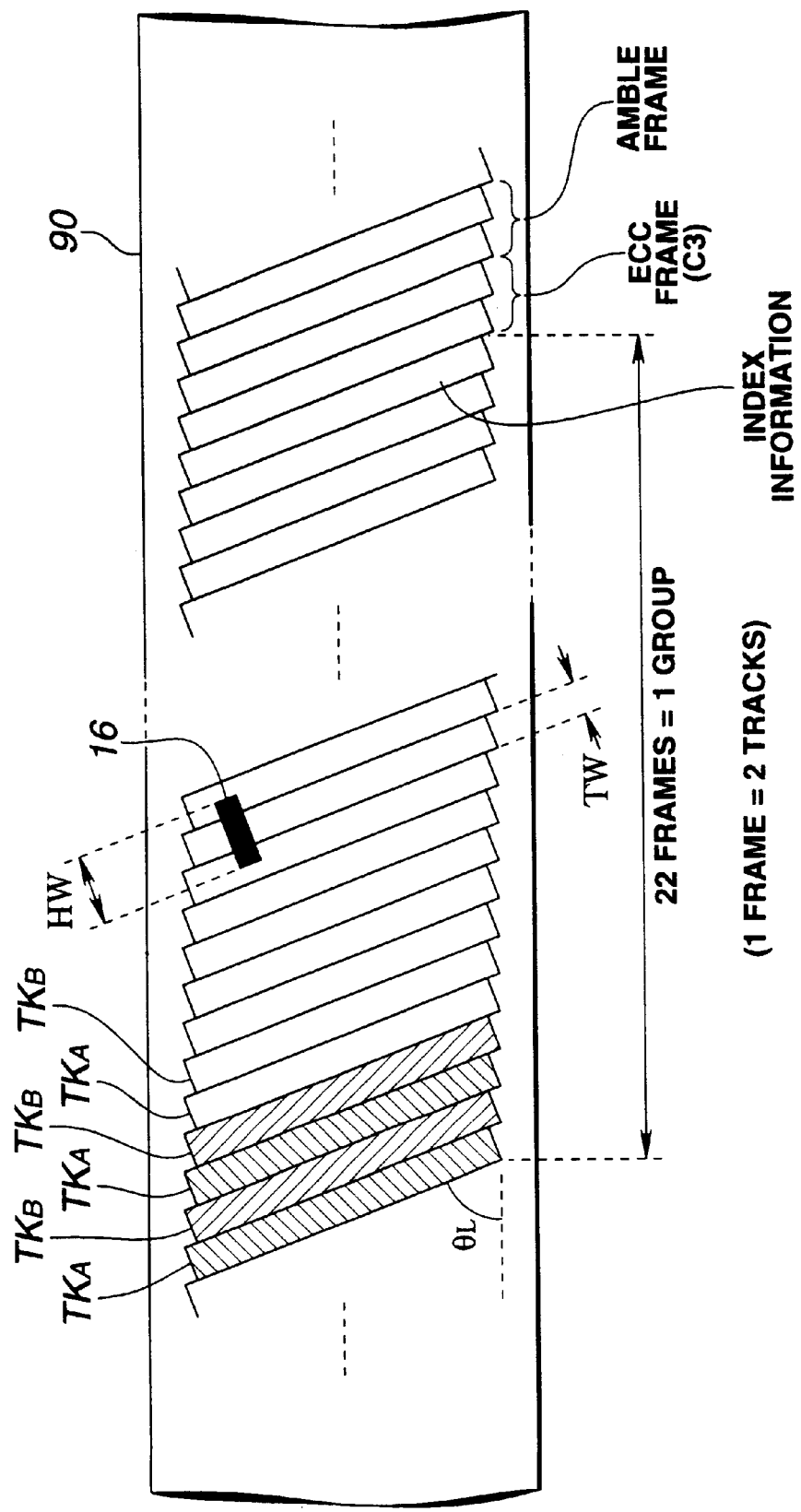
FIG. 8 is a view showing track format used for digital data storage.

1. Track format used in digital data storage
2. More practical configuration of the digital data storage
3. Configuration and operation of servo circuit employing timing ATF system
4. First embodiment of reference value setting scheme
5. Second embodiment of reference value setting scheme
6. Third embodiment of reference value setting scheme
7. Fourth embodiment of reference value setting scheme 1. Track format used in digital data storage Explanation will be given with reference to FIG. 8 in connection with the track format used for digital data storage. FIG. 8 shows tracks formed on a magnetic tape 90 by the helical scan system.

Respective tracks TK are successively formed as track of width TW by recording in which no guard band is provided (the so-called azimuth full recording) by using recording head (not shown). Tracks adjacent to each other are tracks recorded by recording heads having azimuth angles opposite to each other, wherein tracks formed by the recording head having one azimuth angle are assumed as inclined tracks $TK_A$, and tracks formed by the recording head having the other azimuth angle are assumed as inclined tracks $TK_B$.

At the time of reproduction of data, tracks TK are scanned by a reproduction head 16. The width HW of the reproduction head 16 is broader than the track width TW, but cross talk from adjacent tracks can be prevented by the so-called azimuth effect.

In the track format used in the digital data storage, a pair of adjacent inclined tracks $TK_A$, $TK_B$ are called one frame, and 22 frames are caused to be unit called one group. After the group, ECC frame is provided. In addition, after the ECC frame, amble frame is provided. It is to be noted that the number of frames of amble frames is not prescribed, and there are instances where such amble frame is not provided. By the ECC frame and the amble frame, the boundaries between respective groups on the magnetic tape 90 are prescribed. Additionally, in respective groups, index information for identifying a series of data are added to respective last frames within the groups.

The data format within one track will now be described with reference to FIG. 9. As shown in FIG. 9(a), one track is adapted so that margin areas are provided at respective both ends, and the area put between these margin areas is caused to serve as main data area. The main data area is divided into 96 fragments to which fragment addresses of 0~95 are given.

As shown in FIG. 9(b), one fragment consists of 133 bytes. As shown in FIG. 9(b), synchronizing (sync) areas of 1 byte are provided at leading portions of respective 78 fragments of which fragment addresses are 9~86, and synchronizing (sync) signals which takes a predetermined pulse form are recorded therein. Succeedingly (subsequently) to the synchronizing signal area, address and sub code areas of 6 bytes are provided. Fragment address of 1 byte and sub code of 5 bytes are recorded therein. Succeedingly (subsequently) thereto, header parity area of 2 bytes is provided. Further, succeedingly (subsequently) thereto, data area of 112 bytes is provided. Actual data is recorded into this data area. The last 12 bytes of the fragment is caused to serve as ECC area. So called C1 error correction code is recorded in this ECC area. This C1 error correction code is error correction code with respect to data within the fragment, i.e., the error correction processing is completed in fragment units.

As shown in FIG. 9(c), at respective 18 fragments of which fragment addresses are 0~8 and 87~95, synchronizing (sync) signal area, address and sub code areas, header parity area and ECC area are provided similarly to the fragment of FIG. 9(b). It is to be noted that the area of 112 bytes which has been caused to be data area in the fragment of FIG. 9(b) is caused to serve as the ECC area, and C2 error correction code is recorded therein. The C2 error correction code is error correction code of the series completed within one track.

As the error correction code, there is further provided C3 error correction code. This C3 error correction code is recorded in the ECC frame shown in the FIG. 8 mentioned above. This C3 error correction code is the error correction code of the series completed within one group. Moreover, by error detection using the C1 error correction code and the C3 error correction code, at which portion error takes place within one track can be confirmed. However, because the C2 error correction code is recorded after undergone interleaving within one track, it is impossible to confirm error occurrence position within one track by error detection using the C2 error correction code.

2. More practical configuration of digital data storage

Figure 10:
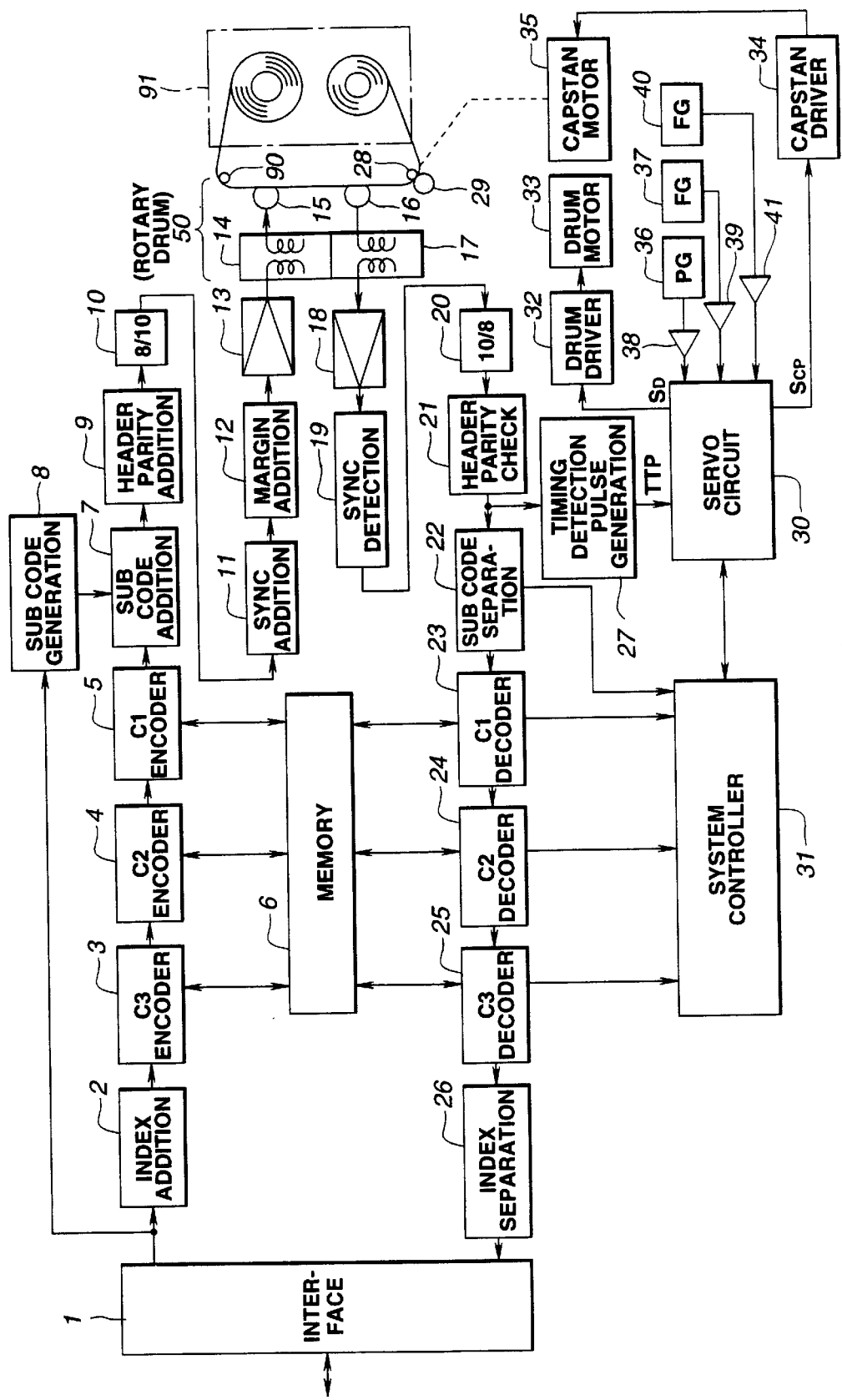
FIG. 10 is a block diagram showing a more practical configuration of digital data storage to which this invention is applied.

The configuration of the digital data storage to which this invention is applied is shown in FIG. 10.

An interface section 1 is connected to external host computer (not shown), and serves to carry out transmission/reception of data to and from the host computer. The interface section 1 receives data from the host computer at the time of recording to deliver it to an index adding circuit 2 and a sub code generating section 8. In addition, the interface section 1 outputs, at the time of reproduction, data reproduced from the magnetic tape 90 to the host computer.

At the time of recording, the index adding circuit 2 adds index information for identifying a series of input data every respective one groups to data inputted thereto. To the data to which the index information has been added, error correction codes of the C3 series, the C2 series and the C1 series are respectively added at a C3 encoder 3, a C2 encoder 4 and a C1 encoder 5. In more practical sense, respective ones of the C3 encoder 3, the C2 encoder 4 and the C1 encoder 5 temporarily store data into a memory 6 every respective one groups to carry out adding processing for error correction code. Namely, the C3 encoder 3 generates error correction code C3 which is the error correction code recorded into the ECC frame after the group shown in FIG. 8 and error correction code with respect to data train corresponding to the track width direction. Moreover, the C2 encoder 4 generates error correction code C2 which is the error correction code recorded into the ECC area within fragment of which fragment addresses are 0~8 and 87~95 shown in FIG. 9(c) and error correction code with respect to data train corresponding to the track direction. Further, the C1 encoder 5 generates error correction code C1 which is error correction code recorded in the ECC area shown in FIGS. 9(b), 9(c) and error correction code of fragment unit. Data to which these error correction codes C1, C2, C3 are added is delivered to a sub code adding circuit 7.

The sub code generating section 8 generates various sub codes and fragment addresses on the basis of data delivered from the interface section 1 to deliver them to the sub code adding circuit 7. As sub code is generated, there are, e.g., separate count information indicating delimiter of data, record count information indicating number of recording information, area IDs indicating respective areas defined on the tape format, frame number, group count information indicating the number of recording units, and check sum, etc. The sub code adding circuit 7 adds, every respective one fragments, the sub code and the fragment address to the data to which the error correction code has been added. Namely, the sub code adding circuit 7 adds, to data sub code and fragment address recorded in the address/sub code area shown in FIGS. 9(*b*), 9(*c*).

Figure 9:
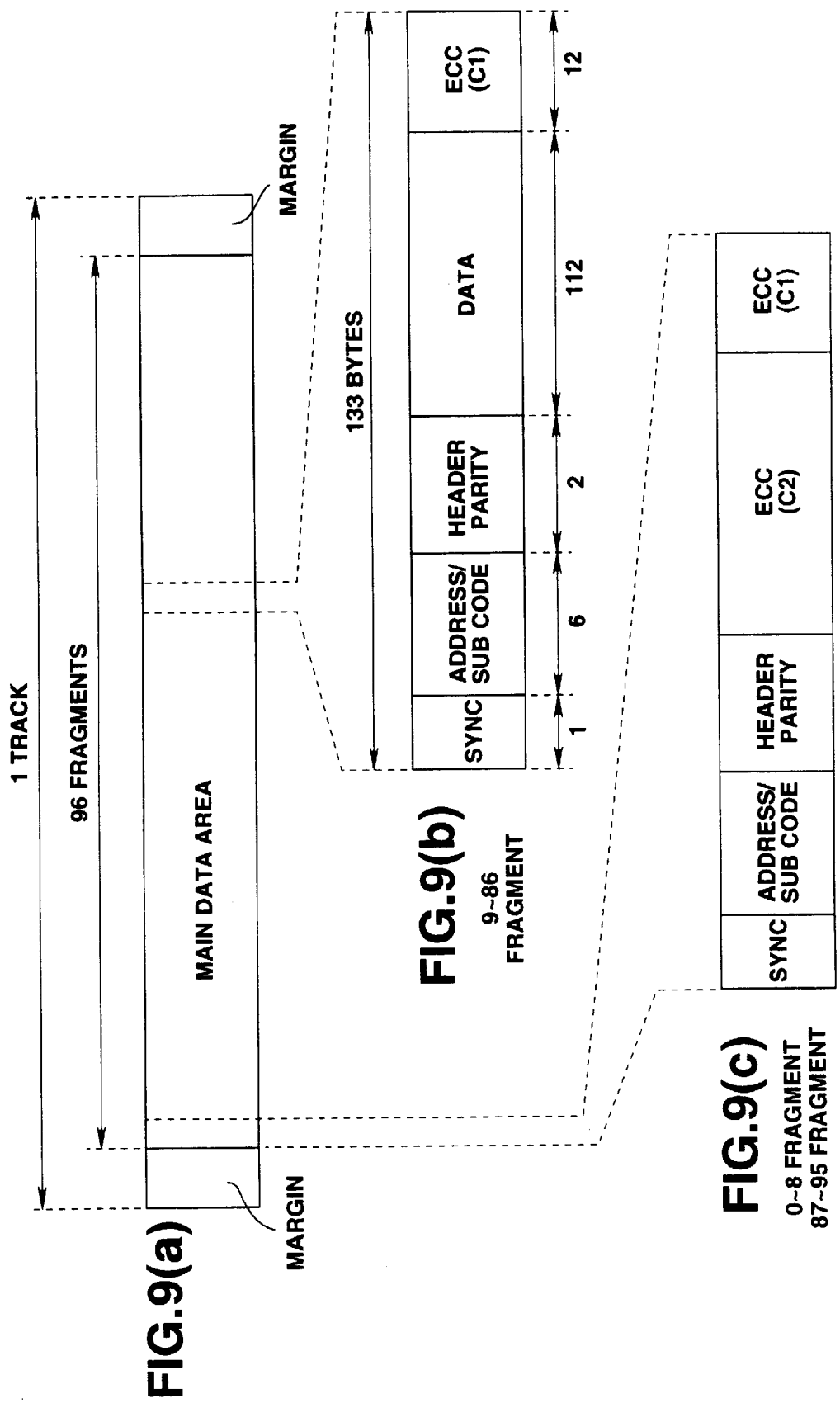
FIG. 9 is a view showing data format of track.

A header parity adding circuit 9 adds CRC code recorded in the header parity area shown in FIGS. 9(*b*), 9(*c*) to data to which sub code and fragment address have been added. This CRC code is parity code consisting of 2 bytes for detection of error of sub code and fragment address.

An 8/10 modulating circuit 10 converts, in units of 1 byte (8 bits), data inputted thereto into recording data consisting of 10 bits by the so-called 8/10 modulation. A synchronizing (sync) signal adding circuit 11 adds a synchronizing signal of 1 byte recorded in the leading synchronizing signal area of the fragment shown in FIGS. 9(*b*), 9(*c*) to the above-mentioned recording data.

A margin adding circuit 12 adds data recorded in the margin areas of both ends of the track shown in FIG. 9(*a*). Thus, train of recording data in conformity with the track format shown in FIG. 9 is generated. The recording data generated in this way is delivered to a recording amplifier 13. The recording amplifier 13 amplifies recording data to deliver it to a recording head 15 disposed at a rotary drum 50 through a rotary transformer 14. Thus, magnetic recording with respect to the magnetic tape 90 which is being traveled by a recording head 15 is carried out.

The magnetic tape 90 is accommodated within a tape cassette 91. At the time of recording/reproduction, the magnetic tape 90 is drawn out from the tape cassette 91 and is wound (loaded) onto the rotary drum 50. In the state where the magnetic tape 90 is held between a capstan 28 and a pinch roller 29 in a contact manner, the capstan 28 is rotated at a constant velocity, e.g., at the time of recording by a capstan motor 35. Thus, the magnetic tape 90 is traveled at a constant velocity. Moreover, the rotary drum 50 is rotated at a constant velocity, e.g., at the time of recording by a drum motor 33. As a result, the recording head 15 obliquely scans (recording surface) on the magnetic tape 90. Thus, data is recorded onto the magnetic tape 90 by the recording head 15.

A more practical configuration of the rotary drum 50 and the recording head 15 will now be described with reference to FIG. 11.

The magnetic tape 90 drawn out from the tape cassette 91 is traveled at a constant velocity by the capstan 28 and the pinch roller 29 while being wound at the area of about 90 degrees in the state inclined in a height direction with respect to the rotary drum 50 by guide pins 51, 52, 53. Moreover, the rotary drum 50 is rotated while being slidably in contact with the magnetic tape 90. By recording operation of the recording head 15 mounted on the rotary drum 50, inclined tracks TK shown in FIG. 8 are successively formed on the magnetic tape 90 in accordance with the helical scan system.

Figure 11:
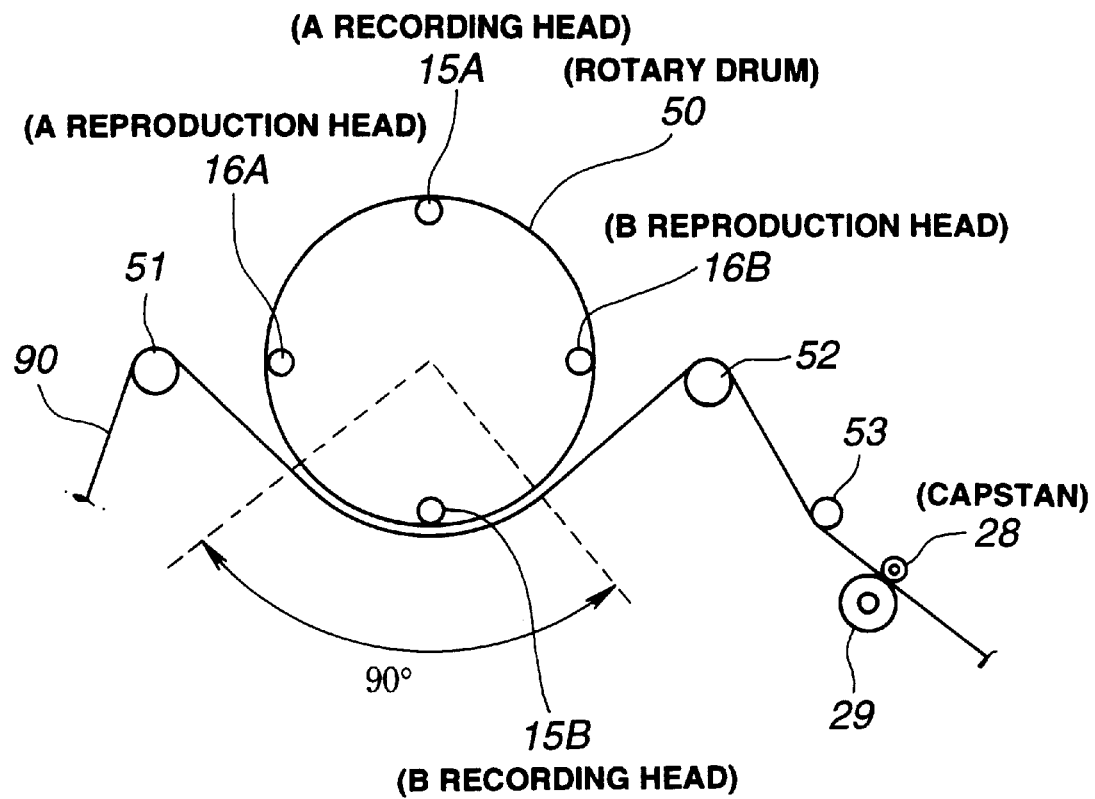
FIG. 11 is a view showing a more practical configuration of rotary drum and recording/reproduction heads.

It is to be noted that while one recording head 15 and one reproduction head 16 are only illustrated in FIG. 10, the azimuth full recording system is employed as described above in this digital data storage, and two recording heads 15A, 15B having azimuth angles different from each other and two reproduction heads 16A, 16B having azimuth angles different from each other are disposed on the peripheral surface of the rotary drum in the state spaced by 180 degrees to each other in FIG. 11. At the time of recording, the recording head 15A and the recording head 15B are alternately slidably in contact with the magnetic tape 90, whereby inclined tracks $TK_A$ and inclined tracks $TK_B$ of which magnetization directions are different from each other as shown in FIG. 8 are formed one after another.

On the other hand, at the time of reproduction, as shown in FIG. 11, the magnetic tape 90 is traveled in the state wound on the rotary drum 50, and the rotary drum 50 is rotated, whereby the reproduction heads 16A, 16B alternately trace inclined tracks $TK_A$, $TK_B$. Thus, recorded data are read out.

The reproduction system will now be described. A signal which has been read out by the reproduction heads 16A, 16B is delivered to a reproduction amplifier 18 through a rotary transformer 17 as shown in FIG. 10. The reproduction amplifier 18 amplifies the signal delivered through the rotary transformer 17 to deliver it to a synchronizing detecting circuit 19. It is to be noted that while one rotary transformer 14 for recording and one rotary transformer 17 for reproduction are merely illustrated in FIG. 10, when viewed from a practical point of view, two rotary transformers 14 are provided in correspondence with the recording heads 15A, 15B of FIG. 11, and two rotary transformers 17 are provided in correspondence with the reproduction heads 16A, 16B.

The synchronizing signal detecting circuit 19 is composed of, e.g., equalizer, PLL (Phase Locked Loop) circuit and binary circuit, etc. The equalizer waveform-equalizes a signal amplified by the reproduction amplifier 18, the PLL circuit generates a reproduction clock synchronous with a synchronizing signal included in, e.g., a waveform-equalized signal, and the binary circuit modifies the waveform-equalized signal by this reproduction clock to deliver data thus obtained to a 10-8 demodulating circuit 20.

The 10-8 demodulating circuit 20 implements conversion opposite to the conversion at the 8-10 modulating circuit 10 of the recording system with respect to data delivered from the synchronizing signal detecting circuit 19 to reproduce data of 8 bit unit. A header parity check circuit 21 corrects error of sub code and fragment address included in the reproduced data (hereinafter simply referred to as reproduction data) by using CRC code of 2 bytes shown in FIGS. 9(*b*), 9(*c*). This error corrected reproduction data is delivered to a sub code separating circuit 22 and a timing detection pulse generating circuit 27.

The sub code separating circuit 22 extracts fragment address and sub code data to deliver them to a system controller 31. Moreover, the sub code separating circuit 22 delivers actual data except for the fragment address and the sub code data to a C1 decoder 23, a C2 decoder 24 and a C3 decoder 25.

The C1 decoder 23, the C2 decoder 24 and the C3 decoder 25 respectively carry out error correction of actual data delivered from the sub code separating circuit 22 by using error correction codes of the C1 series, the C2 series and the C3 series. In more practical sense, the C1 decoder 23, the C2 decoder 24 and the C3 decoder 25 respectively temporarily store data into the memory 6 every group to carry out error correction processing. Namely, the C1 decoder 23 carries out error correction processing in fragment units by using the error correction code C1. Moreover, the C2 decoder 24 carries out error correction processing by using the error correction code C2 of the data train corresponding to the track direction. Further, the C3 decoder 25 carries out error correction processing in fragment units by using the error correction code C3 with respect to the data train corresponding to the track width direction. The error corrected data thus obtained is delivered to an index separating circuit 26. The index separating circuit 26 separates index information from the error corrected data to deliver actual data to the interface section 1. Thus, the interface section 1 outputs this data to the external host computer.

The system controller 31 is comprised of, e.g., microcomputer for controlling the entirety of the apparatus, and serves to carry out signal processing at the time of recording/ at the time of reproduction, and/or control of tape traveling velocity of the magnetic tape 90 and rotational velocity of the rotary drum 50, etc. Moreover, a servo circuit 30 actually controls the tape traveling velocity and the rotational velocity of the rotary drum 50 on the basis of instruction from the system controller 31. This servo circuit 30 may be also constituted with, e.g., a microcomputer. It is to be noted that the servo circuit 30 and the system controller 31 may be constituted with a single microcomputer.

The rotary drum 50 is rotationally driven by the drum motor 33. At this rotary drum 50, a pulse generator (hereinafter referred to as drum PG), and a frequency generator (hereinafter referred to as drum FG) 37 are attached. Pulses from this drum PG 36 are delivered to the servo circuit 30 through an amplifier 38. In addition, pulses from the drum FG 37 are delivered to the servo circuit 30 through an amplifier 39.

The servo circuit 30 detects phase information of the rotary drum 50 on the basis of pulses from the drum PG 36 and the drum FG 37 to output a switching pulse (signal) for switching recording/reproduction heads having azimuth angles different from each other (hereinafter referred to as A azimuth head and B azimuth head), and to control the rotational velocity of the rotary drum 50. In more practical sense, the servo circuit 30 detects the number of rotations of the rotary drum 50 by pulses from the drum PG 36 or the drum FG 37 to compare it with the reference number of rotations to thereby obtain rotational error information. Then, the servo circuit 30 applies drive voltage corresponding to the rotational error information to the drum motor 33 through a drum motor driver 32 to thereby rotate the rotary drum 50 at a constant velocity.

Moreover, the servo circuit 30 controls the number of rotations of the capstan 28 to thereby provide (apply) the so-called tracking servo (control). In this embodiment, a timing ATF system as has been explained with reference to FIG. 3 of the background art is employed as the tracking servo control.

The capstan 28 is rotationally driven by the capstan motor 35. At this capstan 28, a frequency generator (hereinafter referred to as capstan FG) 40 is attached. Thus, pulses from this capstan FG 40 are delivered to the servo circuit 30 through an amplifier 41. The servo circuit 30 detects the number of rotations of the capstan 28 by pulses from the capstan FG 40 to compare it with the reference number of rotations to thereby obtain rotational error information. Then, the servo circuit 30 applies drive voltage corresponding to the rotational error information to the capstan motor 35 through a capstan motor driver 34 to thereby rotate the capstan motor 35 at a constant velocity, e.g., at the time of recording.

On the other hand, at the time of reproduction, the servo circuit 30 monitors, in order to provide (apply) tracking servo, reference phase position timing of the rotary drum 50 which can be detected from switching pulse and timing detection pulse TTP delivered from the timing detection pulse generating circuit 27 to measure time difference therebetween to allow this time difference to be tracking detection time. Then, the servo circuit 30 compares the measured tracking detection time and reference value set in advance to thereby obtain tracking error information to apply drive voltage corresponding to the tracking error information to the capstan motor 35 through the capstan motor driver 34 to thereby increase or decrease the rotational velocity of the capstan 28 to provide (apply) tracking servo.

Figure 12:
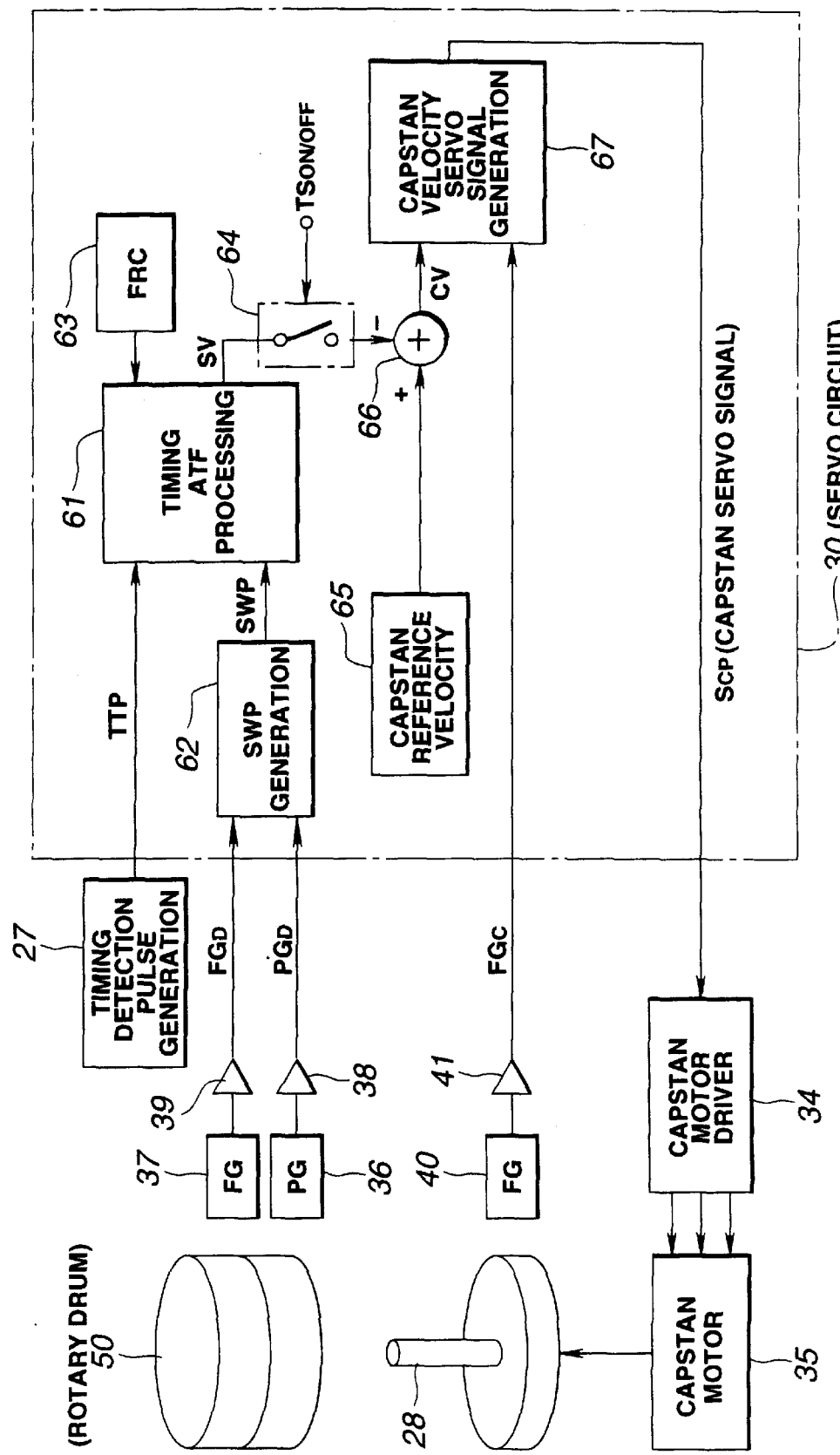
FIG. 12 is a block diagram showing a more practical configuration of servo circuit of capstan.

3. More practical configuration and operation of the servo circuit 30 for providing (applying) tracking servo by the timing ATF system The more practical configuration of the servo circuit 30 for carrying out tracking servo control by the timing ATF system is shown in FIG. 12. The servo circuit 30 comprises, as the circuitry for carrying out servo control of the capstan in the timing ATF system, a timing ATF processing section 61, a switching pulse (SWP) generating section 62, a free running counter 63, a servo switch 64, a capstan reference velocity generating section 65, a subtracter 66, and a velocity servo signal generating section 67.

In the case where, e.g., at the time of recording, the tracking servo is caused to be in OFF state and the capstan 28 is rotationally driven at a constant velocity, the servo switch 64 is turned OFF by servo ON/OFF control signal $TS_{ON/OFF}$ delivered from the system controller 31. In this case, the capstan reference velocity generating section 65 generates a signal corresponding to a velocity desired to be set as the rotational velocity of the capstan 28 to deliver it to the velocity servo signal generating section 67 as target velocity signal CV through the subtracter 66 as it is. Moreover, this velocity servo signal generating section 67 is supplied with pulse FGc, i.e., pulse of frequency (signal) corresponding to the rotational velocity of the capstan 28 from the capstan FG40. The velocity servo signal generating section 67 detects the current rotational velocity of the capstan 28 from the above-mentioned pulse FGc.

Further, the velocity servo signal generating section 67 compares current rotational velocity detected from the pulse FGc and target velocity signal CV indicating the target rotational velocity to deliver its error to the capstan motor driver 34 as a capstan servo signal $S_{cp}$. The capstan motor driver 34 drives the capstan motor 35, e.g., by three phase drive currents to rotate the capstan 28, i.e., control the drive voltage with respect to the capstan motor 35 on the basis of the capstan servo signal $S_{cp}$ to thereby carry out servo control such that the rotational velocity of the capstan 28 is converged into the target velocity signal CV generated from the capstan reference velocity generating section 65.

Accordingly, when the target velocity signal CV generated from the capstan reference velocity generating section 65 is assumed to be a signal at a tape traveling velocity at the time of ordinary recording/reproduction (hereinafter referred to as velocity of one time), the capstan 28 is rotated at a constant velocity of velocity of one time. When the target velocity signal CV is assumed to be double velocity, the capstan 28 is rotated at a constant velocity of double velocity. Namely, the target velocity signal CV generated from the capstan reference velocity generating section 65 is varied, thereby making it possible to change the tape traveling velocity. The system controller 31 controls target velocity signal CV generated at the capstan reference velocity generating section 65 in dependency upon the operating state at that time. For example, the tape traveling velocity can be changed in such a manner that the target velocity signal CV is caused to be the velocity of one time at the time of reproduction and is caused to be the multiple velocity of x at the time of tape fast feed reproduction.

On the other hand, in the case where the tracking control is carried out at the time of reproduction, the servo switch 64 is caused to be turned ON. Then, the timing ATF processing section 61 detects tracking error on the basis of timing detection pulse TTP from the timing detection pulse generating circuit 27 and switching pulse SWP generated at the switching pulse generating section 62 to deliver this tracking error to the subtracter 66. The subtracter 66 subtracts its error from the value generated at the capstan reference velocity generating section 65 to thereby generate target velocity signal CV. Namely, in this case, the target velocity signal CV is increased or decreased in accordance with tracking error with a predetermined velocity (e.g., velocity of one time) being as the center. Accordingly, the tape traveling velocity is accelerated/decelerated with the predetermined velocity being as the center in dependency upon the tracking state, whereby it is converged into just the tracking state. Since the tracking error becomes equal to substantially zero when tracking is stable, the tape traveling velocity becomes equal to, e.g., a substantially predetermined velocity.

Figure 6:
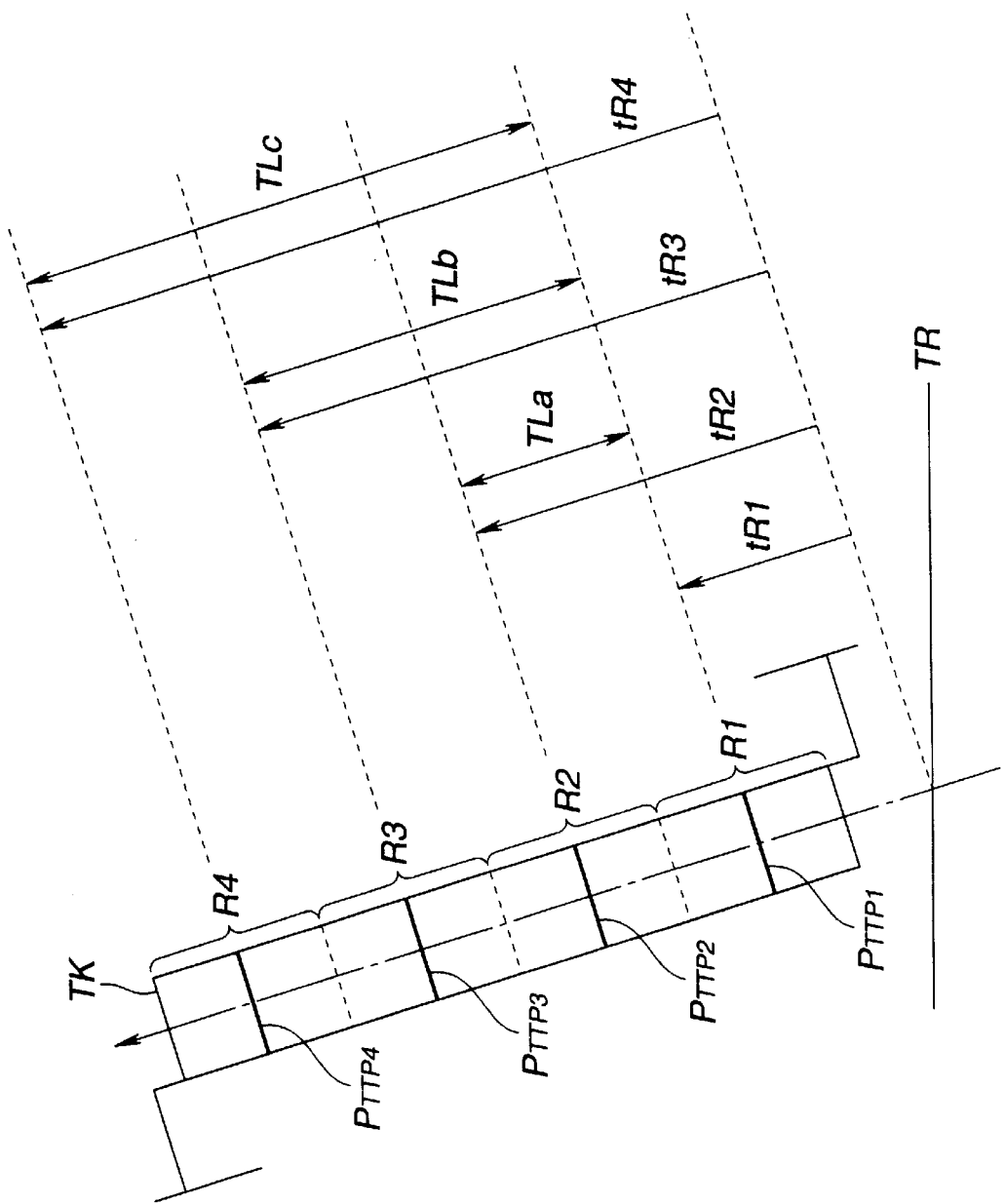
FIG. 6 is a view for explaining the principle of the timing ATF system in the case where plural recording areas are provided.

Namely, as shown in FIG. 10, the timing detection pulse generating circuit 27 generates timing detection pulse TTP from data, in which the header parity check has been completely delivered from the header parity check circuit 21. This timing detection pulse TTP is a signal for detecting the tracking phase state, e.g., pulse detected from a specific position on the track indicated by position $P_{TTP}$ in FIG. 3 which has been described in the background art, for example. In more practical sense, in this embodiment, as shown in FIG. 6, for example, one track TK is divided into, e.g., four recording areas (or blocks) R1~R4 to record in advance block synchronizing signals at predetermined positions of respective recording areas R1~R4, e.g., at positions $P_{TTP}1$~$P_{TTP}4$. The timing detection pulse generating circuit 27 generates timing detection pulse TTP on the basis of block synchronizing signals corresponding to positions $P_{TTP}1$~$P_{TTP}4$ of data which has been read out from the magnetic tape 90. It is to be noted that, as in the block synchronizing signal, as shown in FIG. 9, for example, there may be used synchronizing signals or fragment addresses, etc. included in the leading fragments of respective four blocks obtained by dividing 96 fragments. The example using such fragment address as the block synchronizing signal will now be described with reference to FIG. 13.

In FIG. 13, FIG. 13(a) indicates pulse $FG_D$ generated from the drum FG 37, and FIG. 13(b) indicates pulse $PG_D$ generated from the drum PG 36. Moreover, FIG. 13(d) indicates waveform of RF signals which have been read out from the inclined tracks $TK_A$, $TK_B$, and FIG. 13(e) indicates timing detection pulse TTP.

In this case, as shown in FIG. 13(e), for example, the timing detection pulse generating circuit 27 monitors fragment addresses corresponding to certain specific positions $P_{TTP}1$~$P_{TTP}4$ on the track TK to generate timing detection pulse TTP when corresponding fragment address is detected. Namely, the timing detection pulse generating circuit 27 is operative in reproduction to output four timing detection pulses TTP every scanning of one track in accordance with the timings at which the reproduction heads 16A, 16B scan specific positions $P_{TTP}1$~$P_{TTP}4$ of the tracks $TK_A$, $TK_B$. In this case, timing detection pulses corresponding to positions $P_{TTP}1$~$P_{TTP}4$ at track scanned by the A azimuth head (hereinafter simply referred to as A azimuth track) $TK_A$ are assumed to be $AP_{TTP}1$~$AP_{TTP}4$, and timing detection pulses corresponding to positions $P_{TTP}1$~$P_{TTP}4$ at track scanned by the B azimuth head (hereinafter simply referred to as B azimuth track) are assumed to be $BP_{TTP}1$~$BP_{TTP}4$.

On the other hand, pulse $FG_D$ and pulse $PG_D$ are both pulse (signal) of frequency corresponding to the rotational velocity of the rotary drum 50, and pulse $PG_D$ is pulse generated in correspondence with a specific rotational phase position of the rotary drum 50. As shown in FIG. 13(c), the switching pulse generating section 62 generates switching pulse SWP of which period is one rotation of the rotary drum 50 by using these pulses $FG_D$, $PG_D$ to deliver it to the timing ATF processing section 61. In more practical sense, the switching pulse generating section 62 generates switching pulse SWP of which edge falls, e.g., at a timing in which a predetermined delay time DL is added to the time point in which rising of the subsequent pulse $FG_D$ of the pulse $FG_D$ synchronous with the pulse $PG_D$ is caused to be reference to deliver it to the timing ATF processing section 61. This switching pulse SWP is a signal serving as reference for carrying out switching between the reproduction head 16A of the A channel and the reproduction head 16B of the B channel, and is delivered also to other various circuits which are not shown in FIG. 12.

The time period during which the switching pulse SWP is at "L" level is the time period during which data reproduced by the reproduction head 16A is processed. For this time period, scanning of the reproduction head 16A with respect to the inclined track $TK_A$ is carried out. Thus, as shown in FIG. 13(d), a reproduction signal (RF signal) obtained as the result of the fact that the reproduction head 16A scans the inclined track $TK_A$ can be obtained. On the other hand, the time period during which the switching pulse SWP is at "H" level is the time period during which data reproduced by the reproduction head 16B is processed. For this time period, scanning of the reproduction head 16B with respect to the inclined track $TK_B$ is carried out. Thus, as shown in FIG. 13(d), a reproduction signal resulting from the fact that the reproduction head 16B scans the inclined track $TK_B$ can be obtained.

The timing ATF processing section 61 allows the falling timing of the switching pulse SWP to be reference phase position of the rotary drum serving as reference of the timing ATF operation with respect to the inclined track $TK_A$. Namely, this timing corresponds to the timing $TR_A$ which has been explained with reference to FIG. 3 of the background art. Further, the timing ATF processing section 61 measures tracking detection time $M_{TTP}(A)$ which is the time from this timing $TR_A$ up to the time point when the timing detection pulse TTP is inputted. Namely, the timing ATF processing section 61 measures time from the timing of the reference phase position of the rotary drum up to the time point when the reproduction head 16A detects, e.g., fragment address recorded at a predetermined position on the track. It is to be noted that while tracking detection time $M_{TTP}(A)$ from the timing of the reference phase position of the rotary drum up to the first timing detection pulse TTP corresponding to the position $P_{TTP}1$ is shown in FIG. 13(e), the timing ATF processing section 61 measures time from timing of the reference phase position of the rotary drum also with respect to other timing detection pulses TTP (second timing detection pulse TTP and pulses subsequent thereto) to subtract, from this time, times up to the first timing detection pulse TTP to measure tracking detection times $M_{TTP}(A)$ corresponding to other positions $P_{TTP}2$, $P_{TTP}3$, $P_{TTP}4$.

While, in this embodiment, respective four timing detection pulses TTP are utilized in setting the reference value which will be described later, an approach may be employed at the time of reproduction to measure tracking detection time $M_{TTP}(A)$ by utilizing one of these pulses to compare it with the reference value to thereby detect tracking error information, or to respectively measure tracking detection times $M_{TTP}(A)$ by utilizing respective two~four timing detection pulses TTP to compare them with the reference value to thereby detect tracking error information. As stated above, this invention is not limited to the embodiment in which four timing detection pulses TTP are utilized.

The timing ATF processing section 61 measures the tracking detection time $M_{TTP}(A)$ by using the free running counter 63. Namely, the timing ATF processing section 61 latches count value of the free running counter 63, e.g., at falling timing $TR_A$ of switching pulse SWP delivered from the switching pulse generating section 62, and latches count value of the free running counter 63 at input timing of the timing detection pulse TTP. Then, the timing ATF processing section 61 determines the difference between these two count values (with respect to the second timing detection pulse TTP and pulses subsequent thereto, further determines time differences between those detection pulses and the first timing detection pulse TTP) to thereby measure tracking detection time $M_{TTP}(A)$. Then, the timing ATF processing section 61 compares the tracking detection time $M_{TTP}(A)$ thus determined with reference value set in advance (reference value for inclined track $TK_A$) to determine the difference therebetween to allow this difference to be tracking error information with respect to the inclined track $TK_A$.

Moreover, with respect to the inclined track $TK_B$, the timing ATF processing section 61 allows the rising timing of the switching pulse SWP to be reference phase position of the rotary drum serving as reference of the timing ATF operation. Then, the timing ATF processing section 61 measures, similarly by using the free running counter 63, the tracking detection time $M_{TTP}(B)$ which is the time from the timing $TR_B$ corresponding to the reference phase position up to the time point when the timing detection pulse TTP is inputted. Then, the timing ATF processing section 61 compares measured value of the tracking detection time $M_{TTP}(B)$ thus determined with reference value set in advance (reference value for inclined track $TK_B$) to determine its difference to allow this difference to be tracking error information with respect to the inclined track $TK_B$.

Figure 1:
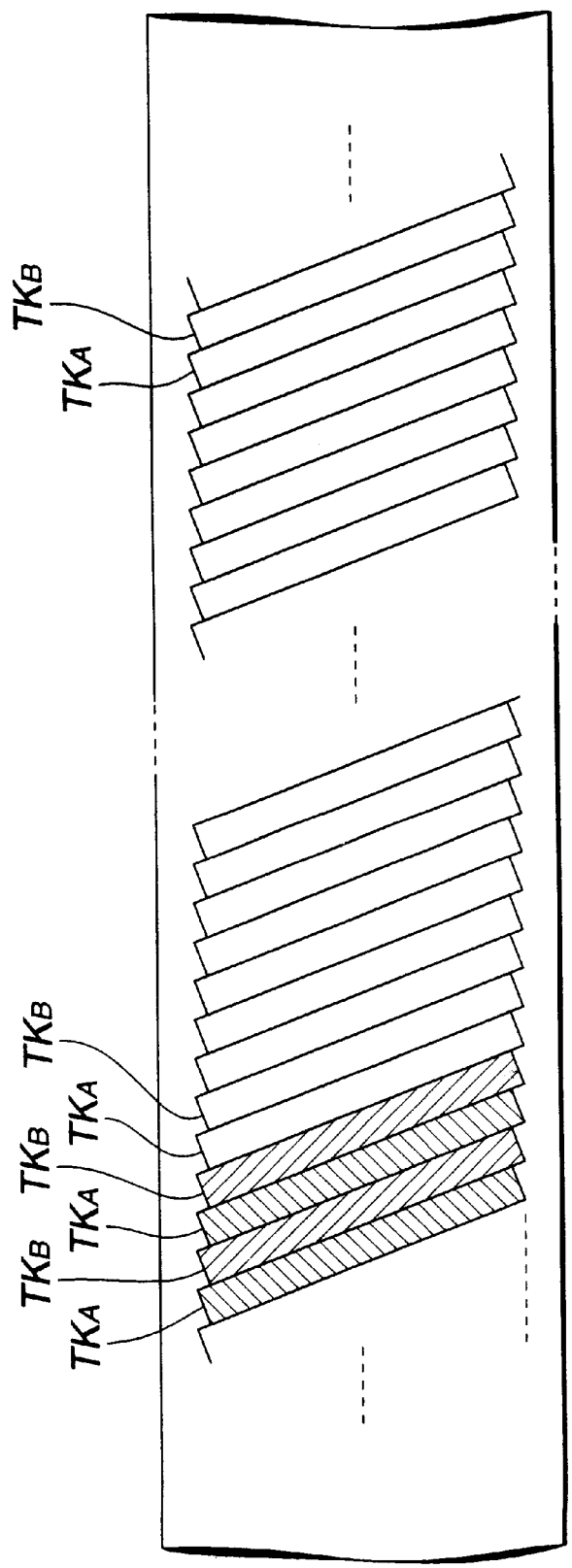
FIG. 1 is a view showing format of tracks formed by the helical scan system.
Figure 2:
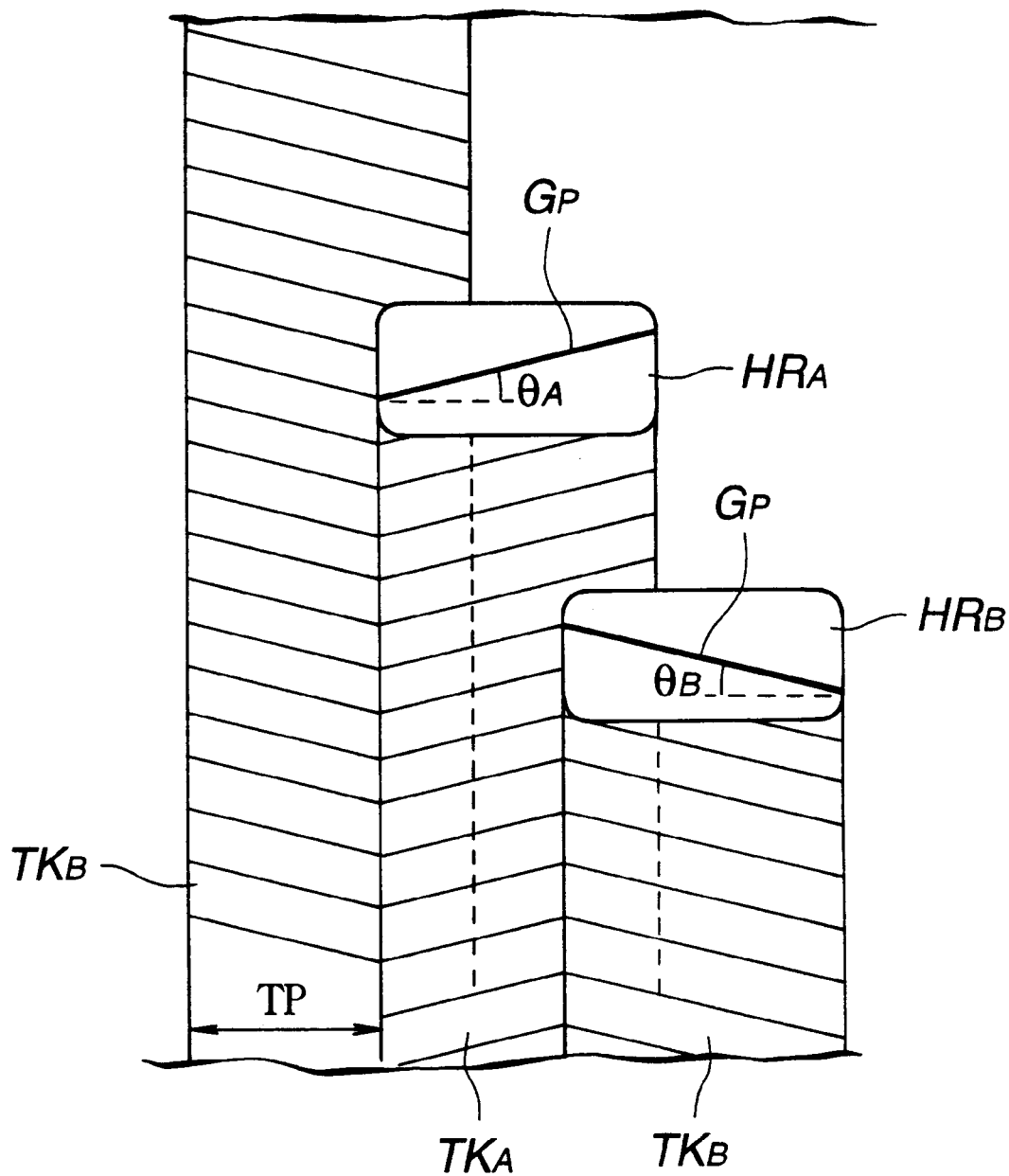
FIG. 2 is a view for explaining the principle of azimuth recording in which there is no guard band.
Figure 3:
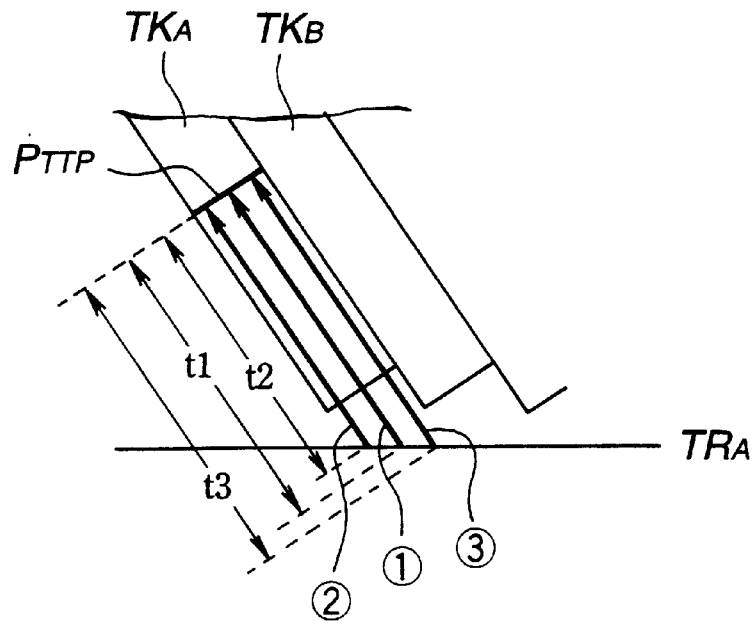
FIG. 3 is a view for explaining the principle of the timing ATF system.

As has been explained also in FIG. 3, in this digital data storage, tracking error information obtained in this way is inputted to the subtracter 66 to reflect it with respect to the target velocity signal CV to control the rotational velocity of the capstan 28 to thereby adjust relative velocity between the drum rotational velocity and the tape traveling velocity so that satisfactory tracking state can be obtained.

4. First embodiment of reference value setting scheme

Meanwhile, in order to satisfactorily carry out tracking servo control based on such a timing ATF system, the above-described reference value must be set to reasonable value.

Figure 4:
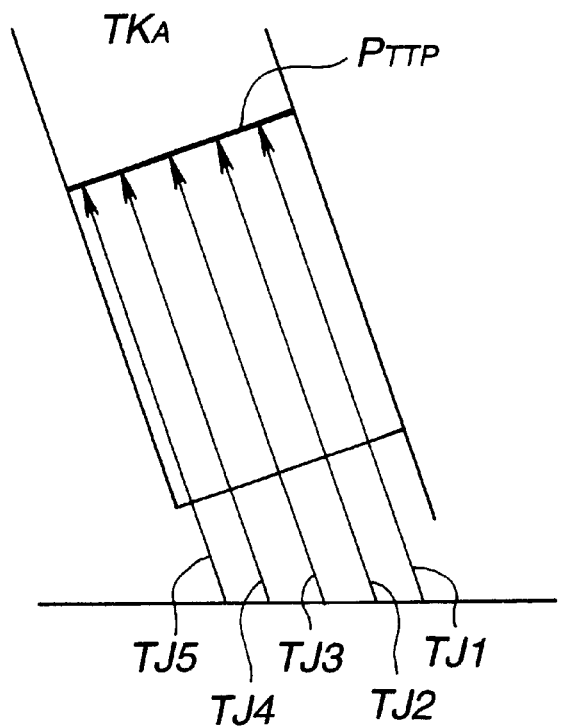
FIG. 4 is a view for explaining the operation to set reference value for tracking servo control based on the timing ATF system.
Figure 5C:
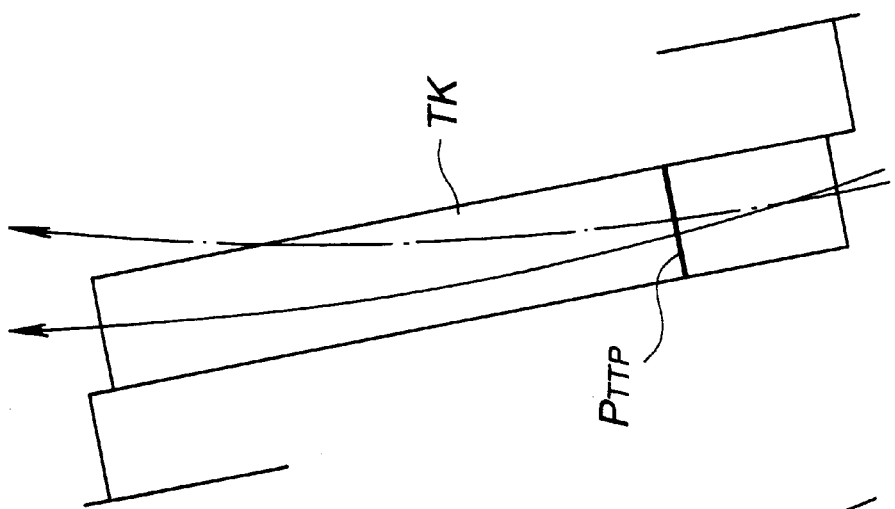
FIG. 5 is a view showing the relationship between various tracks and scanning loci.
Figure 5B:
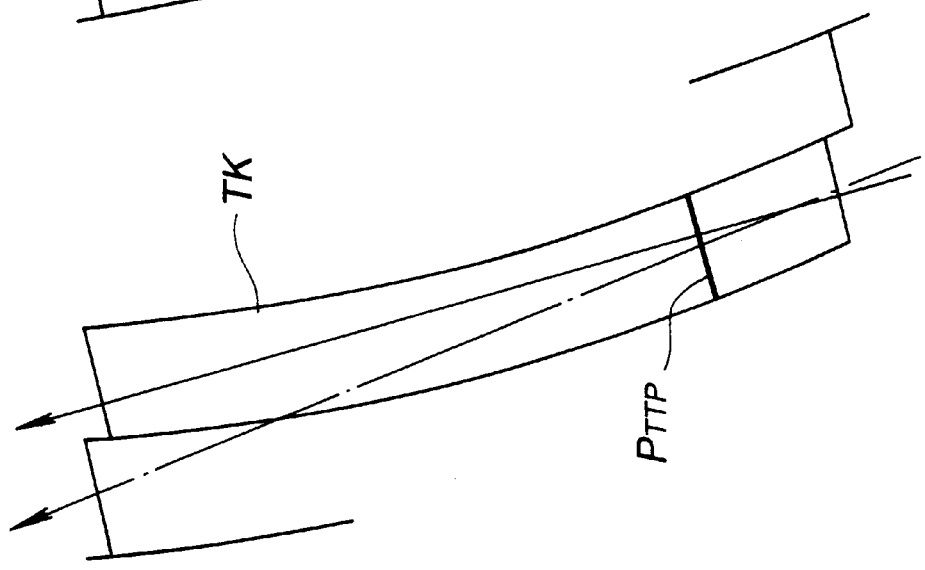
Figure 5A:
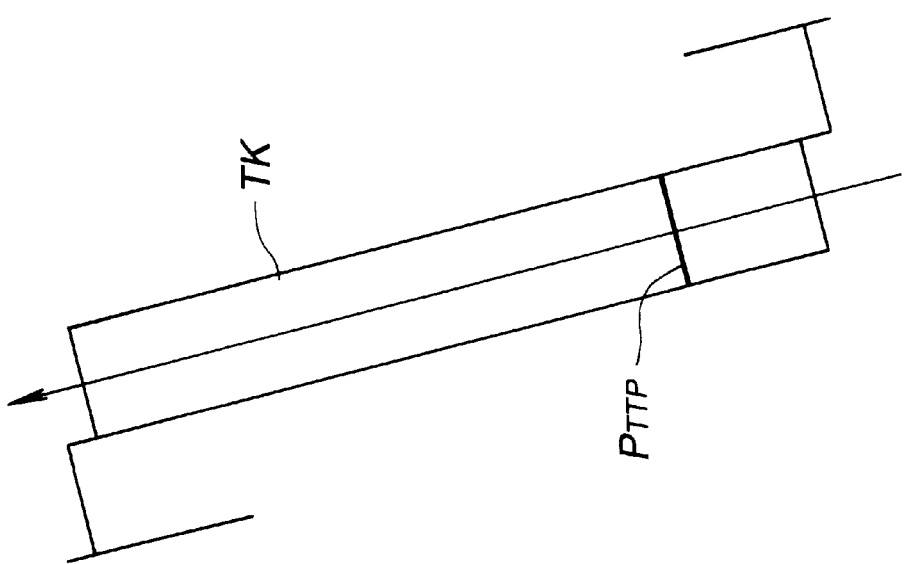

As has been explained with reference to FIG. 4 of the background art, the reference value can be essentially determined by totaling (calculating) tracking detection times detected in scanning in various tracking phase states to determine its average value. However, the reference value is required to have such a value capable of coping with the state as in FIGS. 5(b), 5(c) shown in the background art. In view of this, in this embodiment, the reference value is set by such an operation which will be described below.

In setting the reference value, a necessary number of scanning operations of the reproduction head in various tracking phase states are carried out to some degree to determine tracking detection times $M_{TTP}(A)$, $M_{TTP}(B)$ respectively corresponding to various inclined tracks $TK_A$, $TK_B$. In this embodiment, since four timing detection pulses TTP are obtained per each track, four tracking detection times $M_{TTP}(A)$, $M_{TTP}(B)$ are measured per each track.

Figure 14:
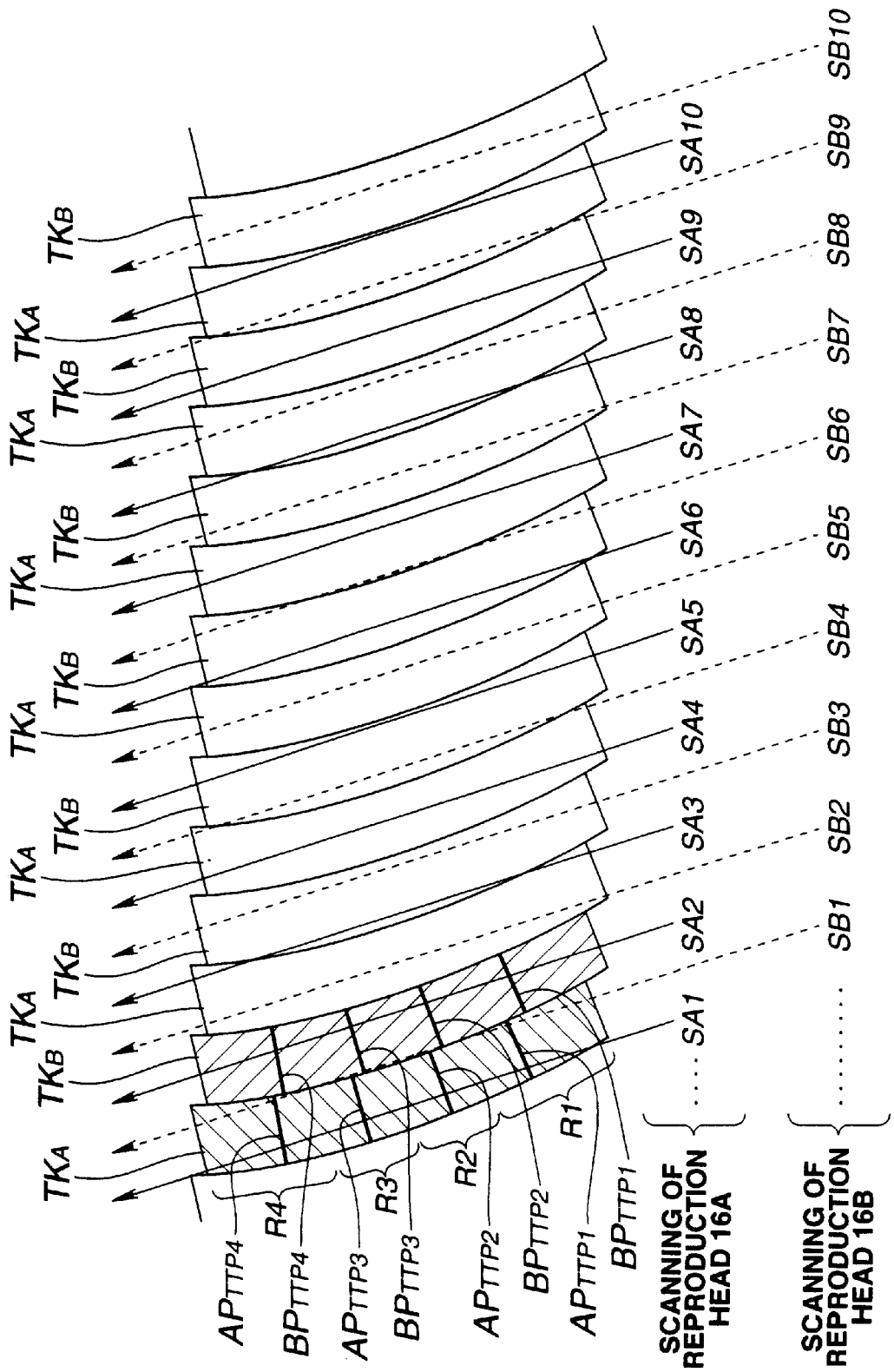
FIG. 14 is a view for explaining setting operation for the reference value.

In setting reference value, as shown in FIG. 14, four example, scanning by the reproduction head 16 (hereinafter simply referred to as reproduction scanning) is repeatedly carried out. Namely, the tracking servo is caused to be in OFF state (the servo switch 64 is caused to be in OFF state) and, e.g., the tape traveling velocity is caused to be velocity different from the velocity in the ordinary reproduction operation (velocity of one time), thus to carry out reproduction scanning by the reproduction heads 16A, 16B. Meanwhile, when the tape traveling velocity is velocity of one time, the scanning phase position of the reproduction head 16A changes by 360 degrees every scanning. Namely, in the case where, e.g., the reproduction head 16A scans the center of a certain A azimuth track $TK_A$, the reproduction head 16A subsequently scans the center (the same tracking phase) of the next A azimuth track $TK_B$ through the B azimuth track $TK_B$. This similarly applies to the reproduction head 16B. Accordingly, when the tape traveling velocity is set to velocity different from velocity of one time to carry out reproduction scanning by the reproduction heads 16A, 16B, tracking phase deviates (shifts) every scanning as shown in FIG. 14, for example. As a result, tracking detection times $M_{TTP}(A)$, $M_{TTP}(B)$ in various tracking phase states are obtained. In this example, SA1~SA10 . . . indicated by solid lines indicate various scanning loci of the reproduction head 16A in various tracking phase states, and SB1~SB10 . . . indicated by broken lines indicate various scanning loci of the reproduction head 16B in various tracking phase states.

Moreover, in respective scanning operations, timing detection pulses TTP are respectively detected at positions $AP_{TTP}1~AP_{TTP}4$ with respect to the A azimuth track $TK_A$ in correspondence with respective recording areas R1~R4 on the track TK. Further, with respect to the B azimuth track $TK_B$, timing detection pulses TTP are respectively detected at positions $BP_{TTP}1~BP_{TTP}4$. Thus, with respect to respective tracks, tracking detection times $M_{TTP}(A)$, $M_{TTP}(B)$ respectively corresponding to four recording areas R1~R4 are obtained.

It is to be noted that when the reproduction head 16A scans in the tracking phase state greatly deviating from the A azimuth track $TK_A$, e.g., when it scans the portion in the vicinity of center of the B azimuth track $TK_B$, timing detection pulse TTP cannot be obtained. Similarly, when the reproduction 16B scans in the tracking phase state greatly deviating from the B azimuth track $TK_B$, the timing detection pulse TTP cannot be obtained.

When the reproduction heads 16A, 16B respectively scan corresponding inclined tracks $TK_A$, $TK_B$, four timing detection pulses TTP are essentially detected by the scanning. However, these four timing detection pulses TTP can be obtained only when the relationship between the scanning locus of the reproduction head and linearity of track is in ideal state (or the track TK and the scanning locus are curved by the same curvature so that there results the state where the linear relationship is in ideal state when equivalently viewed).

For example, in the more practical example shown in FIG. 14, the inclined tracks $TK_A$, $TK_B$ are curved, but it cannot be said that there results the ideal state because the scanning locus of the reproduction head is assumed to be linear.

In order to have ability of also coping with such a case, in calculation of the reference value of this embodiment, an approach is employed to determine, at every respective recording area, average values of plural tracking detection times obtained in the respective recording areas R1~R4 to detect the maximum value and the minimum value of the average values of the respective recording areas to further allow average value of the maximum value and the minimum value to be the reference value.

Figure 15:
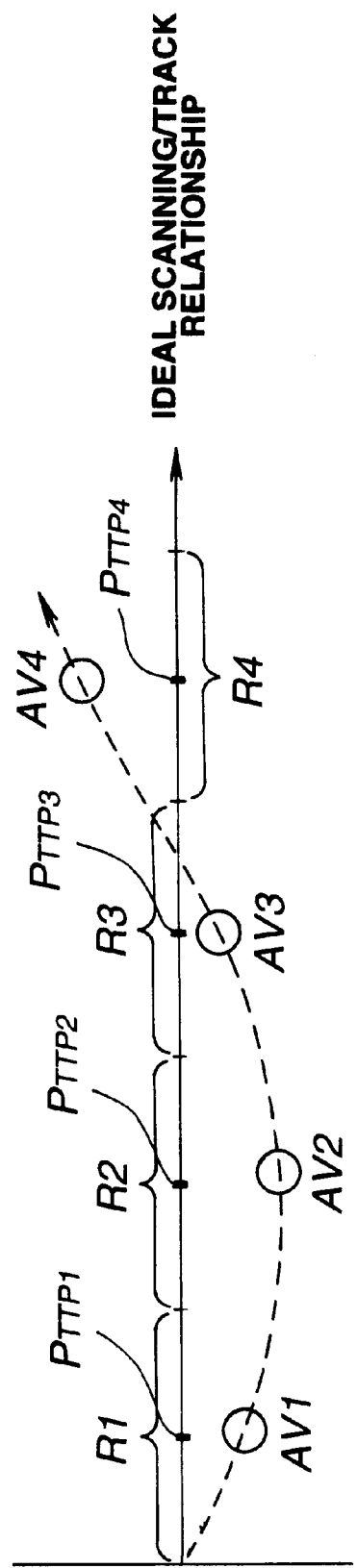
FIG. 15 is a view for explaining the principle of calculation of the reference value.

The principle of the calculation of the reference value is shown in FIG. 15. In this FIG. 15, the state where the relationship between the track and the scanning locus is in ideal state is indicated as a linear line of the abscissa. Meanwhile, in actual scanning, the relationship between the track and the scanning locus deviates from the ideal state as indicated by broken lines.

Figure 16:
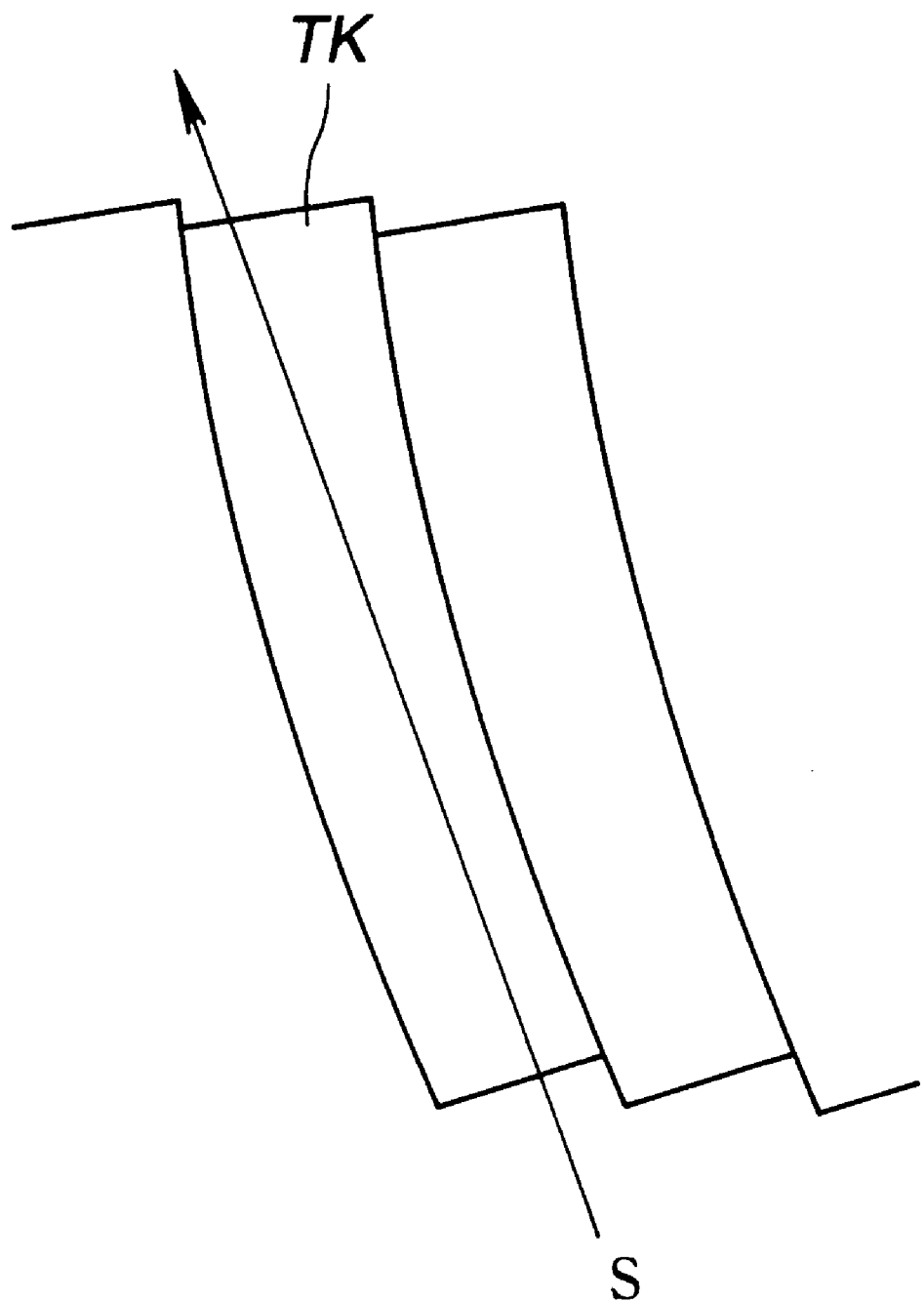
FIG. 16 is a view showing tracking state using the reference value based on this invention.

For example, when scanning as shown in FIG. 14 is carried out to total (calculate) plural tracking detection times to determine average values of the tracking detection times in respective recording areas, average values AV1~AV4 indicated by circle ○ on broken lines are obtained as shown in FIG. 15. In this case, the maximum value and the minimum value of the average values AV1~AV4 are respectively average value AV2 and average value AV4. Further, when an average value of these average values AV2, AV4 is determined, its value is suitable (reasonable) reference value capable of obtaining substantially allowable (tolerable) tracking states in the entire area of the track TK in the relationship between the curved track TK and the linear scanning locus as shown in FIG. 14. Namely, this average value is caused to be reference value, thereby making it possible to provide (apply) tracking servo so that scanning locus S as shown in FIG. 16 can be obtained with respect to the relationship between the track TK and the scanning locus which is not ideal state. Thus, suitable (reasonable) reproduction operation can be carried out over the entire area of the track TK. As a result, it can be also avoided that the error rate is partially deteriorated.

The operation for setting such reference value will now be described in more practical sense.

Figure 17:
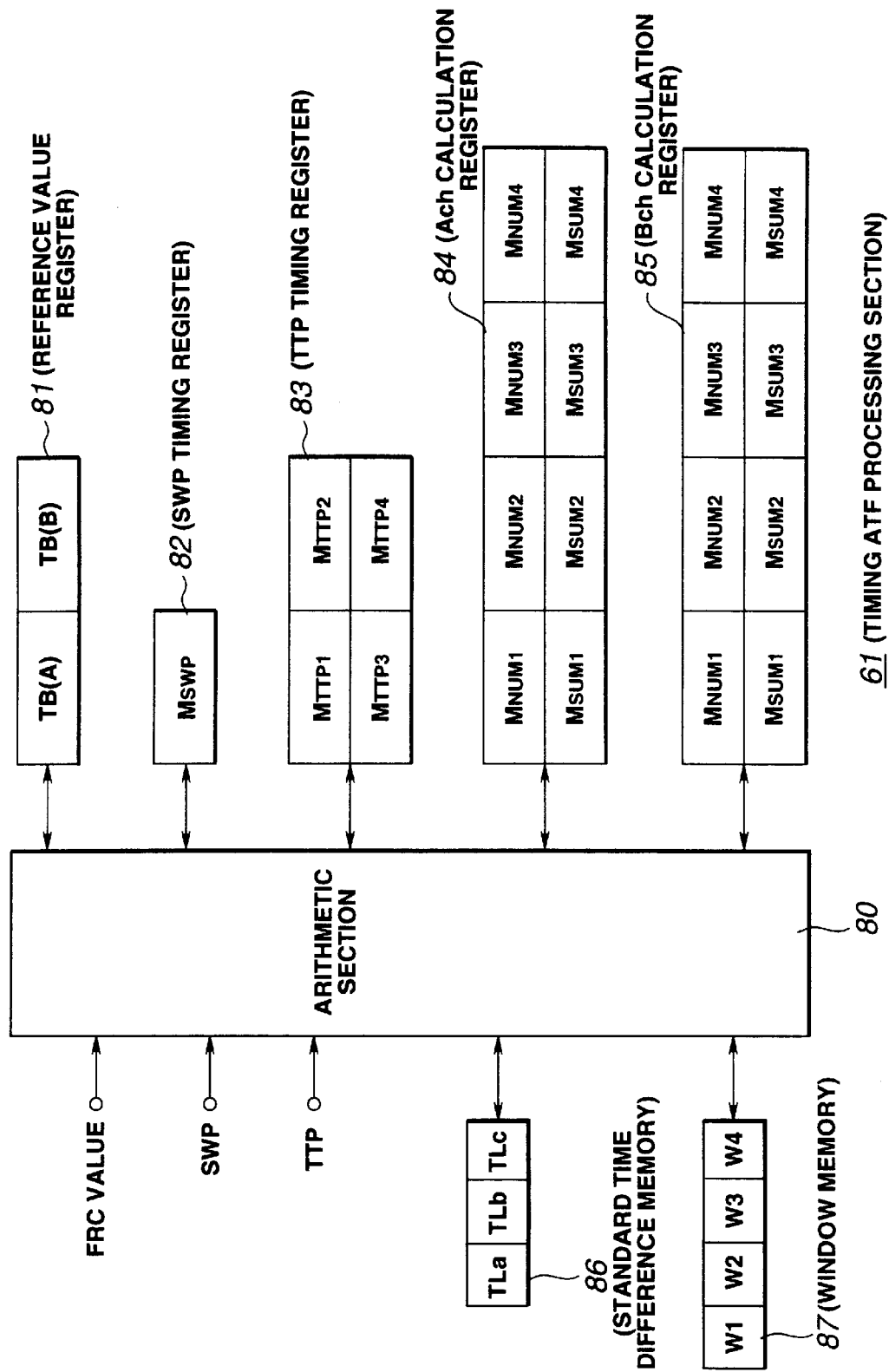
FIG. 17 is a block diagram showing a more practical configuration of timing ATF processing section.

The timing ATF processing section 61 of the servo circuit 30 calculates the reference value by using timing detection pulse TTP and switching pulse SWP obtained for a time period during which reproduction operation for setting reference value as shown in FIG. 14 is carried out. FIG. 17 is a block diagram showing a more practical configuration of the timing ATF processing section 61.

The timing ATF processing section 61 comprises, as shown in FIG. 17, an arithmetic (computing) section 80 for carrying out arithmetic (computational) processing which will be described later on the basis of timing detection pulse TTP and switching pulse SWP inputted thereto, and various registers 81, 82, 83, 84, 85, 86, 87 for this arithmetic (computational) processing. This arithmetic section 80 is supplied with timing detection pulse TTP from the timing detection pulse generating circuit 27 and switching pulse SWP from the switching pulse generating section 62. In addition, the arithmetic section 80 is supplied with count value of the free running counter 63 (hereinafter referred to as FRC value) for detecting timings of these pulses.

The reference value register 81 holds reference value TB(A) with respect to the A azimuth track $TK_A$ and reference value TB(B) with respect to the B azimuth track $TK_B$ of the tracking servo based on the timing ATF system. Namely, the reference value register 81 is a register for holding reference values TB(A), TB(B) set by the operation for setting the reference value which will be described later so that these reference values TB(A), TB(B) are used in the subsequent tracking servo control based on the timing ATF system.

The SWP timing register 82 is a register for holding count value of the free running counter 63 at the time point when edges (rising and falling) of the switching pulse SWP are detected.

The TTP timing register 83 is a register for holding value of tracking detection time obtained from count value of the free running counter 63 at the time point when the timing detection pulse TTP is inputted. Since the timing detection pulse TTP is inputted four times at the maximum in scanning of one track, the TTP timing register 83 includes an area for storing values of tracking detection times measured by timing detection pulses TTP corresponding to respective recording areas R1~R4, and holds tracking detection times $M_{TTP}1$~$M_{TTP}4$ corresponding to the four recording areas R1~R4. The SWP timing register 82 and the TTP timing register 83 are cleared every scanning of one track and are repeatedly used.

The A channel calculation register 84 is a register to hold data for calculating reference value TB(A) corresponding to the A azimuth track $TK_A$ (reproduction head 16A). These data are accumulated values $M_{SUM}1$~$M_{SUM}4$ obtained by totaling (calculating), at every respective recording area R1~R4, tracking detection times $M_{TTP}1$~$M_{TTP}4$ measured on the basis of timing detection pulse TTP obtained from the A azimuth track $TK_A$, and addition number values $M_{NUM}1$~$M_{NUM}4$ indicating the numbers of tracking detection times $M_{TTP}1$~$M_{TTP}4$ totaled (calculated) for obtaining respective accumulated values $M_{SUM}1$~$M_{SUM}4$.

The B channel calculation register 85 is a register to hold data for calculating reference value TB(B) corresponding to the B azimuth track $TK_A$ (reproduction head 16B). As data, similarly to the A channel calculation register 84, there are accumulated values $M_{SUM}1$~$M_{SUM}4$ and addition number values $M_{NUM}$~$M_{NUM}4$.

The standard time difference memory 86 is a memory in which there are stored standard time differences TLa, TLb, TLc for correcting time differences at positions $P_{TTP}1$~$P_{TTP}4$ from block synchronizing signals at positions $P_{TTP}1$~$P_{TTP}4$ ($AP_{TTP}1$~$AP_{TTP}4$ and $BP_{TTP}1$~$BP_{TTP}4$) in the respective recording areas R1~R4, e.g., timing detection pulse TTP obtained from fragment address to respectively obtain tracking detection times. These standard times differences TLa, TLb, TLc are, i.e., time values of the time period of the standard time differences TLa, TLb, TLc shown in FIG. 6. By making correction by these standard time differences TLa, TLb, TLc with respect to timings at which timing detection pulses TTP at respective positions $P_{TTP}1$~$P_{TTP}4$ are obtained, tracking detection times which take the same value can be obtained when ideally viewed irrespective of positions $P_{TTP}1$~$P_{TTP}4$ at which respective timing detection pulses TTP are obtained.

With respect to the position $P_{TTP}1$, time tR1 from the time point of reference phase position TR to the time point when timing detection pulse is obtained at position $P_{TTP}1$ is measured to allow this time to be tracking detection time. With respect to the position $P_{TTP}2$, time tR2 from the time point of the reference phase position TR to the time point when timing detection pulse is obtained at the position $P_{TTP}2$ is measured to allow value obtained by subtracting the standard time difference TLa from this time tR2 to be tracking detection time. This standard time difference TLa is the standard time required for scanning from the position $P_{TTP}1$ to the position $P_{TTP}2$. With respect to the position $P_{TTP}3$, time tR3 from the time point of the reference phase position TR to the time point when the timing detection pulse is obtained at the position $P_{TTP}3$ is measured to allow value obtained by subtracting the standard time difference TLb from this time tR3 to be tracking detection time. This standard time difference TLb is the standard time required for scanning from the position $P_{TTP}1$ to the position $P_{TTP}3$. With respect to the position $P_{TTP}4$, time tR4 from the time point of the reference phase position TR to the time point when timing detection pulse is obtained at the position $P_{TTP}4$ is measured to allow value obtained by subtracting the standard time difference TLc from this time tR4 to be tracking detection time. This standard time difference TLc is the standard time required for scanning from the position $P_{TTP}1$ to the position $P_{TTP}4$.

Figure 18:
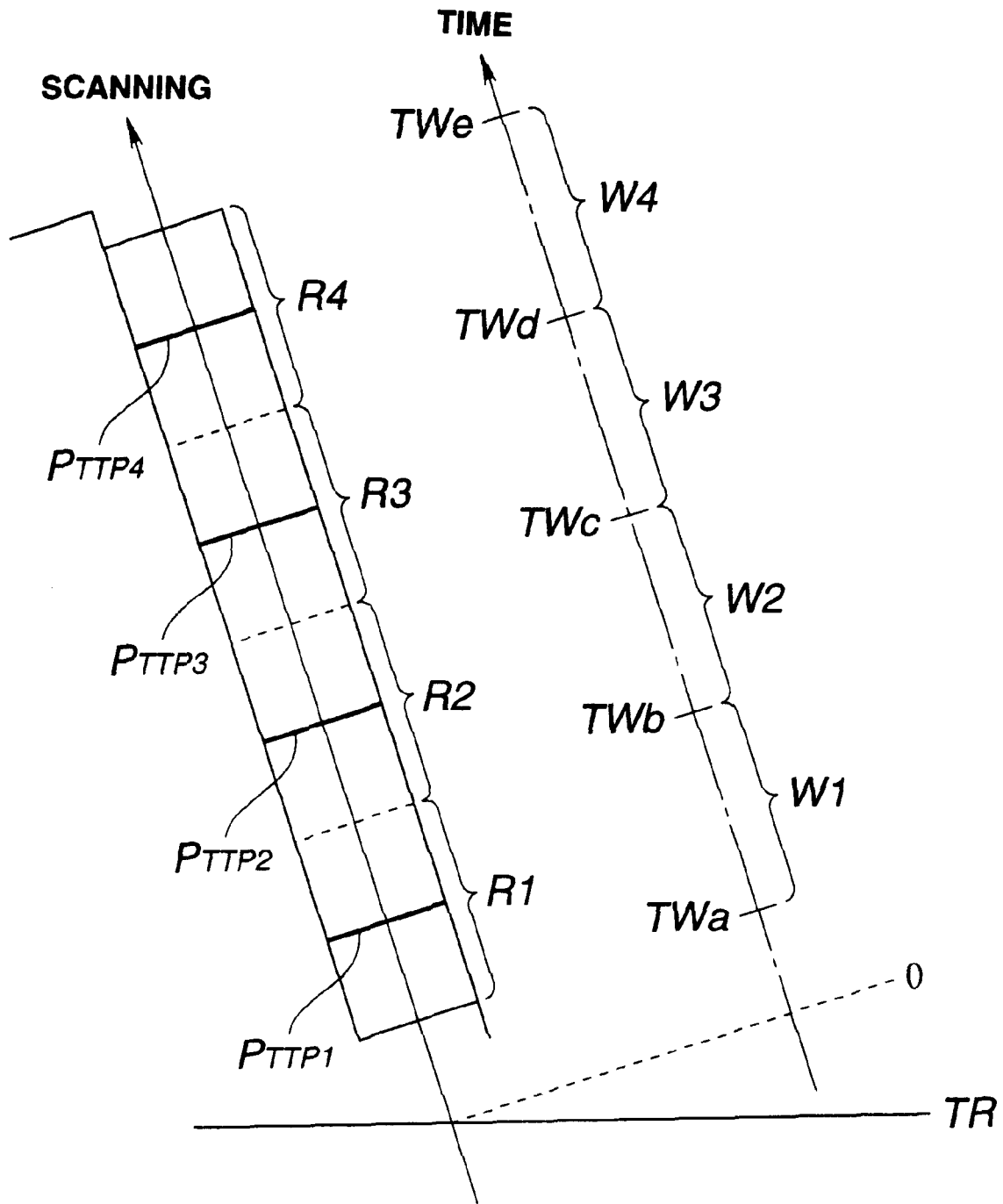
FIG. 18 is a view for explaining windows used for setting the reference value.

The window memory 87 is a memory for holding window values W1, W2, W3, W4 for discriminating between recording areas where respective timing detection pulses TTP generated from the timing detection pulse generating circuit 27 are obtained. For example, as shown in FIG. 18, timings at which the boundary portions of the respective recording areas R1~R4 are scanned are assumed to be respectively TWb, TWc, TWd with the timing of the reference phase position TR of the rotary drum 50 being as reference, the leading timing of the recording area R1 is assumed to be TWa, and the timing of the termination of the recording area R4 is assumed to be TWe. At this time, the window value W1 is the time period from the timing TWa to the timing TWb, the window value W2 is the time period from the timing TWb to the timing TWc, the window value W3 is the time period from the timing TWc to the timing TWd, and the window value W4 is the time period from the timing TWd to the timing TWe. When these window values W1~W4 and the timing at which the timing detection pulses TTP are inputted and compared with each other, it is possible to discriminate the recording area from which corresponding timing detection pulse TTP is obtained.

Figure 19:
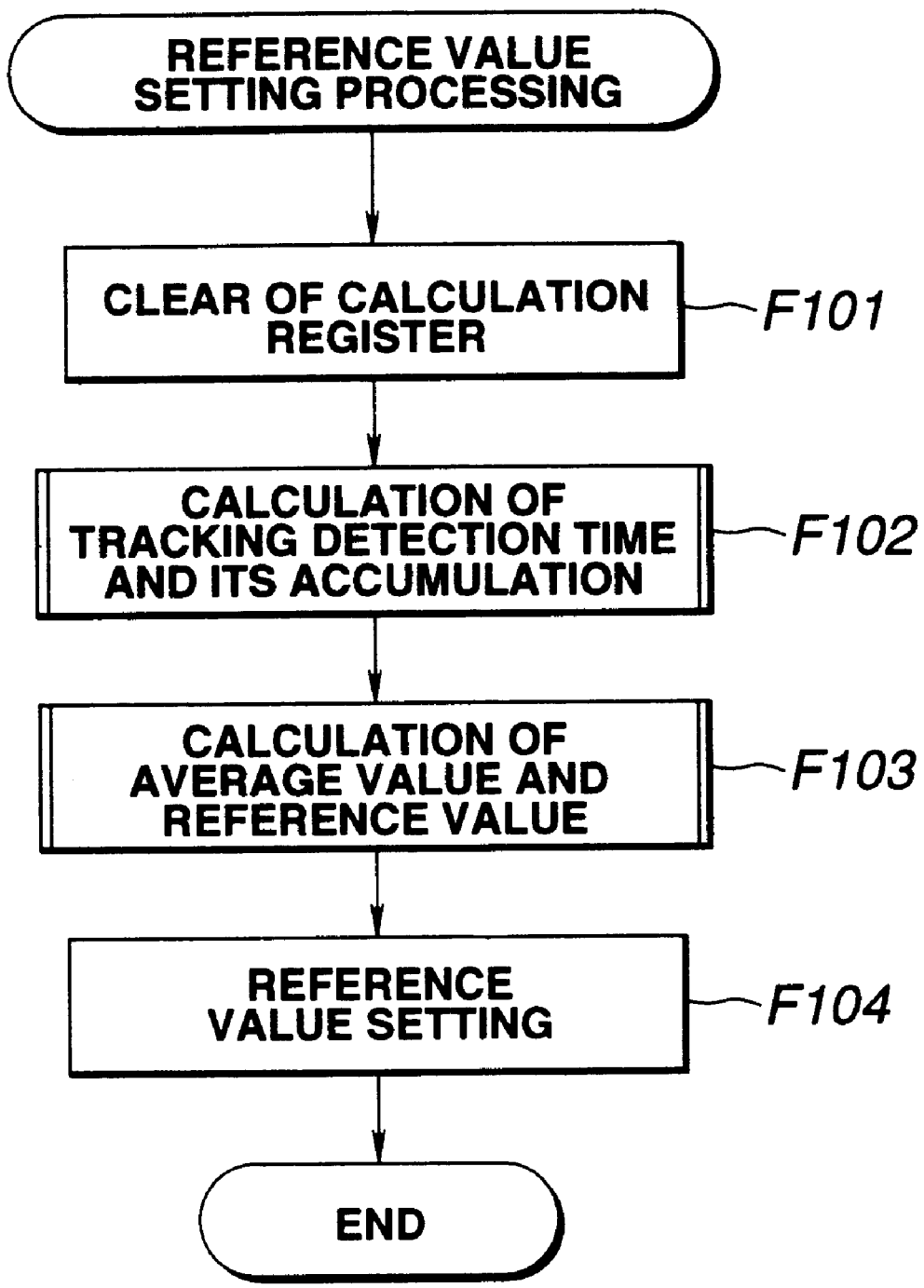
FIG. 19 is a flowchart showing the operation of timing ATF processing section in a first embodiment for setting the reference value.

The more practical reference value setting operation in the arithmetic section 80 will now be described with reference to the flowcharts shown in FIGS. 19 to 22. FIG. 19 shows the entirety of the operation for setting the reference value.

When the reference value setting processing is started, the system controller 31 controls the servo circuit 30 so as to carry out tape traveling and the reproduction operation as shown in FIG. 14, for example, and the servo circuit 30 rotationally drives the drum motor 32 and the capstan motor 35, etc. Then, the arithmetic section 80 within the timing ATF processing section 61 starts setting operation for reference value in correspondence therewith.

At step F101, the arithmetic section 80 clears all of data within the A-channel calculation register 84 and the B channel calculation register 85.

At step F102, the arithmetic section 80 measures tracking detection times $M_{TTP}(A)$, $M_{TTP}(B)$ on the basis of edges of the timing detection pulse TTP and the switching pulse SWP inputted thereto, and accumulates, every respective recording areas, tracking detection times $M_{TTP}(A)$, $M_{TTP}(B)$ measured in respective scanning operations of the reproduction heads 16A, 16B into the A channel calculation register 84 and the B channel calculation register 85. In more practical sense, e.g., in tracking phase state as shown in FIG. 14, the reproduction heads 16A, 16B respectively carry out about 30 times of scanning operations, and the arithmetic section 80 accumulates tracking detection times $M_{TTP}(A)$, $M_{TTP}(B)$ at that time.

At step F103, the arithmetic section 80 determines average values every respective recording areas as described later from accumulated values of tracking detection times $M_{TTP}(A)$, $M_{TTP}(B)$ every respective recording areas held in the A-channel calculation register 84 and the B-channel calculation register 85 to calculate, on the basis of these average values, reference value TB(A) with respect to the A azimuth track $TK_A$ and reference value TB(B) with respect to the B azimuth track $TK_B$.

At step F104, the arithmetic section 80 writes the calculated reference values TB(A), TB(B) into the reference value register 81. Thus, processing for setting reference value is completed.

More practical processing at the step F102 will now be described with reference to the flowchart shown in FIGS. 20 and 21. The processing for measurement of tracking detection times and calculation of its accumulated value at the step F102 consists of TTP interrupt processing shown in FIG. 20 and SWP interrupt processing shown in FIG. 21. The TTP interrupt processing is started at the time point when timing detection pulse TTP from the timing detection pulse generating circuit 27 is inputted to the arithmetic section 80.

At step F201, the arithmetic section 80 is operative so that when the timing detection pulse TTP is inputted thereto, it takes thereinto, as timing T1, count value of the free running counter 63 at that time point.

At step F202, the arithmetic section 80 calculates difference between the timing T1 and edge timing $M_{SWP}$ of switching pulse SWP obtained in SWP interrupt processing which will be described later and held in the SWP timing register 82 to allow this difference to be time T2. This edge timing $M_{SWP}$ corresponds to the timing TR (timing $TR_A$ or $TR_B$ shown in FIG. 13) at the reference phase position of the rotary drum 50. Accordingly, the time T2 is time from the timing TR at the reference phase position of the rotary drum 50 to the time point when the timing detection pulse TTP is inputted. Namely, the time T2 is any value of times tR1, tR2, tR3, tR4 shown in FIG. 6.

At step F203, the arithmetic section 80 compares this time T2 with window values W1~W4 set as shown in FIG. 18 to judge which one of the recording areas R1~R4 corresponds to inputted timing detection pulse TTP.

At step F204, the arithmetic section 80 reads out, from the standard time difference memory 86, standard time difference TL(x) corresponding to the judged recording area to calculate difference between this standard time difference TL(x) and time T2 to allow its difference to be time T3. In more practical sense, as also seen from FIG. 6, for example, the arithmetic section 80 is operative so that when it has judged that corresponding timing detection pulse TTP is the timing detection pulse TTP from the recording area R4, it calculates T2-TLc to allow its value to be time T3. Moreover, the arithmetic section 80 is operative so that when it has judged that corresponding timing detection pulse TTP is the timing detection pulse TTP from the recording area R3, it calculates T2-TLb to allow its value to be time T3. Further, the arithmetic section 80 is operative so that when corresponding timing detection pulse is the timing detection pulse TTP from the recording area R2, it calculates T2-TLa to allow its value to be time T3. In addition, the arithmetic section 80 is operative so that when it has judged that corresponding timing detection pulse is the timing detection pulse TTP from the recording area R1, it allows the time T2 to be time T3 as it is because subtraction is unnecessary in this case. The time T3 calculated in this way is the tracking detection time $M_{TTP}$ measured on the basis of the timing detection pulse TTP in a certain recording area (tracking detection time $M_{TTP}(A)$ or tracking detection time $M_{TTP}(B)$ of FIG. 13).

Figure 7:
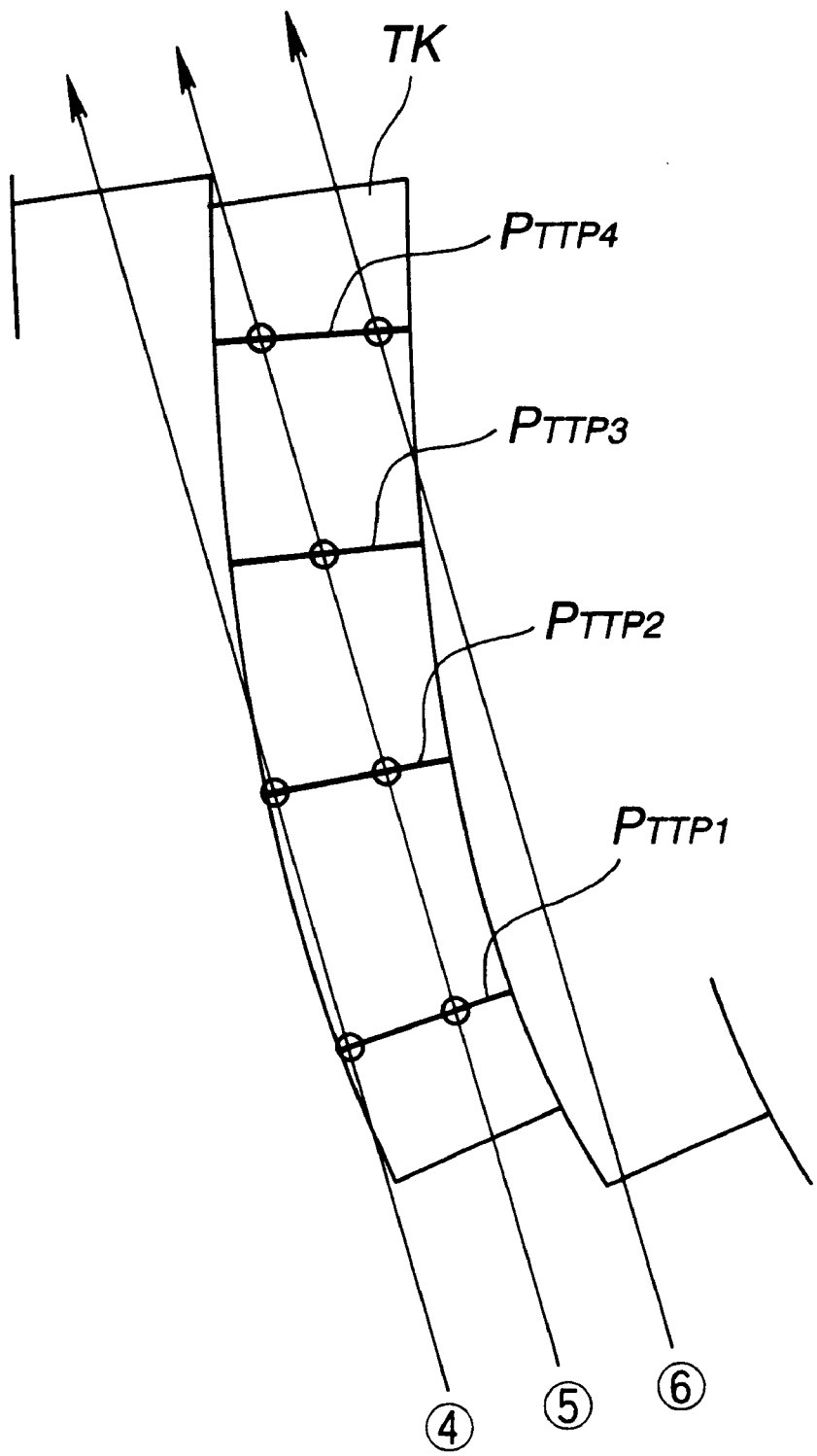
FIG. 7 is a view for explaining the recording area where tracking detection time cannot be measured in setting of the reference value.

At step F205, the arithmetic section 80 writes this time T3 into the TTP timing register 83 as the tracking detection time with respect to the judged recording area. In more practical sense, the arithmetic section 80 is operative so that in the case where the time T3 corresponds to, e.g., recording area R1, it stores the time T3 into the TTP timing register 83 as the tracking detection time $M_{TTP}(1)$. At times subsequent thereto, similarly, the arithmetic section 80 is operative so that in the case where the time T3 corresponds to respective recording areas R2, R3, R4, it stores the time T3 into the TTP timing register 83 as tracking detection times $M_{TTP}(2)$, $M_{TTP}(3)$, $M_{TTP}(4)$ Such TTP interrupt processing is carried out four times at the maximum in accordance with input of the timing detection pulse TTP during scanning of one track. In the case where the TTP interrupter processing is carried out four times, values of tracking detection times measured in the respective recording areas R1~R4 for that track scanning period are held as $M_{TTP}(1)$~$M_{TTP}(4)$ into the TTP timing register 83. It is to be noted that, as has been explained with reference to FIG. 7, it is not limited that four timing detection pulses TTP can be necessarily obtained for one track scanning period. For this reason, there are instances where as data of TTP timing register 83 at the time point when scanning of one track is completed, there exist data in which any value of the tracking detection times $M_{TTP}(1)$~$M_{TTP}(4)$ remains to be zero (value at the time of clear), i.e., the tracking detection time is not measured. In addition, there are also instances where all of tracking detection times $M_{TTP}(1)$~$M_{TTP}(4)$ cannot be measured.

Figure 21:
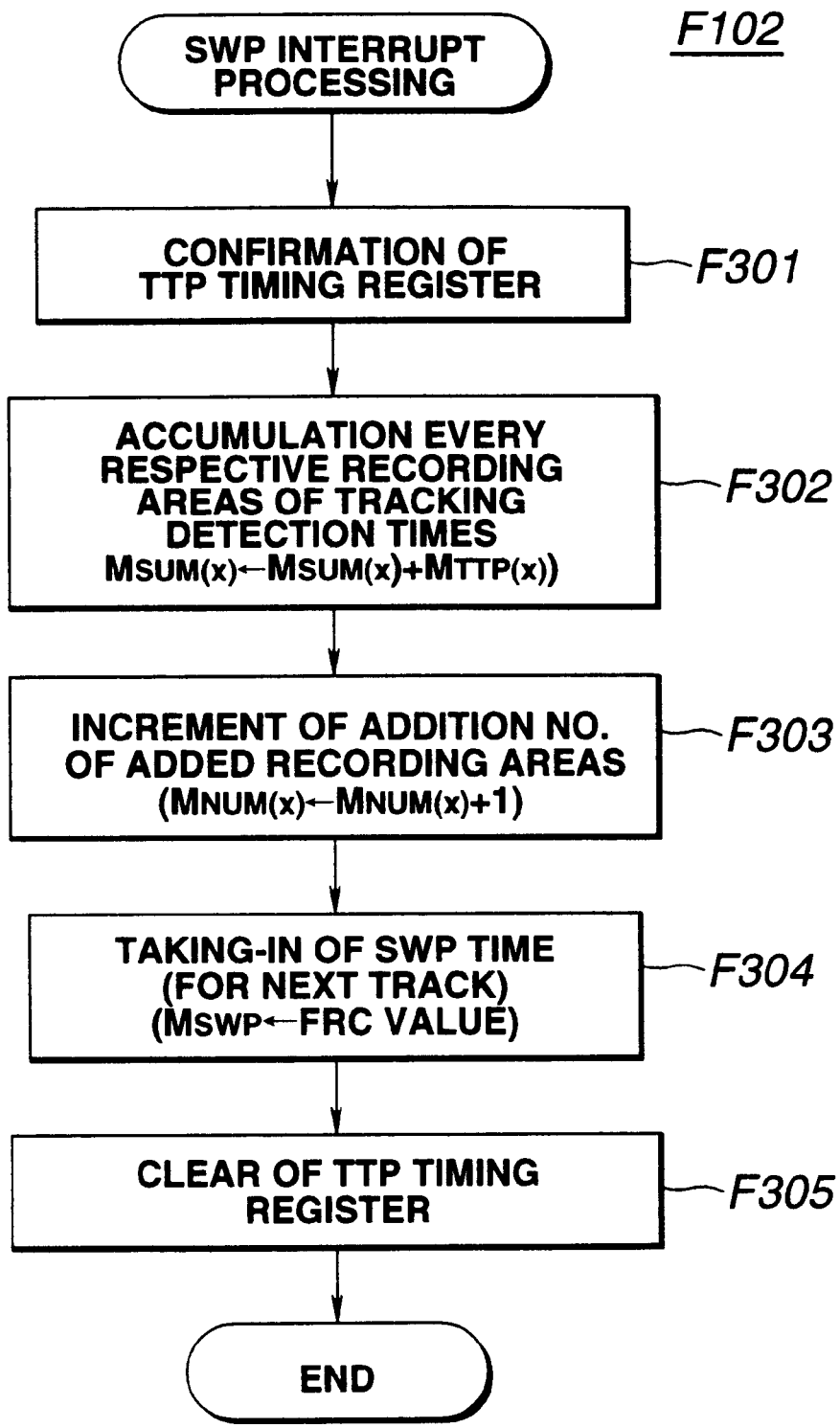
FIG. 21 is a flowchart of SWP interrupt processing.

The arithmetic section 80 is operative so that when it detects edge of the switching pulse SWP, it starts the SWP interrupt processing shown in FIG. 21.

At step F301, the arithmetic section 80 confirms storage state of the TTP timing register 82. Namely, the arithmetic section 80 discriminates the tracking detection time newly measured at track scanning immediately before of the tracking detection times $M_{TTP}(1)$~$M_{TTP}(4)$.

At step F302, the arithmetic section 80 carries out write/addition processing with respect to the A channel calculation register 84 and the B channel calculation register 85 in correspondence with the tracking detection time newly written into the TTP timing register 82. In more practical sense, since the arithmetic section 80 is operative so that when it detects falling edge of the switching pulse SWP to start the SWP interrupt processing, it holds, in the TTP timing register 82, tracking detection times $M_{TTP}(1)$~$M_{TTP}(4)$ measured at the B azimuth track immediately before that time. Accordingly, the arithmetic section 80 adds tracking detection time or times in which values exists of the $M_{TTP}(1)$~$M_{TTP}(4)$ to accumulated value of corresponding recording areas of the B channel calculation register 85. Namely, the arithmetic section 80 adds the tracking detection time $M_{TTP}(x)$ to the accumulated value $M_{SUM}(x)$ held in the B channel calculation register 85 to update the accumulated value $M_{SUM}(x)$. When the arithmetic section 80 holds only tracking detection times $M_{TTP}(1)$, $M_{TTP}(2)$ as measured value, e.g., in the TTP timing register 82, it updates the accumulated value $M_{SUM}(1)$, the accumulated value $M_{SUM}(2)$. On the other hand, since when the arithmetic section 80 detects rising edge of the switching pulse SWP to start SWP interrupt processing, it holds, in the TTP timing register 82, tracking detection times $M_{TTP}(1)$~$M_{TTP}(4)$ measured at the A azimuth track immediately before that time, it adds tracking detection time or times in which value exists of these tracking detection times $M_{TTP}(1)$~$M_{TTP}(4)$ to the accumulated value of corresponding recording area of the A channel calculation register 84. Namely, the arithmetic section 80 adds the tracking detection time $M_{TTP}(x)$ to the accumulated value $M_{SUM}(x)$ held at the A-channel calculation register 84 to update the accumulated value $M_{SUM}(x)$.

At step F303, the arithmetic section 80 increments addition number values $M_{NUM}(x)$ of the A-channel calculation register 84 or the B-channel calculation register 85 in correspondence with the updated accumulated value $M_{SUM}(x)$. Thus, the arithmetic section 80 completes processing with respect to scanning immediately before track.

At step F304, the arithmetic section 80 carries out preparation processing with respect to the next track scanning. Namely, the arithmetic section 80 takes thereinto count value of the free running counter 63 at the time point when the edge of the switching pulse SWP is detected to allow it to be edge timing $M_{SWP}$ of the switching pulse. This is a value used at step F202 in the next TTP interrupt processing.

At step F305, the arithmetic section 80 clears the TTP timing register 83 to complete this SWP interrupt processing.

Figure 20:
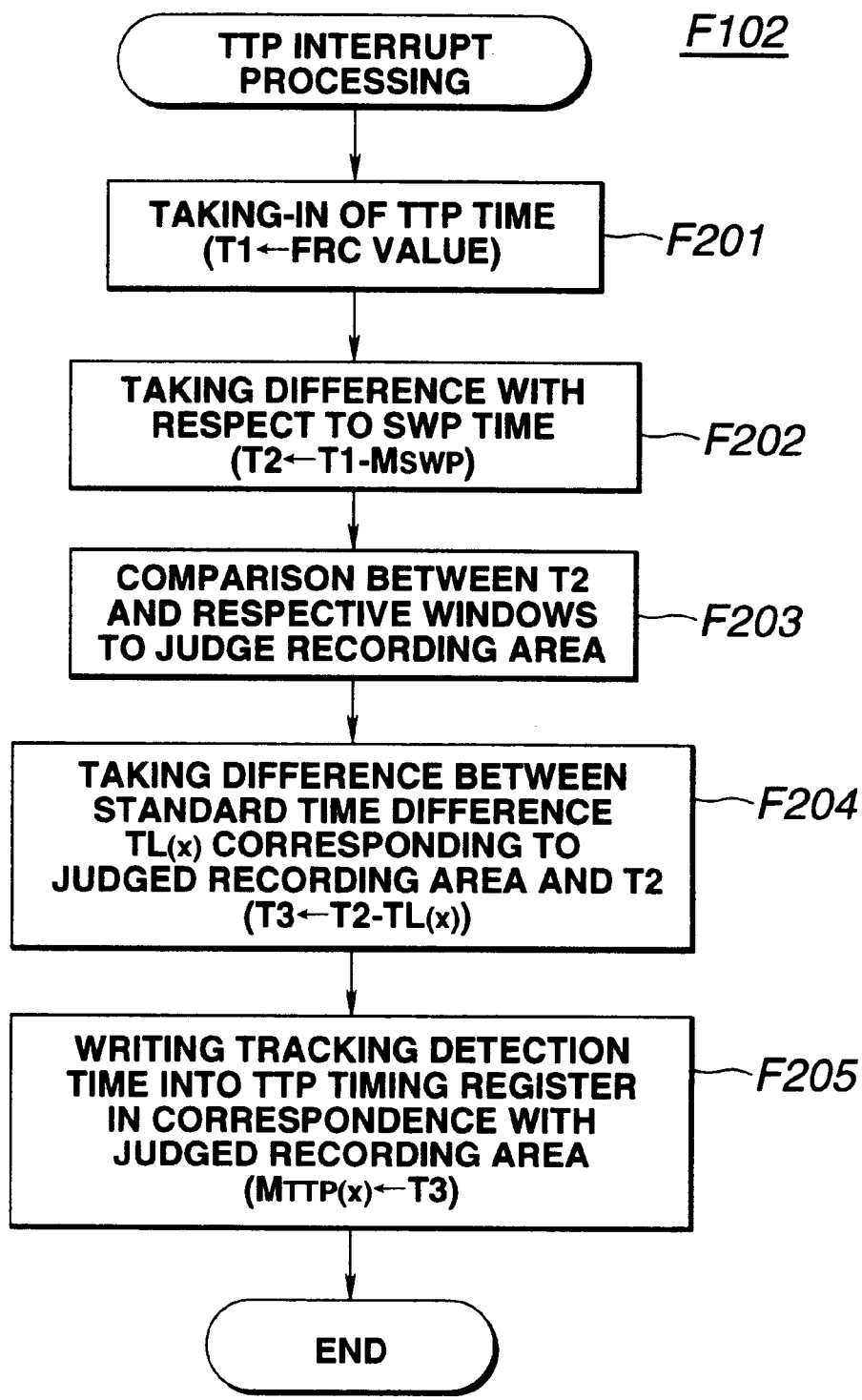
FIG. 20 is a flowchart of TTP interrupt processing.

Thereafter, at the time point when scanning of track proceeds and the arithmetic section 80 detects the timing detection pulse TTP, the arithmetic section 80 carries out TTP interrupt processing shown in FIG. 20.

At the time point when the TTP interrupt processing shown in the FIG. 20 mentioned above and the SWP interrupt processing shown in the FIG. 21 mentioned above are carried out as the processing of the step F102 shown in FIG. 19 with respect to, e.g., respective about 30 scanning operations of the reproduction heads 16A, 16B, accumulated values of tracking detection times measured when scanning is carried out in various tracking phase states are held as accumulated values $M_{SUM}(1)$~$M_{SUM}(4)$ at every respective R1~R4 recording areas of the A azimuth track $TK_A$ into the A-channel calculation register 84. Moreover, the numbers of tracking detection times totaled (calculated) in correspondence with these accumulated values $M_{SUM}(1)$~$M_{SUM}(4)$ are held as addition number values $M_{NUM}(1)$~$M_{NUM}(4)$. Similarly, accumulated values of tracking detection times measured when scanning is carried out in various tracking phase states are held as accumulated values $M_{SUM}(1)$~$M_{SUM}(4)$ at every respective R1~R4 recording areas of the B azimuth track $TK_B$ into the B-channel calculation register 85, and the numbers of tracking detection times totaled (calculated) in correspondence with the accumulated values $M_{SUM}(1)$~$M_{SUM}(4)$ are held as addition number value $M_{NUM}(1)$~$M_{NUM}(4)$.

Figure 22:
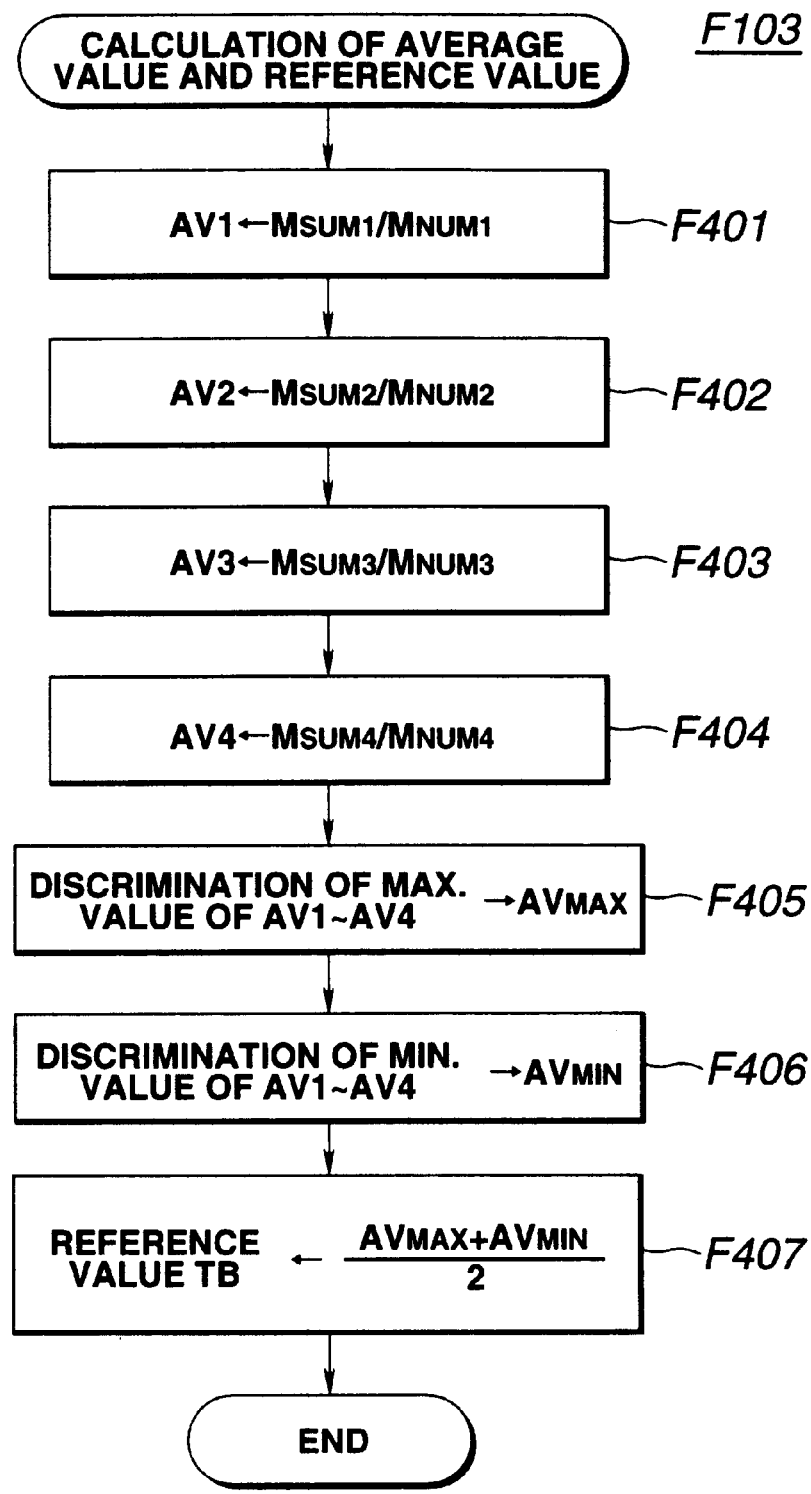
FIG. 22 is a flowchart of calculation processing of average value and reference value.

Explanation will now be given with reference to the flowchart shown in FIG. 22 in connection with the detail of the step F103 of FIG. 19 for calculating the reference values TB(A), TB(B) from accumulated values held in the A-channel calculation register 84 and the B-channel calculation register 85 in this way.

At steps F401~F404, the arithmetic section 80 determines average values AV1~AV4 of tracking detection times measured at every respective recording areas. Namely, the arithmetic section 80 divides the accumulated value $M_{SUM}(1)$ by addition number value $M_{NUM}(1)$ to determine average value AV1 of tracking detection time with respect to the recording area R1, and divides the accumulated value $M_{SUM}(2)$ by addition number value $M_{NUM}(2)$ to determine average value AV2 of tracking detection time with respect to the recording area R2. Similarly, the arithmetic section 80 determines average values AV3, AV4 with respect to the recording areas R3, R4.

At step F405, the arithmetic section 80 discriminates the maximum one of the average values AV1~AV4 to allow it to be the maximum average value $AV_{MAX}$.

Further, at step F406, the arithmetic section 80 discriminates the minimum one of average values AV1~AV4 to allow it to be the minimum average value $AV_{MIN}$.

At step F407, the arithmetic section 80 calculates an average value of the maximum average value $AV_{MAX}$ and the minimum average value $AV_{MIN}$ to allow it to be reference value TB.

The arithmetic section 80 carries out processing of these respective steps F401~F407 by using accumulated values stored in the A-channel calculation register 84 and the B-channel calculation register 85 to thereby calculate reference value TB(A) with respect to the A azimuth track $TK_A$ and reference value TB(B) with respect to the B azimuth track $TK_B$ for tracking servo control based on the timing ATF system. The reference value TB(A) and the reference value TB(B) calculated in this way are written into the reference value register 81 at the step F104 of FIG. 19. Thus, reference value setting processing is completed.

Even in a case such that the relationship between the scanning locus and linearity of track is not in the ideal state as has been explained with reference to FIGS. 15, 16, the reference values set as stated above are reference values capable of carrying out scanning within the tracking error which is allowable (tolerable) to some extent over the entire area of the track. Even in the case where the ideal relationship between the track and the scanning locus cannot be obtained, it is possible to prevent that tracking greatly deviates at the time of reproduction so that error rate is increased. Namely, the reproduction performance and/or reliability of this digital data storage can be greatly improved.

It is to be noted that while this invention has been described by using the embodiment in which the track is divided into four recording areas to detect timing detection pulses TTP, this invention can be also applied to the case where the track is divided into three recording areas or more to detect the timing detection pulses TTP thus to set reference values.

5. Second embodiment of reference value setting scheme

The second embodiment of the reference value setting scheme will now be described. This embodiment contemplates realizing a tracking servo control such that when any uncorrectable error takes place or takes place frequently in a certain recording area at the time of reproduction, such error can be eliminated. In other words, reference value is set in accordance with the error occurrence situations.

In order to set the reference value in dependency upon such error occurrence situations, the system controller 31 monitors error occurrence situations at the time of reproduction operation. As shown in FIG. 10, the error correction processing is carried out in the C1 decoder 23, the C2 decoder 24 and the C3 decoder 25. These respective decoders 23, 24, 25 deliver uncorrectable error occurrence signal to the system controller 31 in the case where uncorrectable error exists.

As described above, when uncorrectable error takes place, the error correction code C1 and the error correction code C3 can detect the portion where that error has taken place as position on the track TK. Namely, since the error correction code C1 is completed in the fragment units, it is possible to confirm the position on the track TK where uncorrectable error has taken place from corresponding fragment address. Moreover, since the error correction code C3 is error correction code added in group units in the track direction, it is possible to confirm position of uncorrectable error on the track TK by using the error correction code C3. Namely, the system controller 31 monitors processing result by the error correction codes C1, C3 to discriminate occurrence situations of uncorrectable error with respect to the respective recording areas R1~R4.

Figure 23:
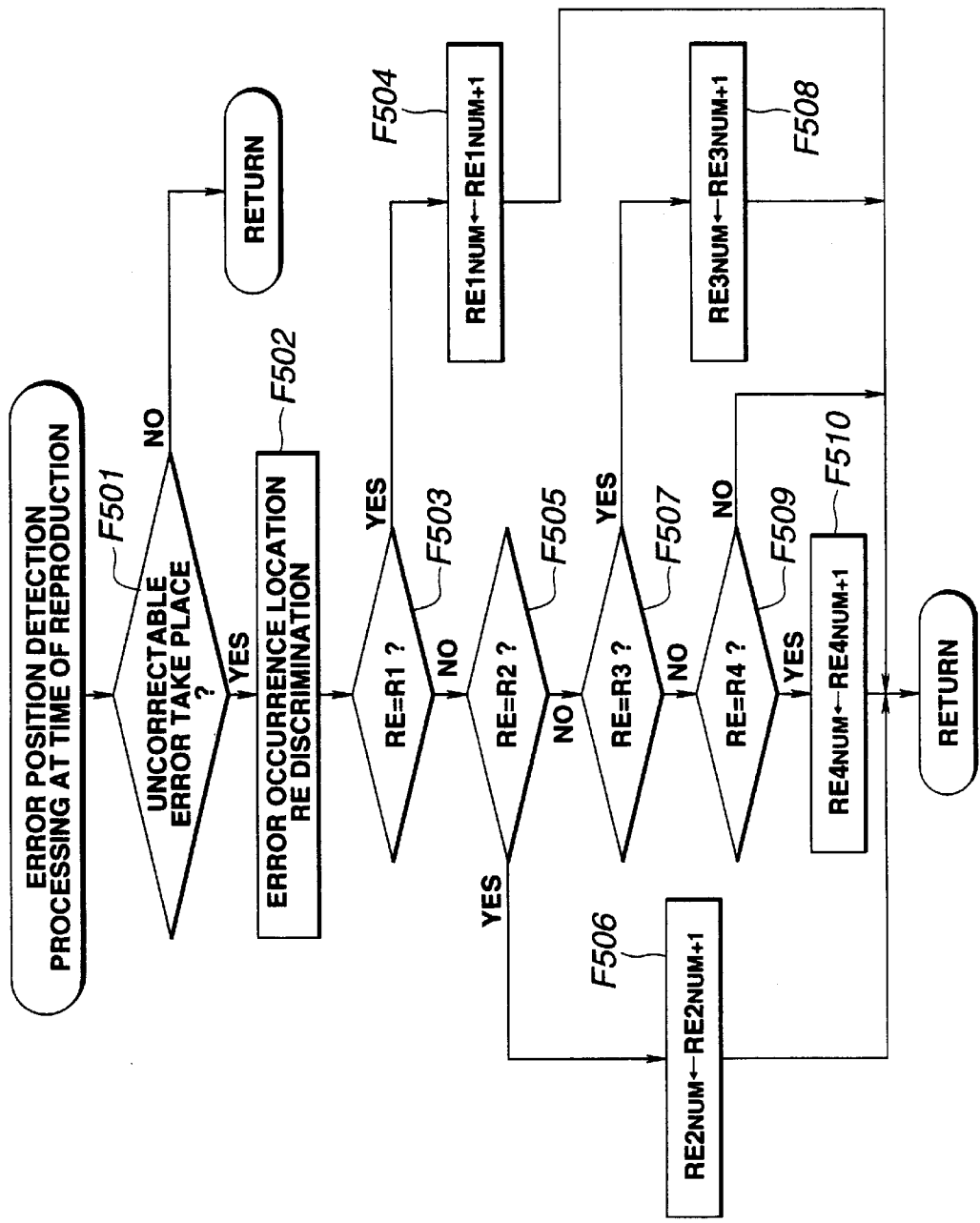
FIG. 23 is a flowchart showing the operation of system controller in a second embodiment for setting reference value.

In more practical sense, the system controller 31 carries out the operation shown in the flowchart of FIG. 23 at the time of reproduction operation.

At step F501, whether or not uncorrectable error occurrence signal is delivered from the C1 decoder 23 or the C3 decoder 25 is judged. When so, the processing operation proceeds to step F502. When not so, this error position detecting processing is completed (hereinafter referred to as return).

At the step F502, the system controller 31 discriminates recording area corresponding to the portion where error takes place to allow that recording area to be recording area $R_E$.

At step F503, the system controller 31 judges whether or not the recording area $R_E$ is the recording area R1. When so, the processing operation proceeds to step F504. When not so, the processing operation proceeds to step F505.

At step F504, the system controller 31 increments error counter $RE1_{NUM}$ corresponding to the recording area R1 thereafter to carry out return.

At step F505, the system controller 31 judges whether or not the recording area RE is the recording area R2. When so, the processing operation proceeds to step F506. When not so, the processing operation proceeds to step F507.

At the step F506, the system controller 31 increments the error counter $RE2_{NUM}$ corresponding to the recording area R2 thereafter to carry out return.

At step F507, the system controller 31 judges whether or not the recording area $R_E$ is the recording area R3. When so, the processing operation proceeds to step F508. When not so, the processing operation proceeds to step F509.

At step F508, the system controller 31 increments error counter $RE3_{NUM}$ corresponding to the recording area R3 thereafter to carry out return.

At step F509, the system controller 31 judges whether or not the recording area $R_E$ is the recording area R4. When so, the processing operation proceeds to step F510. When not so, return operation is carried out.

At the step F510, the system controller 31 increments error counter $RE4_{NUM}$ corresponding to the recording area R4 thereafter to carry out return.

By carrying out such a processing at the time of reproduction, whether or not uncorrectable error takes place or takes place frequently only in a specific recording area can be discriminated from values of error counters $RE1_{NUM}$~$RE4_{NUM}$. Then, the system controller 31 delivers values of the error counters $RE1_{NUM}$~$RE4_{NUM}$ to the arithmetic section 80 of the timing ATF processing section 61 in the servo circuit 30.

Figure 24:
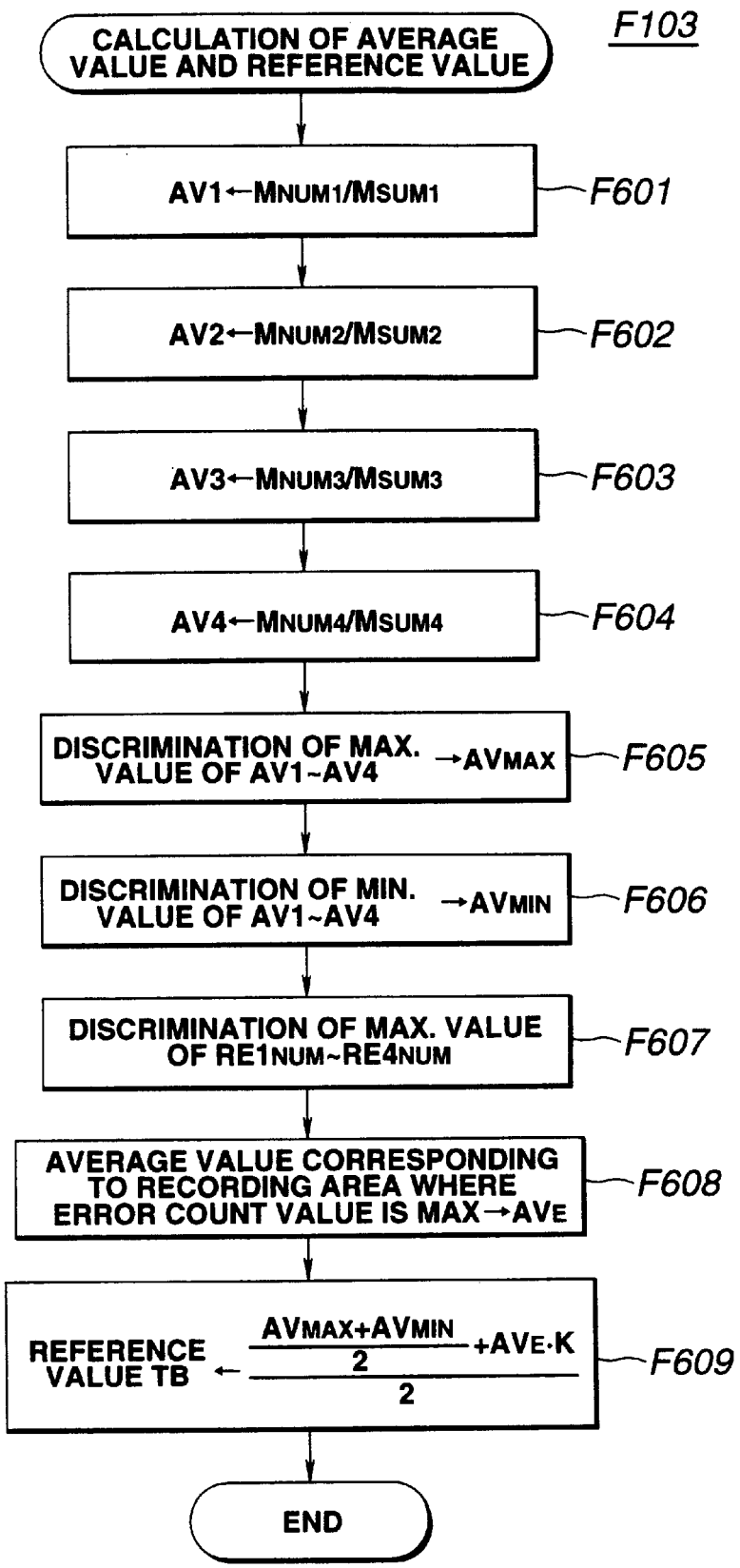
FIG. 24 is a flowchart showing the operation of timing ATF processing section in the second embodiment for setting reference value.

In this second embodiment of reference value setting scheme, in the case where it is observed that uncorrectable error takes place more frequently in a specific recording area as compared to other recording areas, the arithmetic section 80 carries out processing in accordance with the flowchart shown in FIG. 24 in setting the next reference value. It is to be noted that the entire processing as the reference value setting scheme is the same as the above-described processing of FIG. 19, and processing of FIG. 24 is carried out as the processing of the step F103 of FIG. 19 in place of the above-described processing of FIG. 22. Moreover, processing at steps F601~F606 shown in FIG. 24 are the same as the processing at the steps F401~F406 shown in FIG. 22. Namely, at the steps F601~F606, the arithmetic section 80 determines average values AV1~AV4 of tracking detection times in respective recording areas from tracking detection times held at the A-channel calculation register 84 or the B-channel calculation register 85 to further specify the maximum average value $AV_{MAX}$ and the minimum average value $AV_{MIN}$ thereamong. Accordingly, explanation is omitted in connection with the detail of the processing of the steps F601~F606.

At step F607, the arithmetic section 80 discriminates the maximum value of respective values of error counters $RE1_{NUM}$~$RE4_{NUM}$ delivered from the system controller 31 to judge (discriminate) the recording area where the number of error occurrence times is the maximum, or the recording area where uncorrectable error has taken place at least once. It is to be noted that in the case where respective values of the error counters $RE1_{NUM}$~$RE4_{NUM}$ have substantially the same level, there may be employed an approach such that any certain one value is not detected as the maximum value. Namely, while in such a sense to judge the recording area where the number of error occurrence times is conspicuously large, respective values of the error counters $RE1_{NUM}$~$RE4_{NUM}$ are different values, in the case where they are assumed to have substantially the same level, judgment may be made such that there is no value corresponding to the maximum value to calculate the reference value by the processing of the step F407 shown in FIG. 22. In addition, with respect to the recording areas where uncorrectable error has taken place at least once, all of those areas may be caused to correspond to the recording area where the number of error occurrence times is the maximum, which is referred to here.

At step F608, the arithmetic section 80 allows an average value corresponding to recording areas where the number of error occurrence times is conspicuously large among average values AV1~AV4 to be $AV_E$.

At step F609, the arithmetic section 80 weights the average value $AV_E$ to determine average value of the maximum average value $AV_{MAX}$, the minimum average value $AV_{MIN}$ and the average value $AV_E$. In more practical sense, the arithmetic section 80 determines, e.g., average value of the maximum average value $AV_{MAX}$ and the minimum average value $AV_{MIN}$ thereafter to determine an average value of that average value and value obtained by multiplying the average value $AV_E$ by coefficient K to allow it to be reference value TB.

In the second embodiment of the reference value setting scheme, as described above, weight is applied to the average value AV of the recording area where error has taken place as described above so that the average value is more greatly reflected (this is referred to as operation to increase specific gravity), thus to calculate reference value TB(TB(A) and TB(B)). Thus, in the tracking servo control by the timing ATF system based on the reference value TB, the tracking state in the recording area where error occurrence frequency is high can be caused to be a more reasonable state. As a result, occurrence of error can be prevented.

While such an operation may be carried out in ordinary reproduction, this operation is effective particularly in such a case of reproducing the same portion for a second time by error of reproduced data (hereinafter referred to as reproduction retry). Namely, since, at the time of reproduction retry, tracking in which importance is attached to the portion where data cannot be reproduced is carried out on the basis of such reference value, reproduction of data for a second time can be carried out efficiently and in short time as compared to the case where the tracking state is caused to be changed at random to carry out reproduction retry.

Moreover, in the case where error occurrence frequency is caused to be high in other recording area in the reproduction operation after the reference value TB is set by such a method, similar reference value setting processing is carried out for a second time to increase specific gravity of the average value AV of that recording area to set the reference value. By repeating such an operation, the reference value is converged into the optimum value.

It is to be noted that while the recording area in which the specific gravity is increased in calculation of the reference value is assumed to be the recording area where the error occurrence frequency is high, equipments adapted for handling data of computer such as digital data storage, etc. is required to completely eliminate occurrence of uncorrectable error. Accordingly, the meaning of "error occurrence frequency is high" is equivalent to the fact that if uncorrectable error takes place at least once in a certain recording area, this corresponds to the fact that error occurrence frequency is high to carry out reference value setting processing.

On the other hand, in devices such that error is allowable (tolerable) to some extent like digital audio tape player (DAT) for recording/reproducing, e.g., speech signal as digital signal, in the case where uncorrectable error repeatedly takes place, specific gravity may be increased with respect to the average value AV of that recording area.

Meanwhile, as a method of calculating the reference value TB at the step F609 in which specific gravity is increased with respect to the recording area where error takes place, there are various calculation methods in addition to the above. For example, a calculation may be made in a manner as indicated by the following formula:

$$TB=\{(AV1+AV2+AV3+AV4)/2+AV_E \cdot K\}/2$$

In addition, in the case where error takes place at considerably high frequency in plural recording areas, an average of average values of tracking detection times corresponding to those plural recording areas may be determined.

It is to be noted that the technology for increasing specific gravity of average value of the recording areas where error takes place in this embodiment can be applied to the case where two recording areas or more are set per at least one track to obtain two timing detection pulses or more.

6. Third embodiment of reference value setting scheme

The third embodiment of reference value setting scheme will now be described.

This embodiment contemplates permitting the reference value to be set to be a correct value of less error.

The position of the track TK on the magnetic tape 90 shifts (deviates) resulting from allowable (tolerable) positional error, etc. of the recording head on, e.g., the rotary drum of the recording device which has carried out such recording, and its error is allowed (tolerable) until ±26 μm in the tape width direction. Moreover, since allowable (tolerable) error of the reproduction head on, e.g., the rotary drum exists also at the reproducing device side, it is necessary to take into consideration error of about ±50 μm in total. Namely, in setting the reference value, shift of about ±50 μm must be taken into consideration in terms of scanning distance must be taken into consideration as shift (deviation) of timing to be measured.

Moreover, in detection of timing, the problem of erroneous detection necessarily exists. Particularly, in such states that tracking deviates, there is the possibility that timing detection pulse TTP may be detected at positions except for the primary position $P_{TTP}$. Further, in setting the reference value, as seen from the scanning shown in FIG. 14, scanning in the state where tracking deviates is frequently carried out, resulting in high possibility that erroneous detection of timing may take place. In such cases that timing detection pulse TTP has been detected at a position greatly spaced from the primary position $P_{TTP}$, large error takes place in the reference value TB to be calculated. In view of the above, in this embodiment, an approach is employed to disregard timing detection pulse TTP erroneously detected in this way, thereby making it possible to set the reference value to a correct value of less error.

Figure 25:
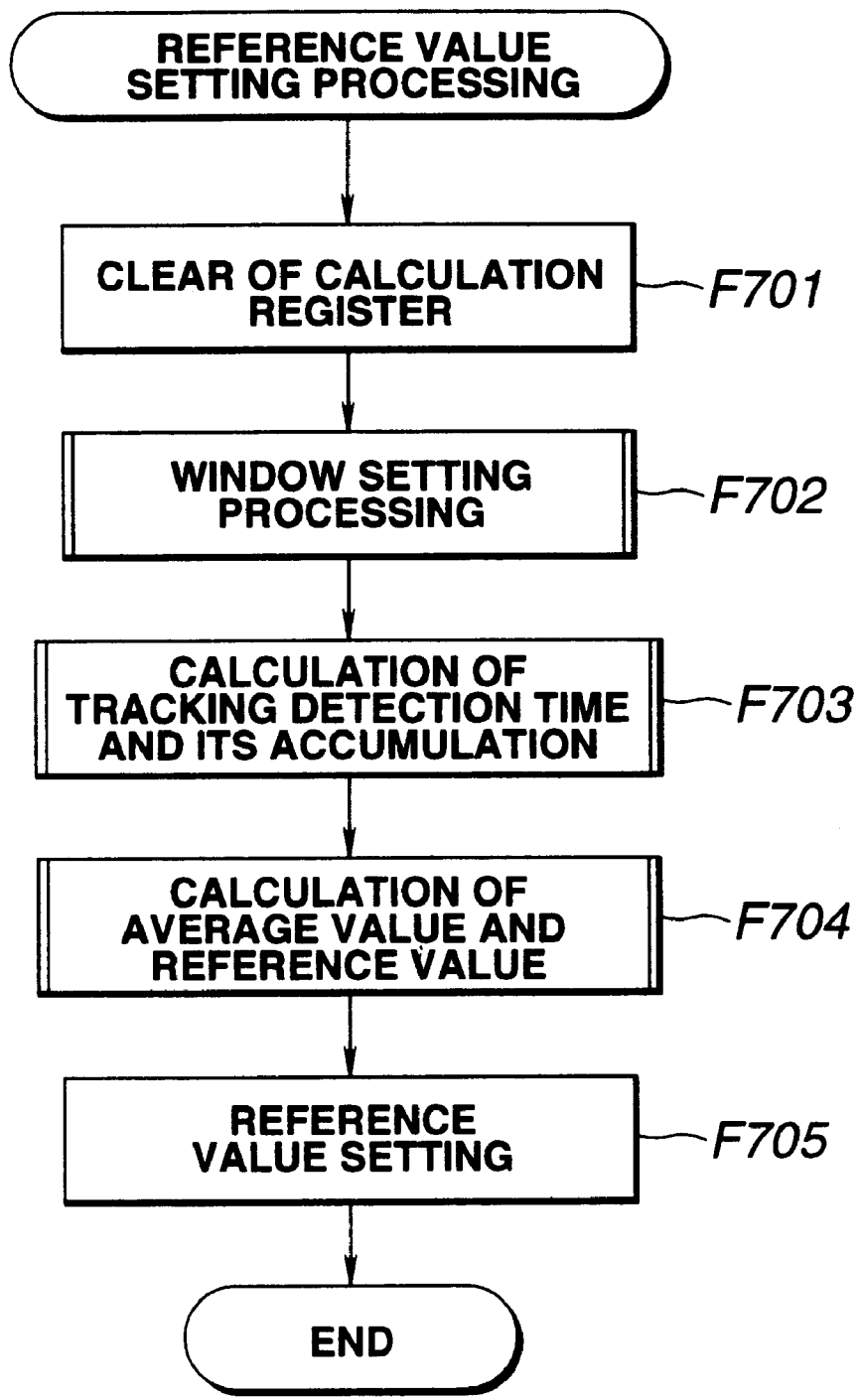
FIG. 25 is a flowchart showing the operation of timing ATF processing section in a third embodiment for setting reference value.

FIG. 25 is a flowchart showing the operation of the third embodiment of reference value setting scheme. Processing at steps F701, F704, F705 shown in FIG. 25 are respectively the same as those at the above-described steps F101, F103, F104 shown in FIG. 19. Here, explanation will be omitted in connection with the detail of those processing. Namely, the third embodiment is characterized in that window setting processing is carried out at the step F702 and the TTP interrupt processing within the step F703 is changed to some extent in correspondence therewith.

At the step F702, the arithmetic section 80 obtains approximately 3~30 tracking detection times between 1~2 frames with respect to respective azimuth tracks $TK_A$, $TK_B$ to set window values W1~W4 on the basis of these tracking detection times.

Figure 26:
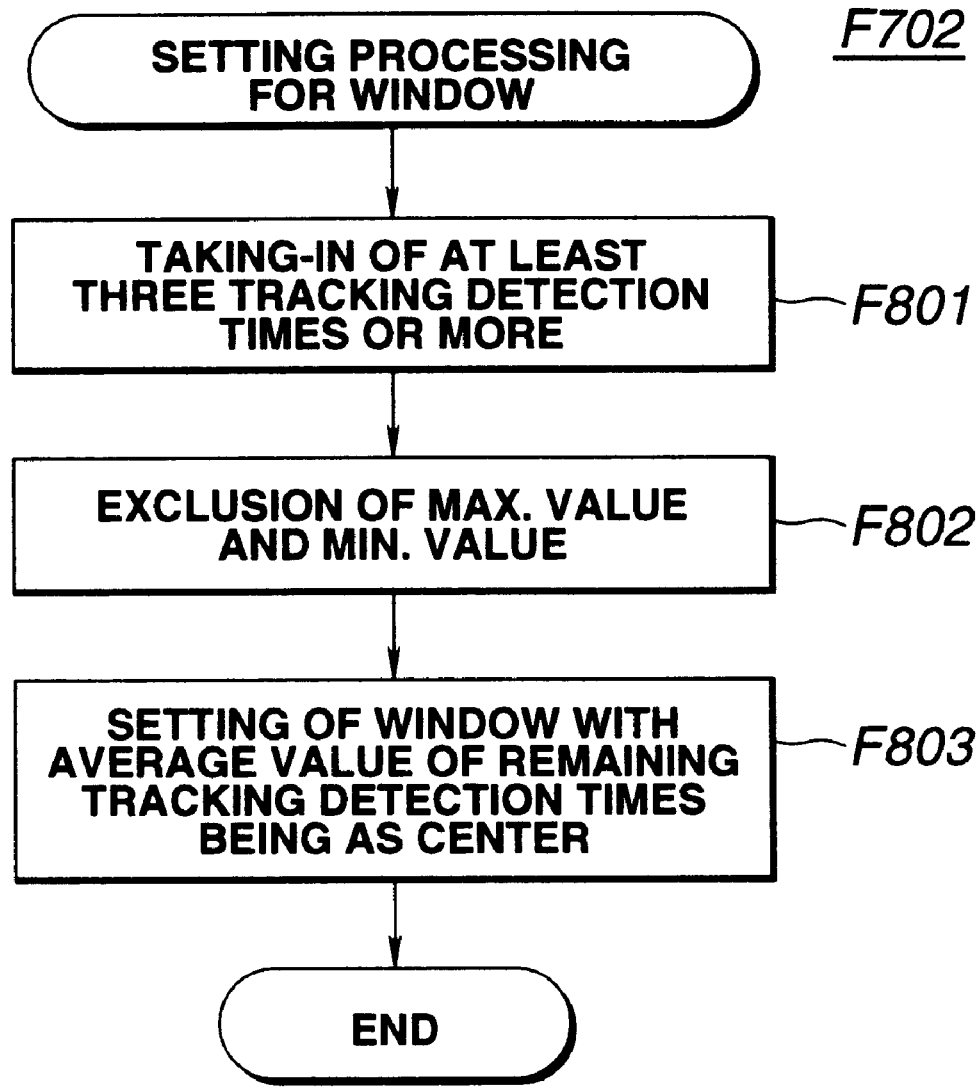
FIG. 26 is a flowchart of window setting processing in the third embodiment for setting the reference value.

In more practical sense, at step F801 of the flowchart shown in FIG. 26, the arithmetic section 80 takes thereinto three tracking detection times $M_{TTP}(x)$ or more in the recording area where respective azimuth tracks $TK_A$, $TK_B$ exist.

Figure 27:
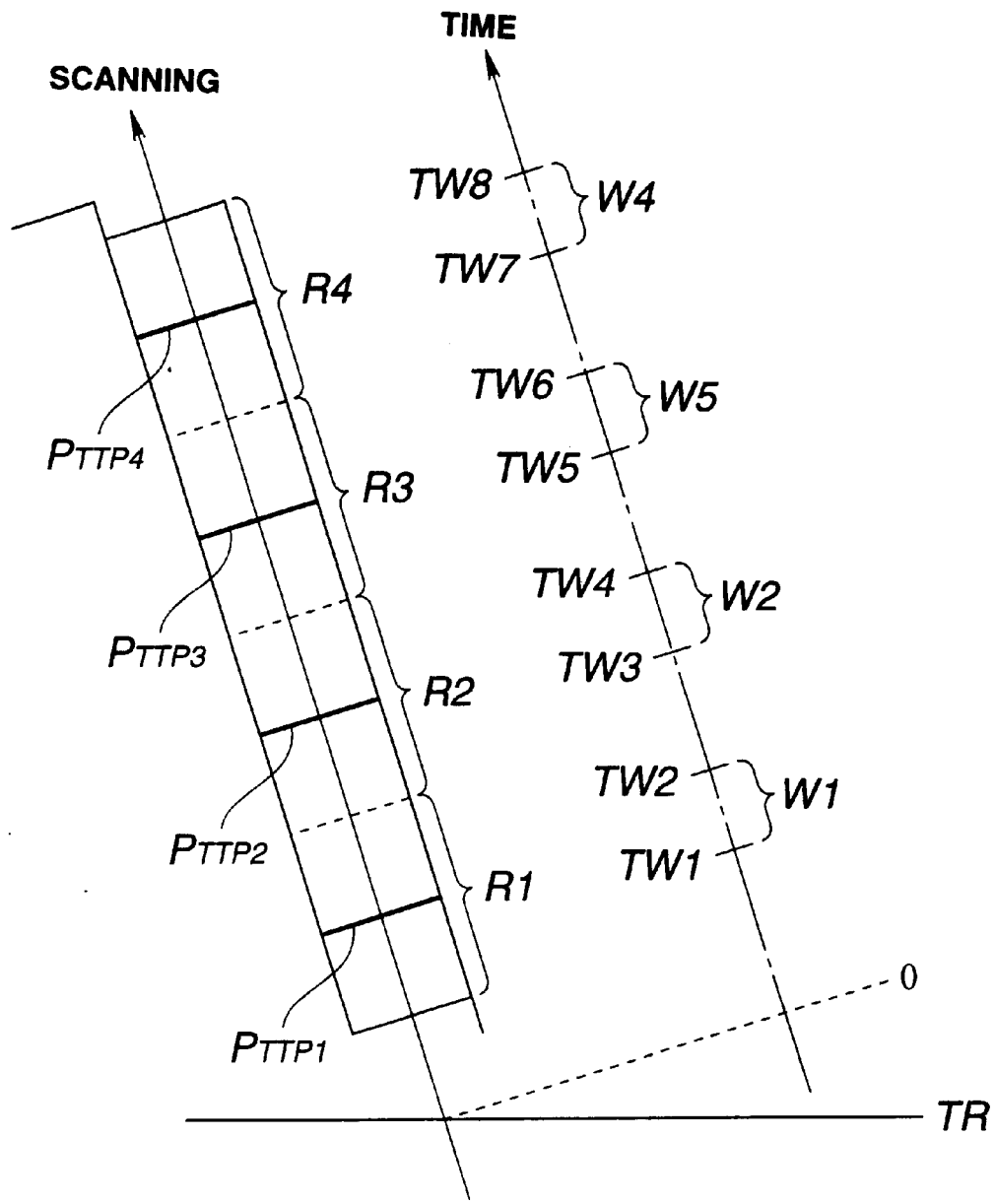
FIG. 27 is a view for explaining windows in the third embodiment for setting reference value.

At step F802, the arithmetic section 80 excludes the maximum value and the minimum value of the tracking detection times $M_{TTP}(X)$ thus taken in to determine an average value of the remaining tracking detection times $M_{TTP}(x)$ to set window. For example, a window value having width of about ±20 μm in terms of scanning distance with its average value being as the center is set. Namely, as shown in FIG. 27, for example, the arithmetic section 80 takes thereinto three tracking detection times $M_{TTP}1$ or more measured on the basis of the timing detection pulse TTP detected from the position $P_{TTP}1$ in the recording area R1. These tracking detection times $M_{TTP}1$ are distributed with the scanning timing of the position $P_{TTP}1$ being as the center. Then, the arithmetic section 80 excludes tracking detection times $M_{TTP}1$ of the maximum value and the minimum value having high erroneous detection possibility in consideration of the possibility of erroneous detection to determine an average value of the remaining tracking detection times $M_{TTP}1$. This average value is a timing value substantially and precisely corresponding to the position $P_{TTP}1$. In view of the above, the arithmetic section 80 allows the range of ±20 μm in terms of the scanning distance with its average value being as the center, i.e., the range from TW1 to TW2 shown in FIG. 27 in terms of timing to be window W1. Similarly, the arithmetic section 80 repeats processing of steps F801~F803 with respect to respective recording areas R2~R4 to set windows W2~W4 with respect to the respective recording areas R2~R4 as shown in FIG. 27. The arithmetic section 80 holds the windows W1~W4 set in this way into the window memory 87 shown in FIG. 17. The timing range TW3~TW4 of the window W2, the timing range TW5~TW6 of the window W3 and the timing range TW7~TW8 of the window W4 are respectively, e.g., ±20 μm in terms of the scanning distance with actual positions $P_{TTP}2$, $P_{TTP}3$, $P_{TTP}4$ being as the center. It is to be noted that in addition to the method of respectively calculating windows W1~W4 with respect to respective recording areas R1~R4 as stated above, there may be employed, e.g., a method of setting window with respect to one recording area thereafter to set other windows by calculation by using standard time differences TLa~TLc, etc. with respect to other recording areas. When the windows W1~W4 are set in this way, the processing proceeds to step F703 shown in FIG. 25.

Figure 28:
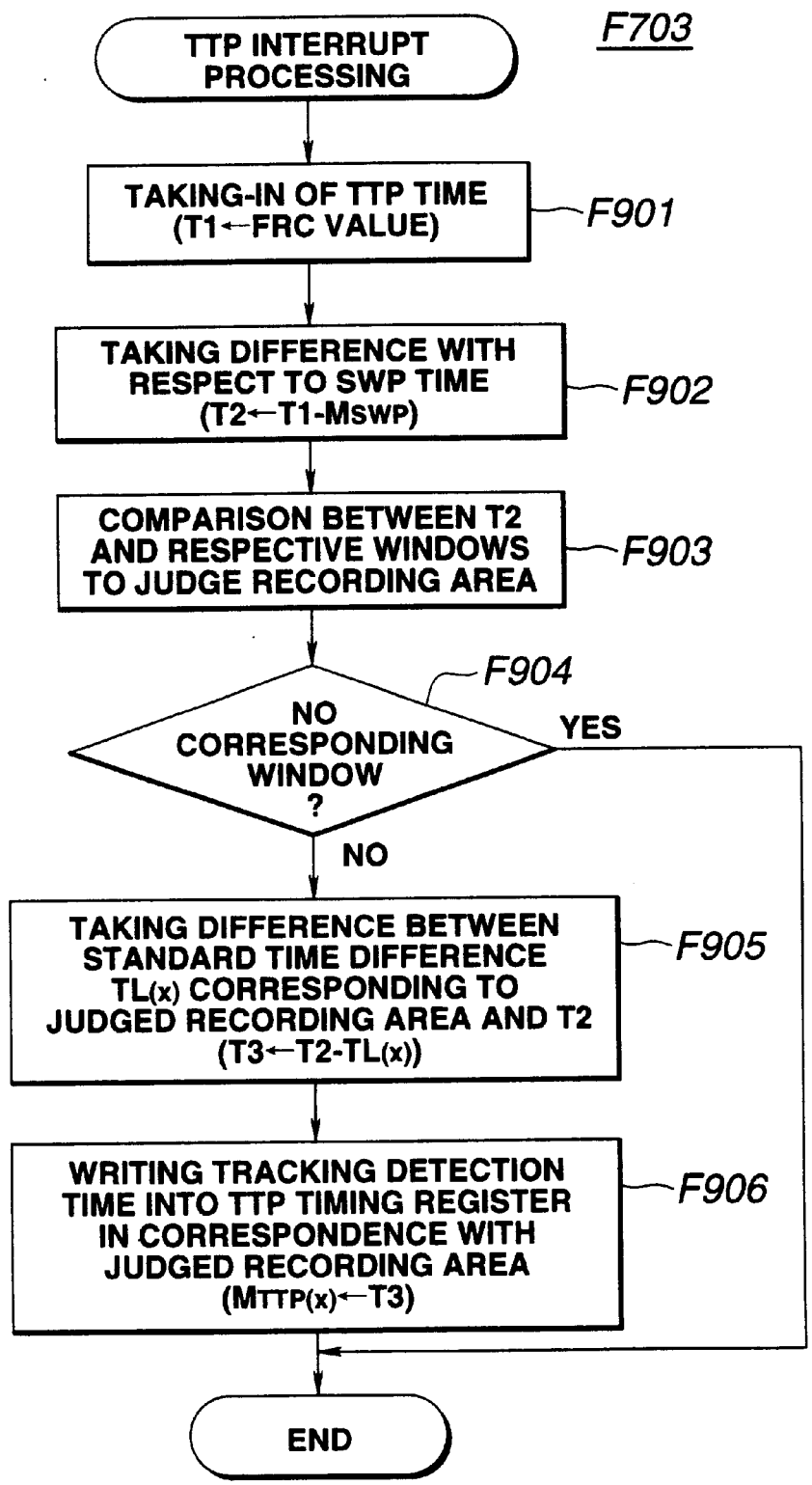
FIG. 28 is a flowchart of TTP interrupt processing in the third embodiment for setting reference value.

The processing of measurement of the tracking detection times and its accumulation at the step F703 is substantially the same as the processing in the above-described first embodiment of reference value setting scheme, but the TTP interrupt processing is different from the processing shown in FIG. 20 and is as indicated by the flowchart shown in FIG. 28. It is to be noted that processing at steps F901~F903, F905, F906 shown in FIG. 28 are respectively the same as the processing at the steps F201~F203, F204 and F205 shown in FIG. 20.

Namely, at step F902, the arithmetic section 80 determines time T2 in accordance with input of the timing detection pulse TTP. Thereafter, at step F903, the arithmetic section 80 compares the time T2 and window values W1~W4 to discriminate recording area to which that timing detection pulse TTP corresponds. However, since windows W1~W4 set as shown in FIG. 27, for example, are held in the window memory 87, there are instances where the time T2 does not correspond to any window. The case where the time T2 does not correspond to any window is the case where inputted timing detection pulse TTP is detected at timing considerably distant in point of time in practice from any one of timings of positions $P_{TTP}1$, $P_{TTP}2$, $P_{TTP}3$, $P_{TTP}4$. Namely, this is data having high possibility of erroneous detection and exerting bad influence on calculation of the reference value.

In view of the above, at step F904, the arithmetic section 80 judges whether or not corresponding window exists to complete the processing from the step F904 in the case where such window does not exist to employ an approach in which the timing detection pulse TTP at that time is not used for calculation of the reference value. On the other hand, the arithmetic section 80 is operative so that in the case where the time T2 corresponds to a certain window, it allows or considers such window data to be suitable (reasonable) data corresponding to the certain recording area to carry out calculation of tracking detection time at the steps F905, F906.

As stated above, such an approach is employed to set the detection window to have a relatively narrow width to thereby exclude unsuitable timing detection pulse TTP to carry out reference value setting processing to thereby increase accuracy of the reference value, thus making it possible to carry out tracking servo control by more satisfactory timing ATF. Thus, even in the case of short time reference value setting using lesser number of tracking detection times, a high accuracy reference value can be obtained. As a result, the reference value setting processing can be quickly carried out.

It is to be noted that while, in this embodiment, the actual example for setting windows W1~W4 in correspondence with four recording areas has been described, this invention can be also applied to the case where the number of recording areas is set to value different from the above, and/or the case where timing detection pulse TTP is detected from single position without dividing the track into plural recording areas.

7. Fourth embodiment of reference value setting scheme

Another more practical configuration of the timing ATF processing section 61 for generating tracking error SV in carrying out tracking servo control by the timing ATF system will now be described.

Figure 29:
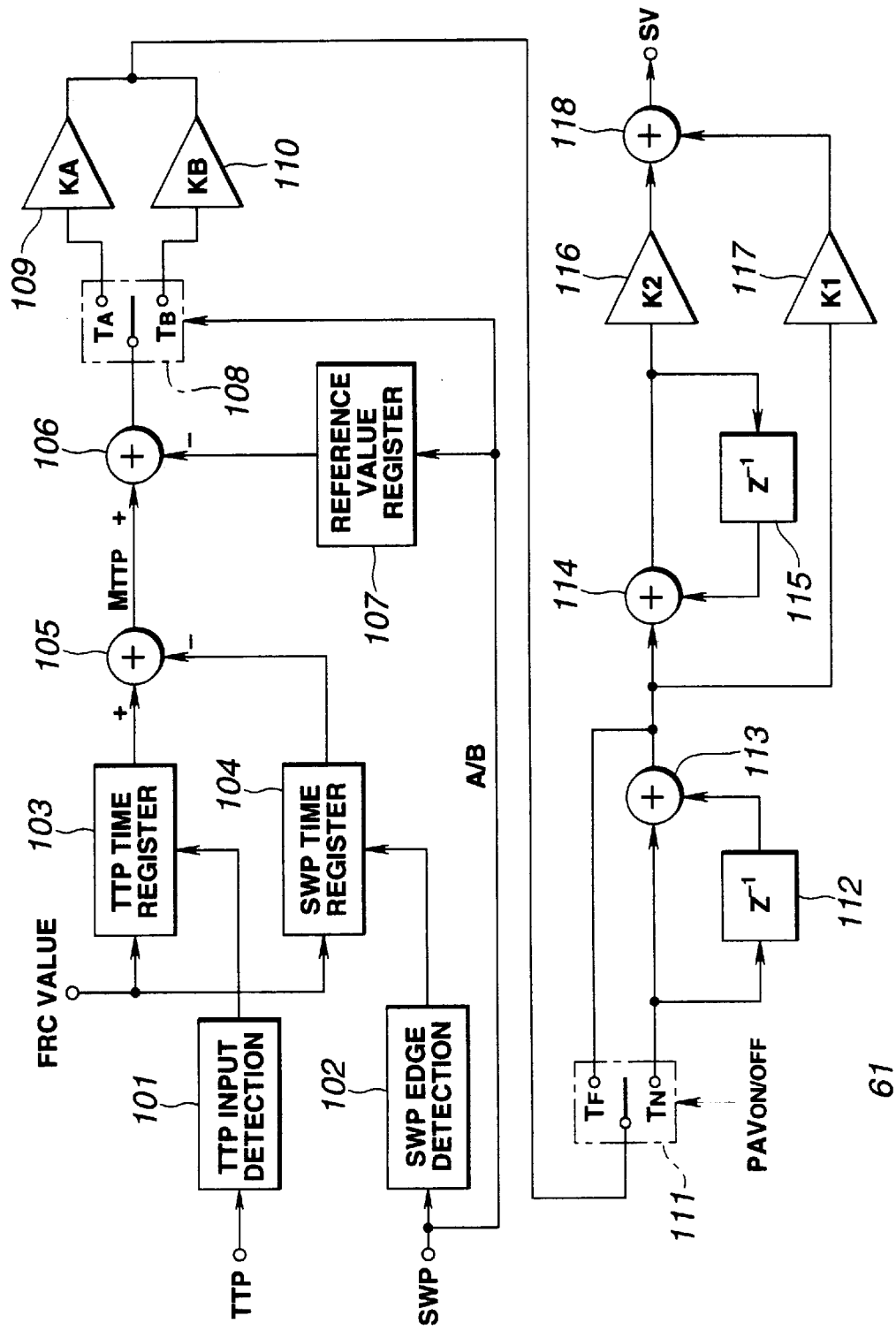
FIG. 29 is a block diagram showing another more practical configuration of the timing ATF processing section.

The timing ATF processing section 61 comprises, as shown in FIG. 29, for example, a TTP input detecting section 101, a SWP edge detecting section 102, a TTP time register 103, a SWP time register 104, subtracters 105, 106, a reference value register 107, a servo gain switch 108, servo gain amplifiers 109, 110, an averaging switch 111, adders 113, 114, 118, amplifiers 116, 117, and delay circuits 112, 115.

In order to satisfactorily provide (apply) tracking servo control by the timing ATF system, the reference value must be set to a suitable (reasonable) value. The servo circuit 30 having the timing ATF processing section 61 constituted as described above carries out, to some degree, reproduction operation for setting reference value prior to starting actual reproduction operation in order to set the reference value to carry out scanning of track in various tracking phase states as has been explained with reference to FIG. 4 to detect plural tracking detection times to determine an average value of these tracking detection times to determine the reference value on the basis of this average value.

Namely, this servo circuit 30 allows, e.g., tracking servo to be in OFF state (allows the servo switch 64 of FIG. 12 to be in OFF state) and to allow, e.g., the tape traveling velocity to be velocity different from the velocity of one time to respectively carry out about 30 reproduction scanning operations by the reproduction heads 16A, 16B. Thus, tracking detection times respectively corresponding to inclined tracks $TK_A$, $TK_B$ in various tracking phase states are obtained. Then, an average value of these tracking detection times is taken (calculated) to thereby determine reference value with respect to the A azimuth track $TK_A$ and reference value with respect to the B azimuth track $TK_B$ to store these values into the reference value register 107. Further, in actual tracking servo control at the time of reproduction operation, at the time of scanning of the A azimuth track $TK_A$ by the reproduction head 16A, the stored reference value with respect to the A azimuth track $TK_A$ and the tracking detection time measured from the timing detection pulse as described above are compared with each other to generate tracking error. In addition, at the time of scanning of the B azimuth track $TK_B$ by the reproduction head 16B, the stored reference value with respect to the B azimuth track $TK_B$ and the tracking detection time measured from the timing detection pulse are compared with each other to generate tracking error.

This servo circuit 30 implements, without allowing tracking error with respect to the A azimuth track $TK_A$ and tracking error with respect to the B azimuth track $TK_B$ to be respectively tracking errors SV which are servo control signals as they are, various amplifying processing and/or averaging processing, etc. in the servo control to these tracking errors to generate tracking errors SV which are servo control signals.

In more practical sense, the SWP edge detecting section 102 detects edge of switching pulse SWP delivered from the switching pulse generating section 62 shown in FIG. 12. Then, the SWP edge detecting section 102 is operative so that at the time point when it detects falling edge or rising edge of the switching pulse SWP, it delivers an edge detection signal to the SWP time register 104 as a latch signal. The SWP time register 104 latches count value (FRC value) of the free running counter 63 at the timing when the edge detection signal is inputted to hold it. Accordingly, when the falling edge of the switching pulse SWP is detected, value of the timing designated at $TR_A$ in FIG. 13 is stored into the SWP time register 104. When rising edge of the switching pulse SWP is detected, value of the timing designated at $TR_B$ in FIG. 13 is stored into the SWP time register 104.

On the other hand, the TTP input detecting section 101 monitors the timing detection pulse TTP delivered from the timing detection pulse generating circuit 27, whereby when the timing detection pulse TTP is inputted, it delivers this timing detection pulse TTP to the TTP time register 103 as a latch signal. The TTP time register 103 latches count value (FRC value) of the free running counter 63 at the timing when the timing detection pulse TTP is inputted to hold it. Namely, value of the timing when the timing detection pulse TTP is detected is stored into the TTP time register 103.

The subtracter 105 subtracts timing value latched in the SWP time register 104 from the timing value latched in the TTP time register 103 to generate tracking detection time $M_{TTP}$ ($M_{TTP}(A)$ or $M_{TTP}(B)$) which is the time (time period) from edge of the switching pulse SWP shown in FIG. 13, i.e., the timing of the reference phase position of the rotary drum 50 to the timing at which the timing detection pulse TTP is inputted. This tracking detection time $M_{TTP}$ is delivered to the subtracter 106.

The subtracter 106 subtracts the reference value held in the reference value register 107 from the tracking detection time $M_{TTP}$. This reference value register 107 discriminates on the basis of the switching pulse SWP whether the track being scanned is the A azimuth track $TK_A$ or the B azimuth track $TK_B$ to deliver, to the subtracter 106, the reference value for the A azimuth track $TK_A$ or the reference value for the B azimuth track $TK_B$ in accordance with the track to be scanned. As a result, the subtracter 106 generates tracking error with respect to the A azimuth track $TK_A$, or tracking error with respect to the B azimuth track $TK_B$ to deliver it to the servo gain switch 108.

The servo gain switch 108 is caused to undergo switching control by the switching pulse SWP, whereby when tracking error with respect to the A azimuth track $TK_A$ is outputted from the subtracter 106, the terminal $T_A$ is selected, and when tracking error with respect to the B azimuth track $TK_B$ is outputted from the subtracter 106, the terminal $T_B$ is selected. Accordingly, the servo gain switch 108 delivers tracking error with respect to the A azimuth track $TK_A$ to the servo gain amplifier 109, and delivers tracking error with respect to the B azimuth track $TK_B$ to the servo gain amplifier 110.

The servo gain amplifiers 109, 110 respectively have gains of KA, KB, and serve to respectively multiply tracking error with respect to the A azimuth track $TK_A$ and tracking error with respect to the B azimuth track $TK_B$ delivered through the servo gain switch 108 by KA and KB to deliver them to the averaging switch 111. In this case, the gain KA and the gain KB are values different from each other.

The averaging switch 111 is controlled by, e.g., an averaging processing ON/OFF signal $PAV_{ON/OFF}$ from the system controller 31, whereby when averaging processing is carried out, the terminal $T_N$ is selected. Accordingly, tracking error delivered from the servo gain amplifier 109 or the servo gain amplifier 110 is delivered to the delay circuit 112 and the adder 113.

The delay circuit 112 delays the tracking error delivered through the averaging switch 111 by the time required for allowing the reproduction head 16 to scan one track to deliver it to the adder 113. The adder 113 adds the tracking error directly delivered through the averaging switch 111 and the tracking error delayed at the delay circuit 112. Namely, the adder 113 adds the tracking error detected at the current track and the tracking error detected at the last (former) track to average those error values. In other words, the adder 113 is operative so that when tracking error with respect to the A azimuth track $TK_A$ is inputted by scanning of, e.g., the A azimuth track $TK_A$, tracking error with respect to the B azimuth track $TK_B$ which is preceding thereto by one track is inputted from the delay circuit 112 to average tracking errors of the current A azimuth track $TK_A$ and the last (former) B azimuth track $TK_B$ to deliver the averaged tracking error to the adder 114 and the amplifier 117. On the other hand, the adder 113 is operative so that when tracking error with respect to the B azimuth track $TK_B$ is inputted by scanning of the current B azimuth track $TK_B$, tracking error with respect to the A azimuth track TK which is preceding thereto by one track is inputted from the delay circuit 112 to average tracking errors of the current B azimuth track $TK_B$ and the last (former) A azimuth track $TK_A$ to deliver the averaged tracking error to the adders 114 and 117. In this example, in the case where such averaging processing is not carried out, the averaging switch 111 is adapted so that the terminal $T_F$ is selected to deliver tracking error delivered from the servo gain amplifiers 109, 110 to the adder 114 and the amplifier 117 as it is.

The adder 114, the delay circuit 115 and the amplifier 116 constitute the integral control system in the servo control, and the amplifier 117 constitutes the proportional control system in the servo control. Namely, the adder 114 adds averaged tracking error delivered from the adder 113 (or non-averaged tracking error delivered from the averaging switch 111) and accumulated value of the last time tracking error and tracking errors preceding thereto delivered from the delay circuit 115 to integrate the tracking error, and the amplifier 116 multiplies integral value of the tracking error by K2 to deliver it to the adder 118. The amplifier 117 multiplies tracking error delivered from the adder 113 or the averaging switch 111 by K1 to deliver it to the adder 118. The adder 118 adds the tracking error multiplied by K2 delivered from the amplifier 116 and the tracking error multiplied by K1 delivered from the amplifier 117 to generate tracking error SV.

As described above, this tracking error SV is delivered to the subtracter 66 shown in FIG. 12, at which difference between the tracking error SV and the signal delivered from the capstan reference velocity generating section 65 is determined. Thus, target velocity signal CV is generated. Then, at the capstan velocity servo signal generating section 67, that target velocity signal CV and the current capstan velocity are compared with each other so that the capstan servo signal Scp is generated. Thus, the tracking servo control is carried out.

As described above, in this embodiment, the tracking error with respect to the A azimuth track $TK_A$ is multiplied by KA by the servo gain amplifiers 109, 110, and the tracking error with respect to the B azimuth track $TK_B$ is multiplied by KB by such amplifiers. Thus, as described later, substantial difference of the servo gain between the A azimuth track $TK_A$ and the B azimuth track $TK_B$ can be eliminated.

As described above, by the azimuth difference, input timing shift quantity of the timing detection pulse TTP with respect to the tracking shift quantity changes with respect to respective azimuth tracks.

When shift of the timing detection pulse TTP detected at the A azimuth track and the B azimuth track are calculated in the state where the diameter of the rotary drum 50 is set to 30 mm, the rotational period is set to 30 msec, the drum lead angle $\theta_L$ shown in FIG. 8 is set to 6°22' and the azimuth angle $\theta_{HA}$ of the head is set to 20° in the track format used in the digital data storage, the shift quantity thus calculated is as follows. It is to be noted that the drum lead angle $\theta_L$ at the time of tape traveling and that at the time when the tape is in stationary state are slightly different by the relative relationship between the magnetic tape and the rotary drum.

Now consider how the input timing of the timing detection pulse TTP is shifted in the case where tracking is physically shifted by 1 $\mu$m. When the rotational period of the rotary drum 50 is assumed to be R, in the case where azimuth is not taken into consideration, the shift quantity is expressed as follows:

$$(1/\tan \theta_L) \times R/30\pi = 2.853 \text{ [msec/}\mu\text{m]}$$

When such shift quantity is calculated in connection with the A azimuth track $TK_A$, $$(1/\tan \theta_L + \tan \theta_{HA}) \times R/30\pi = 2.969 \text{ [msec/}\mu\text{m]}$$

Moreover, when such shift quantity is calculated in connection with the B azimuth track $TK_B$, the shift quantity is expressed as follows.

$$(1/\tan \theta_L - \tan \theta_{HA}) \times R/30\pi = 2.737 \text{ [msec/}\mu\text{m]}$$

Namely, the ratio of the input timing of the timing detection pulse TTP between the A azimuth track $TK_A$ and the B azimuth track $TK_B$ becomes equal to 1.085 (=2.969/2.737). This is equivalent to the fact that the A azimuth track $TK_A$ has servo gain which is substantially 1.085 times greater than that of the B azimuth track $TK_B$.

Accordingly, gain of the tracking error with respect to the B azimuth track $TK_B$ is caused to be 1.085 times greater than the gain of the tracking error with respect to the A azimuth track $TK_A$, thereby making it possible to balance servo gains with respect to both azimuth tracks.

In view of the above, in this embodiment, gain KB of the tracking error with respect to the B azimuth track $TK_B$ is caused to be 1.085 times greater than the gain KA of the tracking error with respect to the A azimuth track $TK_A$.

Thus, substantial difference of servo gain between the A azimuth track $TK_A$ and the B azimuth track $TK_B$ can be eliminated. Thus, tracking servo control can be carried out equally with respect to both azimuth tracks.

Figure 30:
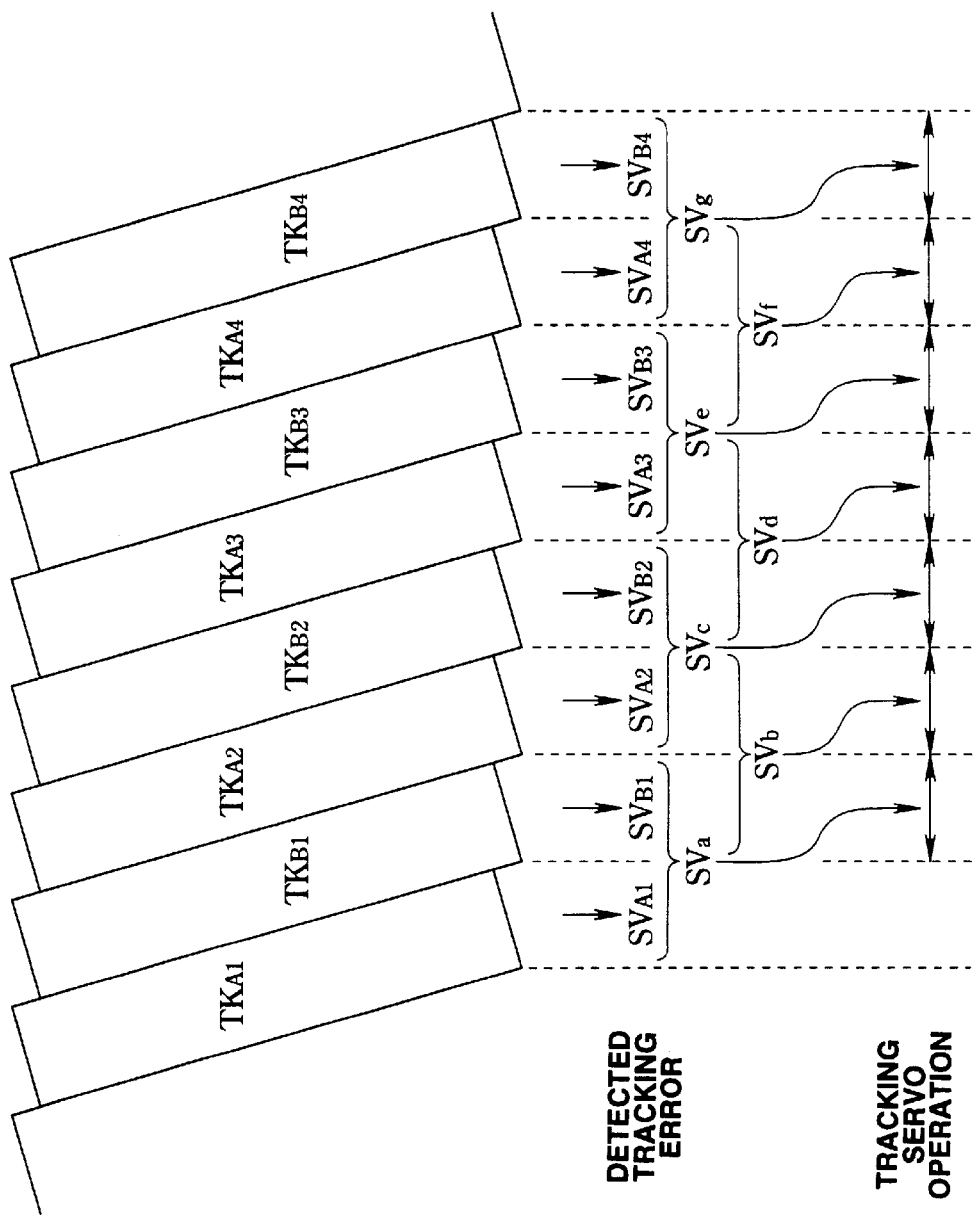
FIG. 30 is a view showing tracking operation by reference value determined in a fourth embodiment for setting reference value.

Moreover, in this embodiment, an average value of the tracking error with respect to the A azimuth track $TK_A$ and the tracking error with respect to the B azimuth track $TK_B$ is determined by the delay circuit 112 and the adder 113, whereby the tracking servo control is carried out as its operation image is shown in FIG. 30, for example. Namely, in scanning of the B azimuth track $TK_{B1}$, tracking error $SV_{B1}$ with respect to the B azimuth track $TK_{B1}$ detected by that scanning and tracking error $SV_{A1}$ with respect to the A azimuth track $TK_{A1}$ earlier than that (preceding thereto) are averaged so that tracking error SVa is generated. This tracking error SVa is caused to be actual tracking error SV. Thus, tracking servo control with respect to the B azimuth track $TK_{B1}$ is carried out by using this tracking error SVa.

Further, in scanning of the A azimuth track $TK_{A2}$, tracking error $SV_{A2}$ with respect to the A azimuth track $TK_{A2}$ detected by that scanning and tracking error $SV_{B1}$ with respect to the B azimuth track $TK_{B1}$ earlier than that (preceding thereto) are averaged so that tracking error SVb is generated. This tracking error SVb is caused to be actual tracking error SV. Thus, tracking servo control with respect to the A azimuth track $TK_{A2}$ is carried out.

Namely, since the average value of the current tracking error and the last tracking error is caused to be actual tracking error SV in this embodiment, even if there is mechanical error such as offset, etc. in attachment to the rotary drum 50 of the reproduction heads 16A, 16B, tracking change (fluctuation) component of 2 track period resulting from the mechanical error can be eliminated. Moreover, since tracking error is determined every one track to carry out tracking servo control, response of servo with respect to disturbance which fluctuates or changes various tracking operations can become satisfactory. In other words, in this embodiment, it is possible to prevent tracking servo control from becoming unstable resulting from offset of the reproduction head and/or difference of azimuth angle, etc., and stability of the tracking servo control can be greatly improved. Thus, error rate of the digital data storage can become satisfactory, and the reliability of the apparatus can be improved.

It is to be noted that while the more practical configuration of the timing ATF processing section 61 is shown in FIG. 29, the timing ATF processing section 61 may be constituted with, e.g., a microcomputer. In addition, while explanation has been given in this embodiment in connection with the example where one track is not divided into plural recording areas, plural recording areas may be set at one track to detect timing detection pulses TTP from respective recording areas to carry out tracking servo control.

Industrial Applicability

As is clear also from the foregoing description, the tracking control apparatus for tape-shaped recording medium according to this invention is operative, prior to carrying out actual reproduction, to measure times from the time point serving as the reference phase position within one period of the rotary drum to the time points when timing signals of respective recording areas of the tape-shaped recording medium are detected by the head, and to calculate average values at every one of the respective recording areas of the measured times to generate the reference value on the basis of the maximum value and the minimum value of the calculated average values of the respective recording areas. Then, in actual reproduction, times from the time point serving as the reference phase position up to the time points when the timing signals of the tape-shaped recording medium are detected by the head are measured to control the relative velocity between the traveling velocity of the tape-shaped recording medium and the rotational velocity of the rotary drum on the basis of the result of comparison between measured times and the reference value. Thus, even in the case where particularly the relationship between the scanning locus of the reproduction head and the track shape is not ideal, satisfactory tracking can be carried out over the entire area of the track. Thus, reliability of, e.g., digital data storage using such tracking control apparatus for tape-shaped recording medium can be improved.

Moreover, the tracking control apparatus for tape-shaped recording medium according to this invention detects, prior to carrying out actual reproduction, errors included in data which have been read out from respective recording areas of the tape-shaped recording medium by the head on the basis of the error detection code. At this time, times from the time point serving as the reference phase position within one period of the rotary drum up to the time points when timing signals of the respective recording areas of the tape-shaped recording medium are detected by the head are measured to generate the reference value on the basis of the measured times and the error detection result. In actual reproduction, times from the time point serving as the reference phase position to the time point when the timing signals of the tape-shaped recording medium are detected by the head are measured to control the relative velocity between the traveling velocity of the tape-shaped recording medium and the rotational velocity of the rotary drum on the basis of the result of comparison between the measured times and the reference value. Thus, situations such that errors concentrically takes place in a certain recording area can be avoided. Thus, the error rate as a whole can be improved. Particularly when any error takes place in reproduction data to carry out reproduction retry, the reference value in which importance is attached to the recording area where error has taken place can be set. Thus, reproduction retry can be quickly carried out.

Further, the tracking control apparatus for tape-shaped recording medium according to this invention is operative, prior to carrying out actual reproduction, to measure times from the time point serving as the reference phase position within one period of the rotary drum to the time points when timing signals of respective recording areas of the tape-shaped recording medium are detected by the head, and to set windows corresponding to time periods during which the timing signals of the respective recording areas of the tape-shaped recording medium are detected to generate the reference value on the basis of times until the timing signals of the respective recording areas obtained within the time period prescribed by the windows are detected. In actual reproduction, times from the time point serving as the reference phase position to the time points when the timing signals of the tape-shaped recording medium are detected by the head are measured to control the relative velocity between the traveling velocity of the tape-shaped recording medium and the rotational velocity of the rotary drum on the basis of the result of comparison between the measured times and the reference value. Thus, the reference value is permitted to be a more suitable (reasonable) value, and more precise tracking can be carried out.

In addition, the tracking control apparatus for tape-shaped recording medium according to this invention is directed to a tracking control apparatus for a tape-shaped recording medium on which plural inclined tracks are formed, each track is composed of plural recording areas, and timing signals are respectively recorded in the recording areas, there is carried out a control to measure, prior to carrying out actual reproduction, times from the time point serving as the reference phase position within one period of the rotary drum to the time points when timing signals of the respective recording areas of the tape-shaped recording medium are detected by the head to generate error information for controlling relative velocity between the traveling velocity of the tape-shaped recording medium and the rotational velocity of the rotary drum on the basis of the result of comparison between the measured times and value serving as reference, and to generate a control signal on the basis of error information generated with respect to the track of the tape-shaped recording medium being scanned by the head and error information generated with respect to the track preceding by one relative to the track being scanned by the head. Then, in actual reproduction, the relative velocity between the traveling velocity of the tape-shaped recording medium and the rotational velocity of the rotary drum is controlled on the basis of this control (reproduction) signal. Thus, the tracking servo is applied (provided) to every respective one tracks, and average value of error information corresponding to 2 tracks is used in that tracking servo. Accordingly, the stability of the tracking servo control can be improved, and the response can become satisfactory.

What is claimed is:

1. A tracking control apparatus for a tape-shaped recording medium on which plural inclined tracks are formed, each of the tracks is composed of plural recording areas, and timing signals and error detection codes are respectively recorded in respective recording areas, the apparatus comprising:

a rotary drum provided with at least one head;

a detecting section for detecting an error included in data read out from the respective recording areas of the tape-shaped recording medium by the head on the basis of the error detection codes;

a reference value generating section for measuring times from a time point serving as a reference phase position within one period of the rotary drum to time points when the timing signals of the respective recording areas of the tape-shaped recording medium are detected by the head to generate a reference value on the basis of a relationship of the measured times and a number of occurrences of the errors detected by the detecting section; and a control section for measuring times from the time point serving as the reference phase position up to the time points when the timing signals of the tape-shaped recording medium are detected by the head to control a relative velocity between a traveling velocity of the tape-shaped recording medium and a rotational velocity of the rotary drum on the basis of comparison between the measured times and the reference value from the reference value generating section.

2. The tracking control apparatus for a tape-shaped recording medium as set forth in claim 1, wherein the timing signals recorded on the tape-shaped recording medium are block synchronizing signals of the respective recording areas.

3. The tracking control apparatus for a tape-shaped recording medium as set forth in claim 1, wherein the at least one head comprises a first head and a second head, with the second head having an azimuth angle different from an azimuth angle of the first head, and tracks formed by the first head and tracks formed by the second head are disposed on the tape-shaped recording medium in such a manner that they are respectively adjacent to each other.

4. The tracking control apparatus for a tape-shaped recording medium as set forth in claim 1, wherein the reference value generating section includes means for calculating average values for every one of the respective recording areas of the measured times and for weighting the average values with respect to the recording area where a number of errors is a maximum detected by the detecting section thereafter to generate the reference value on the basis of a maximum value and a minimum value of the average values of the respective recording areas.

5. The tracking control apparatus for a tape-shaped recording medium as set forth in claim 4, wherein the reference value generating section includes means for comparing times from the time point serving as the reference phase position to the time points when timing signals of the respective recording areas of the tape-shaped recording medium are detected by the head and for setting plural windows on the basis of times from the time point serving as the reference phase position to the time points when boundary portions of the respective recording areas of the tape-shaped recording medium are scanned by the head to discriminate the recording area of the tape-shaped recording medium where one of the corresponding timing signals detected by the head exists on the basis of the comparison result.

6. The tracking control apparatus for a tape-shaped recording medium as set forth in claim 5, wherein the reference value generating section includes means for calculating average values for every one of the respective recording areas on the basis of an accumulated value of times from the time point serving as the reference phase position measured when the tape-shaped recording medium is at a feed velocity different from an ordinary feed velocity to the time points when the timing signals of the respective recording areas of the tape-shaped recording medium are detected by the head.

7. The tracking control apparatus for a tape-shaped recording medium as set forth in claim 6, wherein the reference value generating section includes means for calculating an average value of a maximum value and a minimum value of the calculated average values of the respective recording areas to thereby generate the reference value.

* * * * *